US011789321B2

(12) United States Patent
Mochizuki

(10) Patent No.: US 11,789,321 B2
(45) Date of Patent: *Oct. 17, 2023

(54) ELECTRONIC DEVICE

(71) Applicant: Japan Display Inc., Tokyo (JP)

(72) Inventor: Kazuhide Mochizuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,889

(22) Filed: Feb. 8, 2022

(65) Prior Publication Data
US 2022/0163854 A1    May 26, 2022

Related U.S. Application Data

(63) Continuation of application No. PCT/JP2020/023868, filed on Jun. 17, 2020.

(30) Foreign Application Priority Data

Aug. 9, 2019    (JP) ................................. 2019-147977

(51) Int. Cl.
  *G02F 1/1343*    (2006.01)
  *G02F 1/1335*    (2006.01)
  *H04N 23/57*    (2023.01)
  *F21V 8/00*    (2006.01)

(52) U.S. Cl.
  CPC .. *G02F 1/134309* (2013.01); *G02F 1/133512* (2013.01); *G02B 6/0068* (2013.01); *H04N 23/57* (2023.01)

(58) Field of Classification Search
  CPC ..................... G02F 1/134309; G02F 1/133512
  See application file for complete search history.

(56) References Cited

U.S. PATENT DOCUMENTS

| | | | |
|---|---|---|---|
| 11,333,941 B2 * | 5/2022 | Koito | ................. G02F 1/13306 |
| 11,347,116 B2 * | 5/2022 | Aoki | ................. G02F 1/134309 |
| 2016/0161664 A1 | 6/2016 | Ishida et al. | |
| 2017/0053592 A1 | 2/2017 | Shin et al. | |

FOREIGN PATENT DOCUMENTS

| | | |
|---|---|---|
| JP | 1-251012 A | 10/1989 |
| JP | 9-80581 A | 3/1997 |
| JP | 2017-40908 A | 2/2017 |
| WO | WO 2015/022887 A1 | 2/2015 |

OTHER PUBLICATIONS

International Search Report dated Sep. 8, 2020 in PCT/JP2020/023868, filed on Jun. 17, 2020, 2 pages.

* cited by examiner

*Primary Examiner* — Dung T Nguyen

(74) *Attorney, Agent, or Firm* — Maier & Maier PLLC

(57) ABSTRACT

According to one embodiment, an electronic device includes a liquid crystal panel and a camera. The liquid crystal panel includes a display area and an incident light control area. The camera overlaps the incident light control area. The incident light control area includes an annular line and a control electrode connected to the annular line. The annular line includes a first annular line and a second annular line disposed to be in contact with an inside of the first annular line.

17 Claims, 29 Drawing Sheets

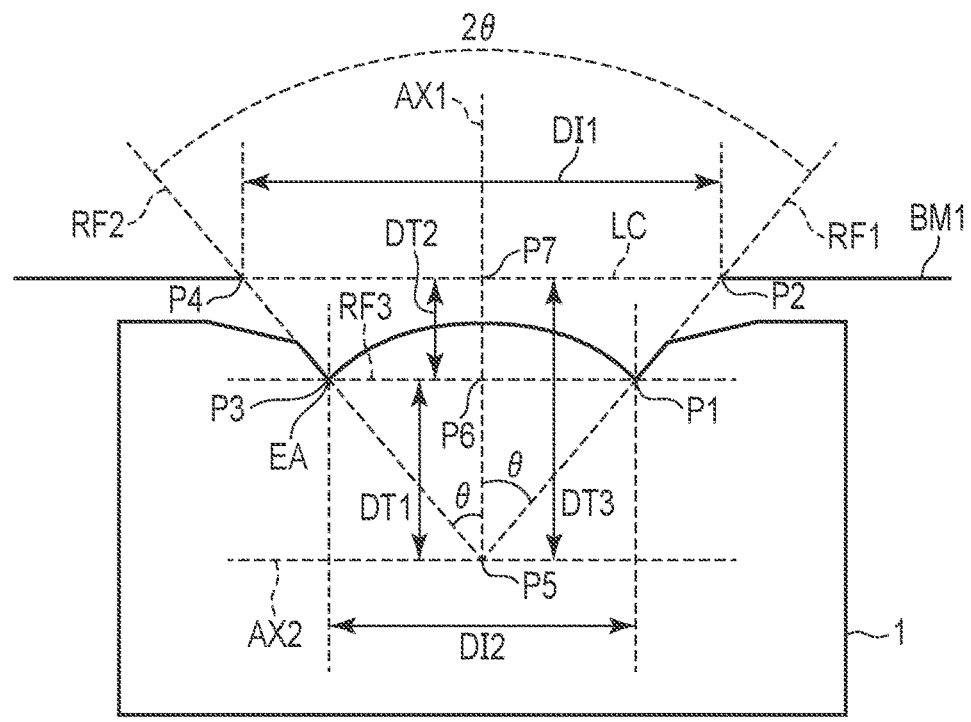
F I G. 14
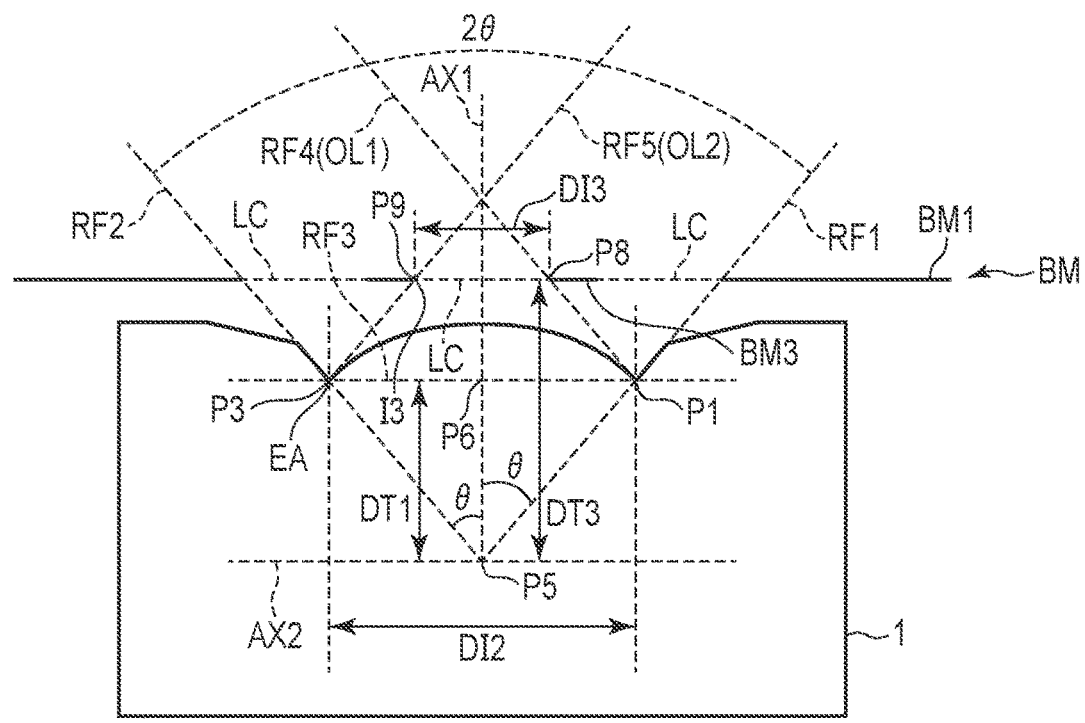
F I G. 15

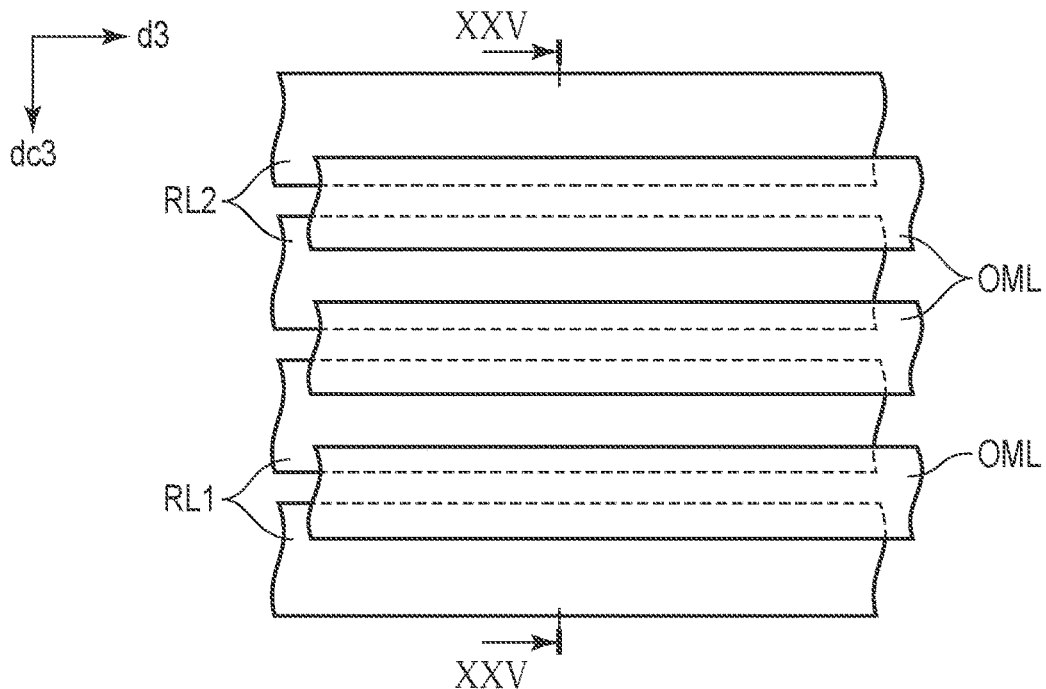
F I G. 24
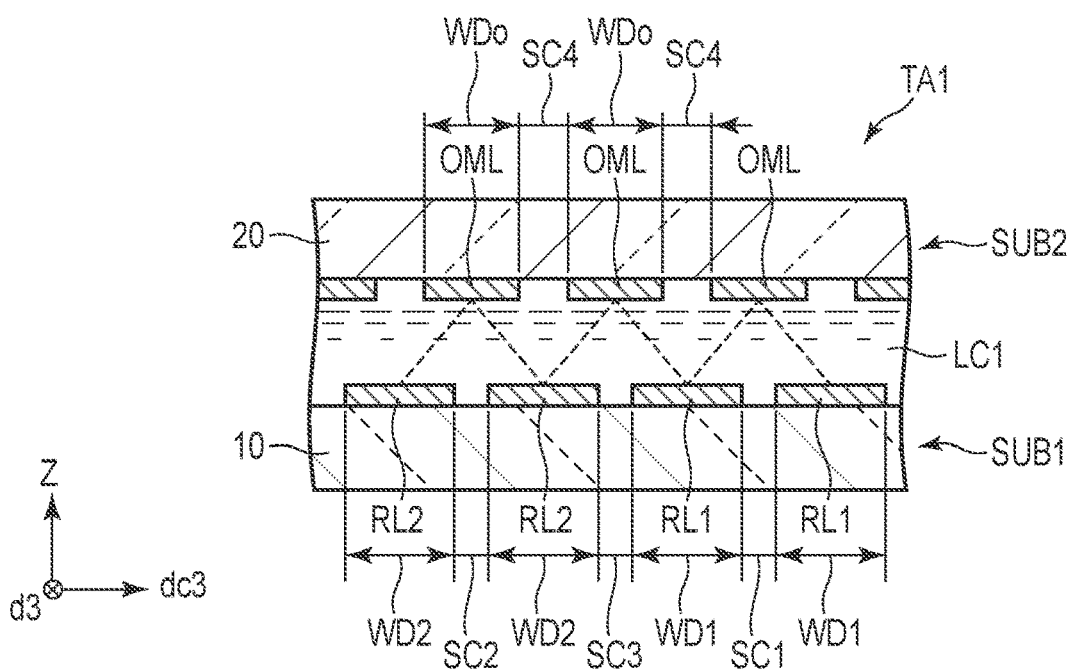
F I G. 25

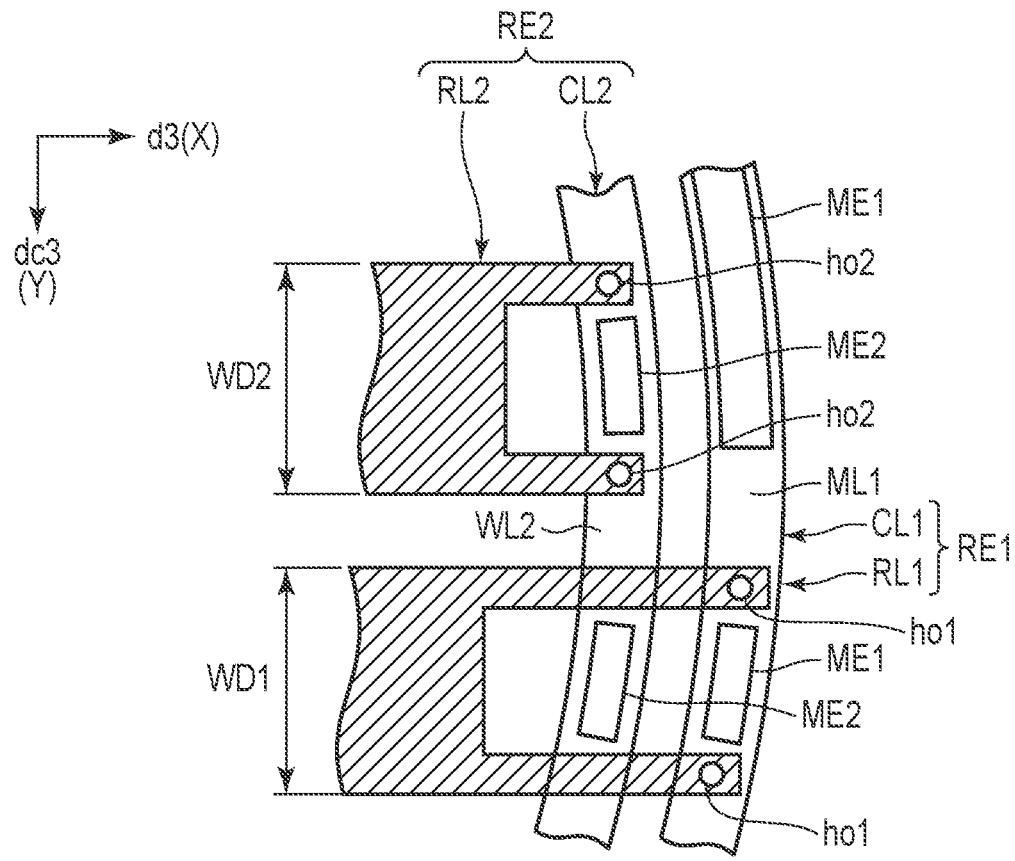
F I G. 32

ELECTRONIC DEVICE

CROSS-REFERENCE TO RELATED APPLICATIONS

This application is a Continuation Application of PCT Application No. PCT/JP2020/023868, filed Jun. 17, 2020 and based upon and claiming the benefit of priority from Japanese Patent Application No. 2019-147977, filed Aug. 9, 2019, the entire contents of all of which are incorporated herein by reference.

FIELD

Embodiments described herein relate generally to an electronic device.

BACKGROUND

Recently, electronic devices such as a smartphone comprising a display unit and a light receiving unit on the same surface side have been widely put into practical use. Such an electronic device comprises a liquid crystal panel and a camera located outside the liquid crystal panel. The electronic device is required to capture clear images.

BRIEF DESCRIPTION OF THE DRAWINGS

FIG. 14 is a cross-sectional view showing a part of the liquid crystal panel, and the camera according to the second embodiment.

FIG. 15 is another cross-sectional view showing a part of the liquid crystal panel, and the camera according to the second embodiment.

FIG. 24 is a plan view showing a plurality of first control electrodes, a plurality of second control electrodes, and a plurality of linear counter-electrodes according to the third embodiment.

FIG. 25 is a cross-sectional view showing a liquid crystal panel as viewed along line XXV-XXV of FIG. 24, illustrating an insulating substrate, a plurality of first control electrodes, a plurality of second control electrodes, a plurality of linear counter-electrodes, and a first control liquid crystal layer.

FIG. 32 is a plan view showing a first control electrode structure and a second control electrode structure of a liquid crystal panel of an electronic device according to a fifth embodiment.

DETAILED DESCRIPTION

Figure 1:
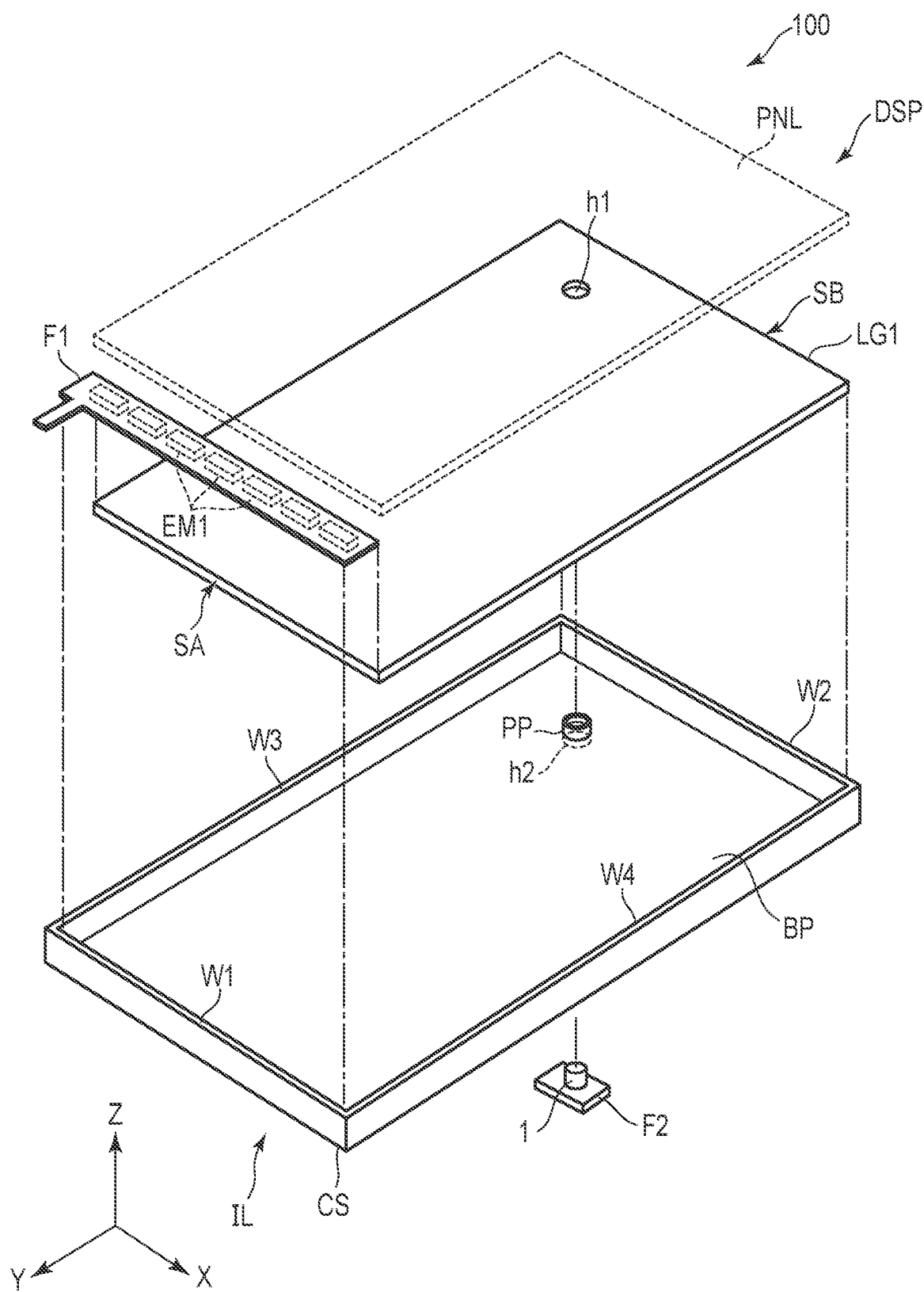
FIG. 1 is an exploded perspective view showing a configuration example of an electronic device according to a first embodiment.

In general, according to one embodiment, there is provided an electronic device comprising: a liquid crystal panel; and a camera. The liquid crystal panel includes a display area and an incident light control area. The camera overlaps the incident light control area. The incident light control area includes an annular line and a control electrode connected to the annular line. The annular line includes a first annular line and a second annular line disposed to be in contact with an inside of the first annular line.

According to another embodiment, there is provided an electronic device comprising: a liquid crystal panel including a first substrate, a second substrate, and a liquid crystal layer held between the first substrate and the second substrate; and a camera. The liquid crystal panel includes a display area where an image is displayed and an incident light control area. Light from outside is passed through the incident light control area and is made incident on the camera. The incident light control area includes an annular line and a control electrode connected to the annular line. The annular line includes a first annular line and a second annular line disposed to be in contact with an inside of the first annular line. The display area includes a pixel electrode. The control electrode is different in shape from the pixel electrode.

According to yet another embodiment, there is provided an electronic device comprising: a liquid crystal display device comprising a liquid crystal panel and an illumination device; and a camera disposed in an opening formed in the illumination device. The liquid crystal panel includes a display area where an image is displayed and an incident light control area. Light from outside is passed through the incident light control area and is made incident on the camera. The incident light control area includes an annular line and a control electrode connected to the annular line. The control electrode is disposed inside the annular line. The display area includes a pixel electrode. The control electrode is different in shape from the pixel electrode.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Embodiment

First, a first embodiment will be described. FIG. 1 is an exploded perspective view showing a configuration example of an electronic device 100 according to a first embodiment.

As shown in FIG. 1, the direction X, the direction Y, and the direction Z are orthogonal to each other but may intersect at an angle other than 90 degrees.

The electronic device 100 comprises a liquid crystal display device DSP and a camera (camera unit) 1. The liquid crystal display device DSP comprises a liquid crystal panel PNL and an illumination device (backlight) IL.

The illumination device IL comprises a light guide LG1, light source EM1, and a casing CS. For example, the illumination device IL illuminates the liquid crystal panel PNL simply represented by a dashed line in FIG. 1.

The light guide LG1 is formed in a flat panel shape parallel to an X-Y plane defined by the directions X and Y. The light guide LG1 is opposed to the liquid crystal panel PNL. The light guide LG1 has a side surface SA, a side surface SB on the side opposite to the side surface SA, and a through hole h1 surrounding the camera 1. Each of the side surfaces SA and SB extends along the direction X. For example, the side surfaces SA and SB are surfaces parallel to an X-Z plane defined by the directions X and Z. The through hole h1 penetrates the light guide LG1 along the direction Z. The through hole h1 is located between the side surfaces SA and SB and is closer to the side surface SB than to the side surface SA, in the direction Y.

A plurality of light sources EM1 are arranged at intervals in the first direction X, and each of the light sources EM1 is mounted on a wiring board F1 and is electrically connected to the wiring board F1. For example, the light source EM1 is a light-emitting diode (LED), which emits white illumination light. The illumination light emitted from the light source EM1 is made incident on the light guide LG1 from the side surface SA to travel inside the light guide LG1 from the side surface SA toward the side surface SB.

The light guide LG1 and the light source EM1 are accommodated in the casing CS. The casing CS has side walls W1 to W4, a bottom plate BP, a through hole h2, and a protrusion PP. The side walls W1 and W2 extend in the direction X and are opposed in the direction Y. The side walls W3 and W4 extend in the direction Y and are opposed in the direction X. The through hole h2 overlap the through hole h1 in the direction Z. The protrusion PP is fixed on the bottom plate BP. The protrusion PP protrudes from the bottom plate BP toward the liquid crystal panel PNL along the direction Z and surrounds the through hole h2.

The light guide LG1 overlaps at least a part of the liquid crystal panel PNL in planar view of the X-Y plane.

The camera 1 is mounted on a wiring board F2 and is electrically connected to the wiring board F2. The camera 1 penetrates the through hole h2, the inside of the protrusion PP, and the through hole h1 and is opposed to the liquid crystal panel PNL.

Figure 2:
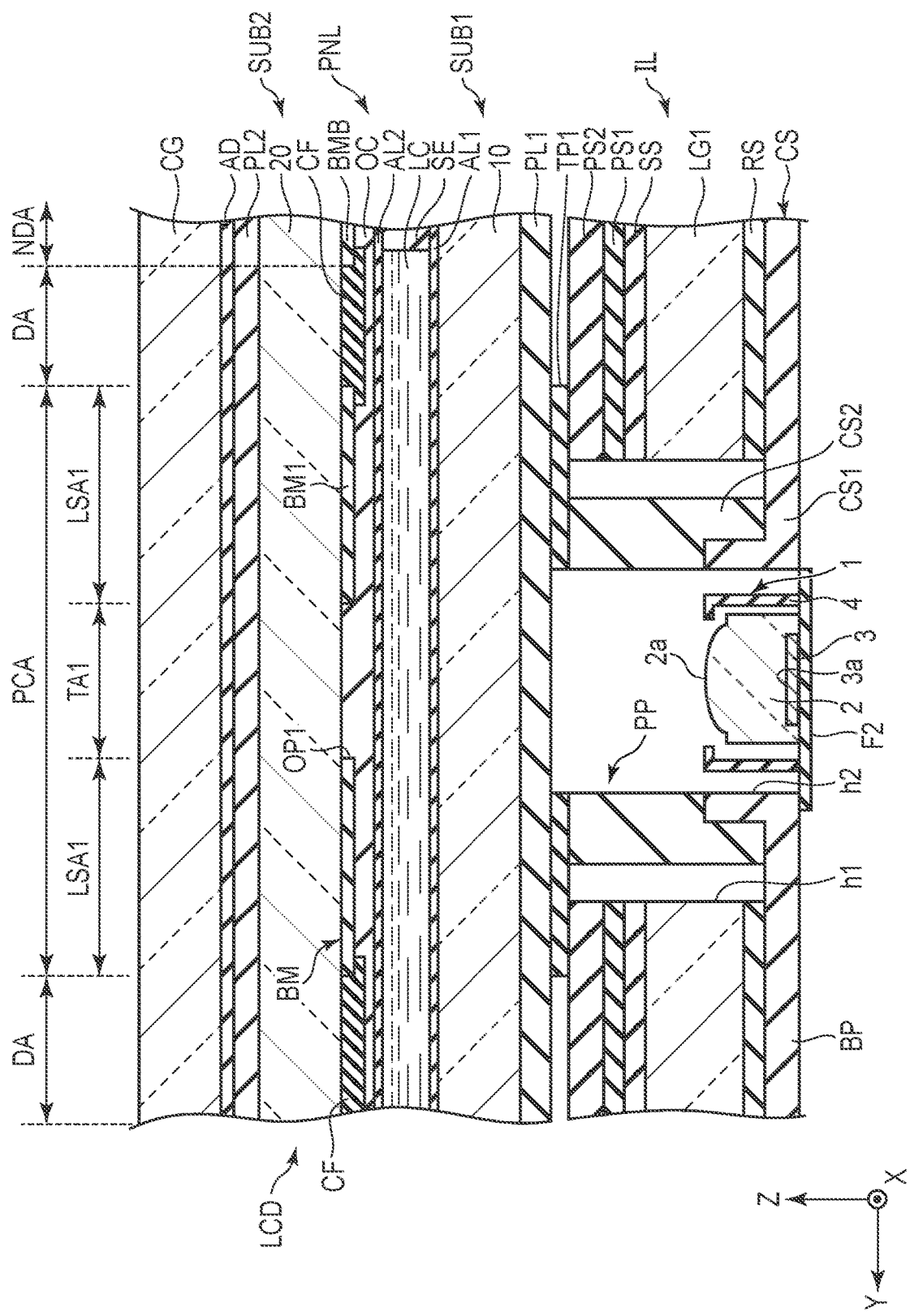
FIG. 2 is a cross-sectional view showing a surrounding of a camera of the electronic device.

FIG. 2 is a cross-sectional view showing a surrounding of the camera 1 of the electronic device 100.

As shown in FIG. 2, the illumination device IL further comprises a light reflective sheet RS, a light guide LG1, a light diffusion sheet SS, and prism sheets PS1 and PS2.

The light reflective sheet RS, the light guide LG1, the light diffusion sheet SS, the prism sheet PS1, and the prism sheet PS2 are arranged in this order in the direction Z from the casing CS side and are accommodated in the casing CS. The casing CS comprises a metallic casing CS1 and a light-shielding wall CS2 formed of resin which serves as a peripheral member. The light-shielding wall CS2 is adjacent to the camera 1 to form the protrusion PP together with the casing CS1. In the first embodiment, the light-shielding wall CS2 is located between the camera 1 and the light guide LG1 and has a cylindrical shape. The light-shielding wall CS2 is formed of resin such as black resin, which absorbs light. Each of the light diffusion sheet SS, the prism sheet PS1, and the prism sheet PS2 has a through hole which overlaps the through hole h1. The protrusion PP is located inside the through hole h1.

The liquid crystal panel PNL further comprises a polarizer PL1 and a polarizer PL2. The liquid crystal panel PNL and a cover glass CG serving as a cover member are arranged in the direction Z and constitute a liquid crystal element LCD comprising an optical switch function for the light traveling in the direction Z. The liquid crystal panel PNL including the liquid crystal element LCD is stuck to the illumination device IL by an adhesive tape TP1. In the first embodiment, the adhesive tape TP1 is stuck to the protrusion PP, the prism sheet PS2, and the polarizer PL1.

The liquid crystal panel PNL may have a configuration corresponding to any one of a display mode using a lateral electric field along the substrate main surface, a display mode using a longitudinal electric field along the normal of the substrate main surface, a display mode using an inclined electric field which is tilted obliquely with respect to the substrate main surface, and a display mode using an appropriate combination of the above lateral electric field, longitudinal electric field, and inclined electric field. The substrate main surface explained here is a surface parallel to the X-Y plane.

The liquid crystal panel PNL comprises a display area DA on which an image is displayed, a non-display area NDA located outside the display area DA, and an incident light control area PCA surrounded by the display area DA and having a circular shape. The liquid crystal panel PNL comprises a first substrate SUB1, a second substrate SUB2, a liquid crystal layer LC, and a sealing member SE. The sealing member SE is located in the non-display area NDA to bond the first substrate SUB1 and the second substrate SUB2. The liquid crystal layer LC is located in the display area DA and the incident light control area PCA and is held between the first substrate SUB1 and the second substrate SUB2. The liquid crystal layer LC is formed in a space surrounded by the first substrate SUB1, the second substrate SUB2 and the sealing member SE.

An image is displayed on the display area DA when the liquid crystal panel PNL controls the quantity of transmitted light emitted from the illumination device IL. The user of the electronic device 100 is located on the Z-directional side of the cover glass CG (in the drawing, upper side) and observes the light emitted from the liquid crystal panel PNL as an image.

In contrast, the quantity of the transmitted light is also controlled by the liquid crystal panel PNL in the incident light control area PCA, and the light is made incident on the camera 1 from the Z-directional side of the cover glass CG through the liquid crystal panel PNL.

The light traveling from the illumination device IL to the cover glass CG side through the liquid crystal panel PNL is herein referred to as emitted light, and the light traveling from the cover glass CG side to the camera 1 through the liquid crystal panel PNL is herein referred to as incident light.

Main parts of the first substrate SUB1 and the second substrate SUB2 will be hereinafter described.

The first substrate SUB1 comprises an insulating substrate 10 and an alignment film AL1. The second substrate SUB2 comprises an insulating substrate 20, a color filter CF, a light-shielding layer BM, a transparent layer OC, and an alignment film AL2.

The insulating substrates 10 and 20 are transparent substrates such as glass substrates or flexible resin substrates. The alignment films AL1 and AL2 are in contact with a liquid crystal layer LC.

The color filter CF, the light-shielding layer BM, and the transparent layer OC are located between the insulating substrate 20 and the liquid crystal layer LC. In the example illustrated, the color filter CF is provided on the second substrate SUB2, but may be provided on the first substrate SUB1. The color filter CF is located in the display area DA.

The incident light control area PCA includes at least a first light-shielding area LSA1 located in the outermost periphery and having an annular shape, and a first incident light control area TA1 surrounded by the first light-shielding area LSA1 and being in contact with the first light-shielding area LSA1.

The light-shielding layer BM includes a light-shielding portion located in the display area DA to partition pixels and a frame-shaped light-shielding portion BMB located in the non-display portion NDA. In the incident light control area PCA, the light-shielding layer BM includes at least a first light-shielding portion BM1 located in the first light-shielding area LSA1 and having an annular shape, and a first opening OP1 located in the first incident light control area TA1.

A boundary of the display area DA and the non-display area NDA is defined by, for example, an inner end (end part of the display area DA side) of the light-shielding portion BMB. The sealing member SE overlaps the light-shielding portion BMB. An inner end (i.e., an end part of the display area DA side) of the sealing member SE is located at the same position as an inner end of the light-shielding portion BMB or is arranged closer to the non-display area NDA side than to the inner end of the light-shielding portion BMB.

The transparent layer OC is in contact with the color filter CF in the display area DA, with the light-shielding portion BMB in the non-display area NDA, with the first light-shielding portion BM1 in the first light-shielding area LSA1, and with the insulating substrate 20 in the first incident light control area TA1. The alignment films AL1 and AL2 are provided across the display area DA, the incident light control area PCA, and the non-display area NDA.

The detailed descriptions of the color filter CF are omitted here, but the color filter CF comprises, for example, a red colored layer arranged at a red pixel, a green colored layer arranged at a green pixel, and a blue colored layer arranged at a blue pixel. In addition, the color filter CF often comprises a transparent resin layer arranged at a white pixel. The transparent layer OC covers the color filter CF and the light-shielding layer BM. For example, the transparent layer OC is a transparent organic insulating layer.

The camera 1 is located inside the through hole h2 of the casing CS. The camera 1 overlaps the cover glass CG and the liquid crystal panel PNL in the direction Z. Incidentally, the liquid crystal panel PNL may further comprise an optical sheet other than the polarizers PL1 and PL2, in the incident light control area PCA. A retardation film, a light scattering layer, an antireflective layer or the like can be used as the optical sheet. In the electronic device 100 comprising the liquid crystal panel PNL, the camera 1, and the like, the camera 1 is provided on a back side of the liquid crystal panel PNL as viewed from the user of the electronic device 100.

For example, the camera 1 comprises an optical system 2 including at least one lens, an imaging device (image sensor) 3, and a casing 4. The imaging device 3 includes an imaging surface 3a which faces the liquid crystal panel PNL side. The optical system 2 is located between the imaging surface 3a and the liquid crystal panel PNL, and includes an incidence surface 2a which faces the liquid crystal panel PNL side. The optical system 2 is located and spaced apart from the liquid crystal panel PNL. The casing 4 accommodates at least the optical system 2 and the imaging device 3.

The imaging device 3 receives light through the cover glass CG, the liquid crystal panel PNL, and the optical system 2. For example, the camera 1 receives visible light (for example, light having a wavelength range of 400 to 700 nm) transmitted through the cover glass CG and the liquid crystal panel PNL.

The polarizer PL1 is bonded to the insulating substrate 10. The polarizer PL2 is bonded to the insulating substrate 20. The cover glass CG is stuck to the polarizer PL2 by a transparent adhesive layer AD.

In addition, a transparent conductive layer may be provided between the polarizer PL2 and the insulating substrate 20 to prevent the liquid crystal layer LC from being influenced from an electric field from the outside, and the like. The transparent conductive layer is formed of a transparent conductive material such as indium tin oxide (ITO) or indium zinc oxide (IZO).

In addition, an ultra-birefringent film can be included in the polarizer PL1 or PL2. It is known that the ultra-birefringent film makes the transmitted light non-polarized (change to natural light) when linearly polarized light is made incident, and a subject can be captured without uncomfortable feeling even if the subject includes an element which emits polarized light. For example, when the electronic device 100 or the like is reflected in a subject of the camera 1, the luminance of the electronic device 100 in the subject made incident on the camera 1 may be varied and due to a relationship between the polarizers PL1 and PL2, and the angle made between the electronic device 100 which is the subject and the polarizers, and an uncomfortable feeling may be made at imaging, since the linearly polarized light is emitted from the electronic device 100. However, the variation in the luminance that causes the uncomfortable feeling can be suppressed by providing the ultra-birefringent films in the polarizers PL1 and PL2.

As a film exhibiting the ultra-birefringence, for example, COSMOSHINE manufactured by TOYOBO CO., LTD. is preferably used. The ultra-birefringence means in-plane retardation of higher than or equal to 800 nm to light in the visible range, for example, 500 nm.

Based on the above, the light from the outside is made incident on the camera 1 through the incident light control area PCA.

Figure 3:
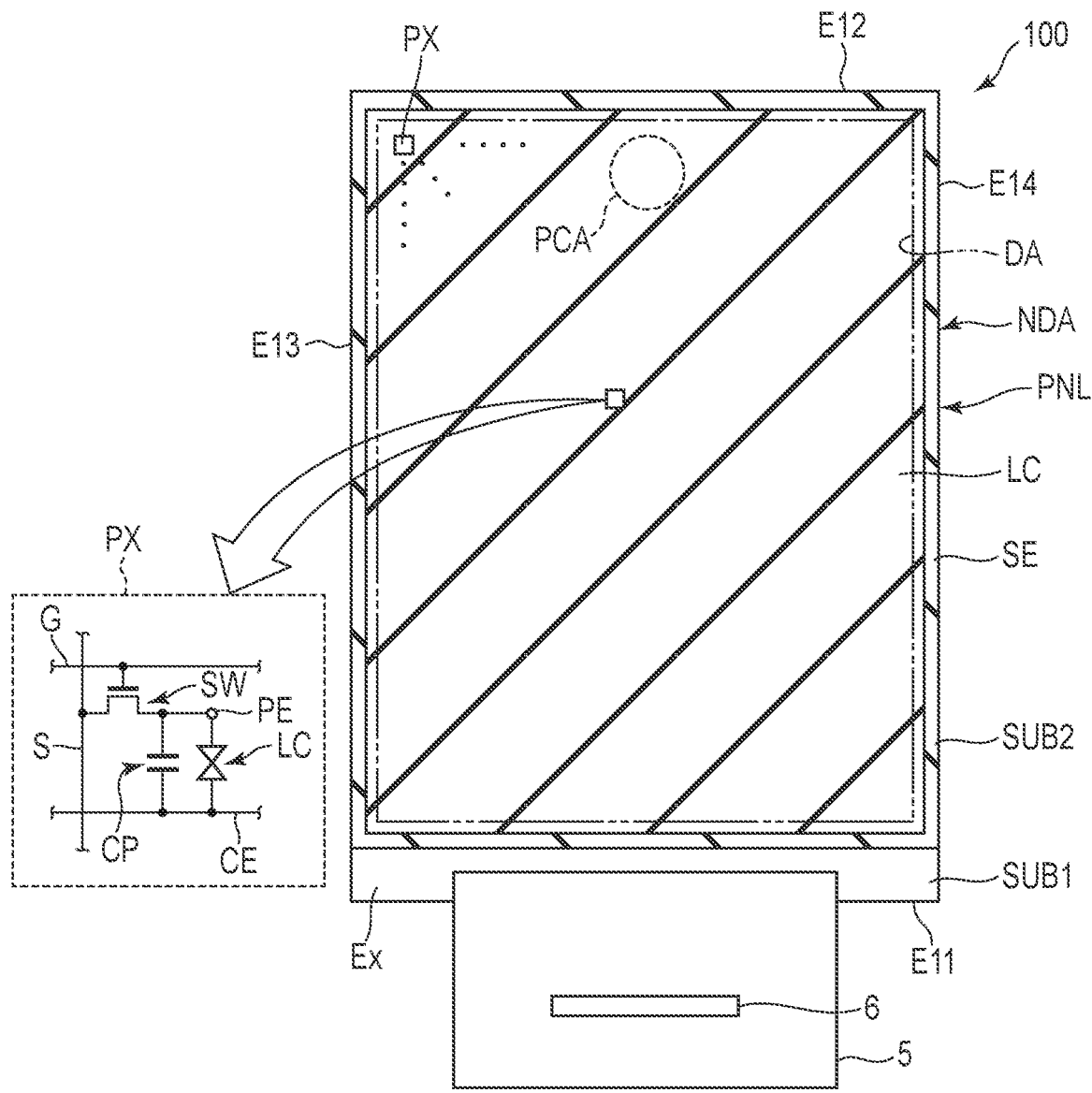
FIG. 3 is a plan view showing a configuration example of a liquid crystal panel shown in FIG. 2, together with an equivalent circuit of one pixel.

FIG. 3 is a plan view showing a configuration example of the liquid crystal panel PNL shown in FIG. 2, together with an equivalent circuit of one pixel PX. In FIG. 3, the liquid crystal layer LC and the sealing member SE are represented by different hatch lines.

As shown in FIG. 3, the display area DA is a substantially square area, but may be rounded at four corners or may be shaped in a polygon other than a square or a circle. The display area DA is surrounded by the sealing member SE.

The liquid crystal panel PNL has a pair of shorter sides E11 and E12 extending along the direction X and a pair of longer sides E13 and E14 extending along the direction Y. Incidentally, the shorter side E11 may be referred to as a first side, the shorter side E12 may be referred to as a second side, the longer side E14 may be referred to as a third side, and the longer side E13 may be referred to as a fourth side. In the display area DA, the liquid crystal panel PNL comprises a plurality of pixels PX arrayed in a matrix in the direction X and the direction Y. The pixels PX in the display area DA have the same circuit configuration. As shown and enlarged in FIG. 3, each pixel PX comprises a switching element SW, a pixel electrode PE, a common electrode CE, a liquid crystal layer LC and the like.

The switching element SW is composed of, for example, a thin film transistor (TFT). The switching element SW is electrically connected to a corresponding scanning line G of a plurality of scanning lines G, a corresponding signal line S of a plurality of signal lines S, and the pixel electrode PE. A control signal to control the switching element SW is supplied to the scanning line G. An image signal such as a video signal is supplied to the signal line S as a signal different from the control signal. A common voltage is supplied to the common electrode CE. The liquid crystal layer LC is driven with a voltage (electric field) generated between the pixel electrode PE and the common electrode CE. For example, a capacitor CP is formed between an electrode having the same potential as the common electrode CE and an electrode having the same potential as the pixel electrode PE.

The electronic device 100 further comprises a wiring substrate 5 and an IC chip 6.

The wiring substrate 5 is mounted on an extending portion Ex of the first substrate SUB1 and is coupled to the extending portion Ex. The IC chip 6 is mounted on the wiring substrate 5 and is electrically connected to the wiring substrate 5. Incidentally, the IC chip 6 may be mounted on the extending portion Ex and electrically connected to the extending portion Ex. In the IC chip 6, for example, a display driver which outputs a signal necessary for image display, and the like, are incorporated. The wiring substrate 5 may be a foldable flexible printed circuit. The electric circuit line may be directly provided on the extending portion Ex without using the wiring substrate 5 and then the IC chip 6 may be mounted.

Figure 4:
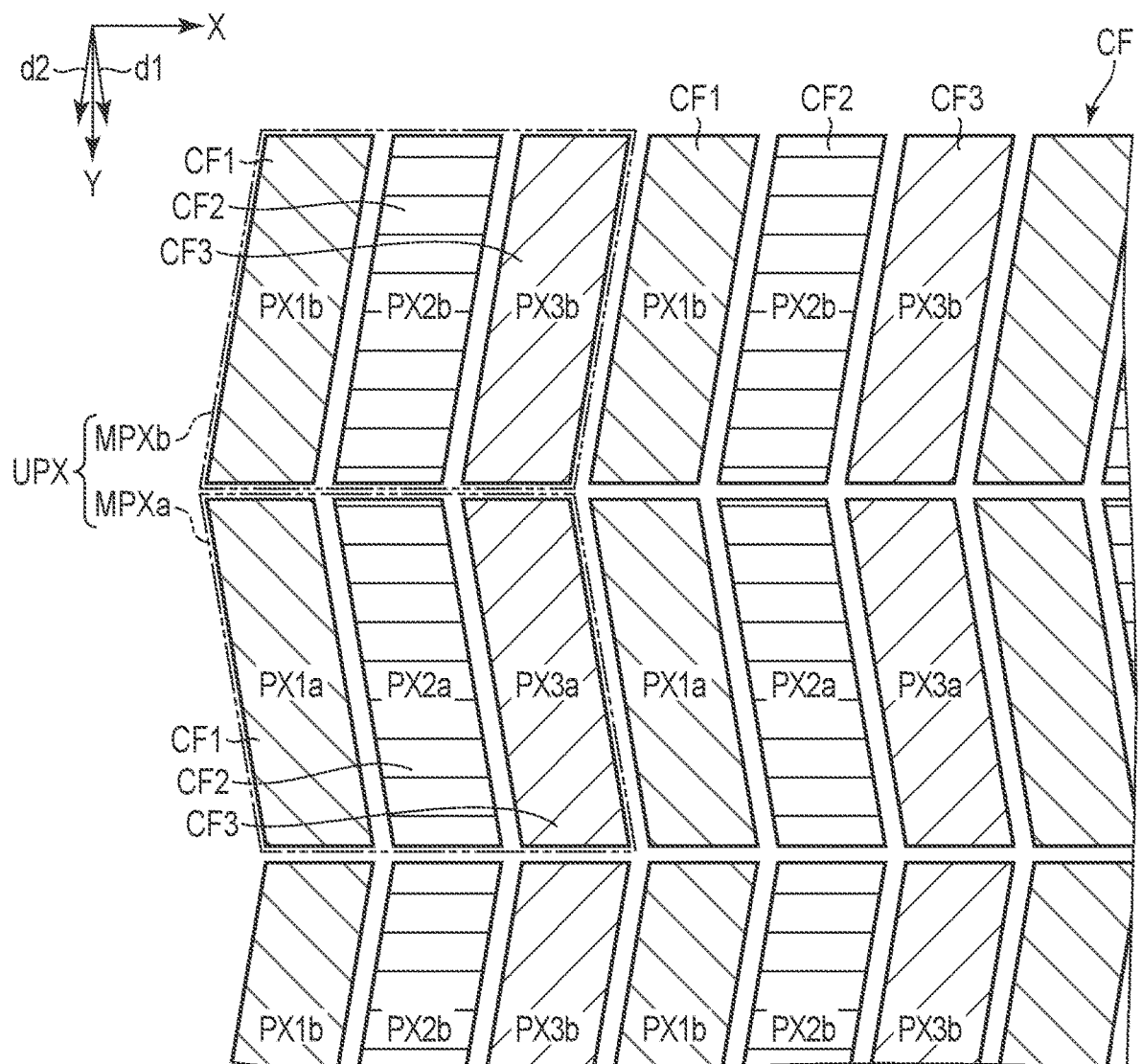
FIG. 4 is a plan view showing a pixel array on the liquid crystal panel.

FIG. 4 is a plan view showing the array of the pixels PX on the liquid crystal panel PNL.

As shown in FIG. 4, each of main pixels MPX is composed of a plurality of pixels PX. A plurality of main pixels MPX are classified into two types of main pixels MPXa and MPXb. Two main pixels MPXa and MPXb adjacent in the direction Y constitute a unit pixel UPX. Each of the main pixels MPXa and MPXb corresponds to a minimum unit of display of a color image. The main pixel MPXa includes pixels PX1a, PX2a, and PX3a. The main pixel MPXb includes pixels PX1b, PX2b, and PX3b. In addition, the shape of the above pixel PX is an approximate parallelogram as shown in the drawing.

Each of the main pixels MPXa and MPXb includes multicolor pixels PX which are arranged in the direction X.

The pixels PX1*a* and PX1*b* are first color pixels and comprise colored layers CF1 of the first color. The pixels PX2*a* and PX2*b* are second color pixels different from the first color pixel and comprise colored layers CF2 of the second color. The pixels PX3*a* and PX3*b* are third color pixels different from the first color pixel and second color pixel, and comprise colored layers CF3 of the third color.

The main pixels MPXa and the main pixels MPXb are repeatedly arranged in the direction X. Rows of the main pixels MPXa arranged in the direction X and rows of main pixels MPXb arranged in the direction X are arranged alternately and repeatedly in the direction Y. Each pixel PX of the main pixel MPXa extends in a first extending direction d1, and each pixel PX of the main pixel MPXb extends in a second extending direction d2. Incidentally, the first extending direction d1 is a direction different from the directions X and Y. The second extending direction d2 is a direction different from the directions X and Y and the first extending direction d1. In the example shown in FIG. 5, the first extending direction d1 is a right downward direction, and the second extending direction d2 is a left downward direction.

When the shape of the pixel PX is an approximate parallelogram as shown in the figure, a plurality of domains different in direction of rotation of the director can be set in the unit pixel UPX. That is, it is possible to form a number of domains with respect to the pixel of each color and compensate for the property of viewing angle by combining two main pixels MPXa and MPXb. For this reason, when the property of viewing angle is focused, one unit pixel UPX obtained by combining the main pixels MPXa and MPXb corresponds to the minimum unit for displaying a color image. The three-color configuration including the first colored layer to the third colored layer is provided in the above descriptions, but a configuration of four or more colors in which a fourth colored layer and the like are further arranged may be provided.

Figure 5:
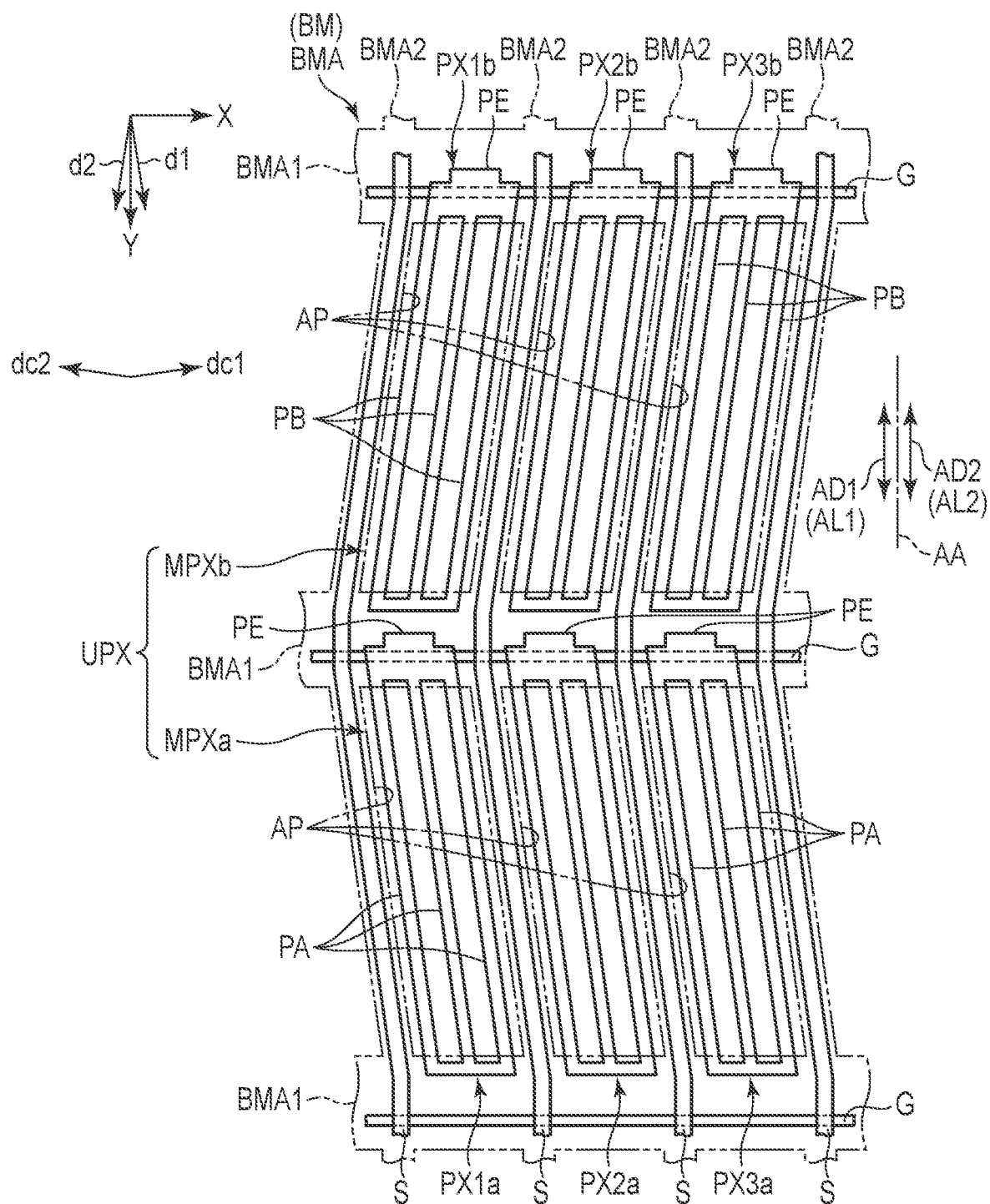
FIG. 5 is a plan view showing a unit pixel of the liquid crystal panel, illustrating a scanning line, a signal line, a pixel electrode, and a light-shielding portion.

FIG. 5 is a plan view showing one unit pixel UPX of the liquid crystal panel PNL, illustrating the scanning lines G, the signal lines S, the pixel electrodes PE, and a light-shielding portion BMA. Incidentally, in FIG. 5, only constituent elements necessary for explanations are illustrated, but illustration of the switching element SW, the common electrode CE, color filter CF, and the like is omitted.

As shown in FIG. 5, the plurality of pixels PX have a configuration conforming to a fringe field switching (FFS) mode, which is one of the display modes using the lateral electric field. The scanning lines G and the signal lines S are arranged on the first substrate SUB1 whereas the light-shielding portion BMA (light-shielding layer BM) is arranged on the second substrate SUB2. The scanning lines G and the signal lines S cross each other and cause the display area (DA) to extend. Incidentally, the light-shielding portion BMA is a grating-shaped light-shielding portion located in the display area DA to partition the pixels PX, and is represented by a two-dot chain line in the figure.

The light-shielding portion BMA comprises at least a function of blocking light emitted from the above-explained illumination device (IL). The light-shielding portion BMA is formed of a material having a high light absorption index such as black resin. The light-shielding portion BMA is formed in a grating shape. A plurality of light-shielding portion BMA1 extending in the direction X and a plurality of light-shielding portion BMA2 extending while bending in the first extending direction d1 and the second extending direction d2 are integrated to form the light-shielding portion BMA.

Each of the scanning lines G extends in the direction X. Each of the scanning lines G is opposed to the corresponding light-shielding portion BMA1 and extends along the corresponding light-shielding portion BMA1. The light-shielding portion BMA1 is opposed to the scanning lines G, end parts of the pixel electrodes PE, and the like. Each of the signal lines S extends while bending in the direction Y, the first extending direction d1, and the second extending direction d2. Each of the signal lines S is opposed to the corresponding light-shielding portion BMA2 and extends along the corresponding light-shielding portion BMA2.

The light-shielding layer BM includes a plurality of apertures AP. The apertures AP are partitioned by the light-shielding portions BMA1 and BMA2. The aperture AP of the main pixel MPXa extends in the first extending direction d1. The aperture AP of the main pixel MPXb extends in the second extending direction d2.

The pixel electrode PE of the main pixel MPXa includes a plurality of linear pixel electrodes PA located in the aperture AP. A plurality of linear pixel electrodes PA extend linearly in the first extending direction d1, and are arranged and spaced apart in an orthogonal direction dc1 that is orthogonal to the first extending direction d1. The pixel electrode PE of the main pixel MPXb includes a plurality of linear pixel electrodes PB located in the aperture AP. A plurality of linear pixel electrodes PB extend linearly in the second extending direction d2, and are arranged and spaced apart in an orthogonal direction dc2 that is orthogonal to the second extending direction d2.

In the display area DA, the above-described alignment films AL1 and AL2 have an alignment axis AA parallel to the direction Y. An alignment direction AD1 of the alignment film AL1 is parallel to the direction Y, and an alignment direction AD2 of the alignment film AL2 is parallel to the alignment direction AD1.

When a voltage is applied to the liquid crystal layer (LC), a rotated state (aligned state) of liquid crystal molecules in the apertures AP of the main pixel MPXa is different from a rotated state (aligned state) of liquid crystal molecules in the apertures AP of the main pixel MPXb.

Figure 6:
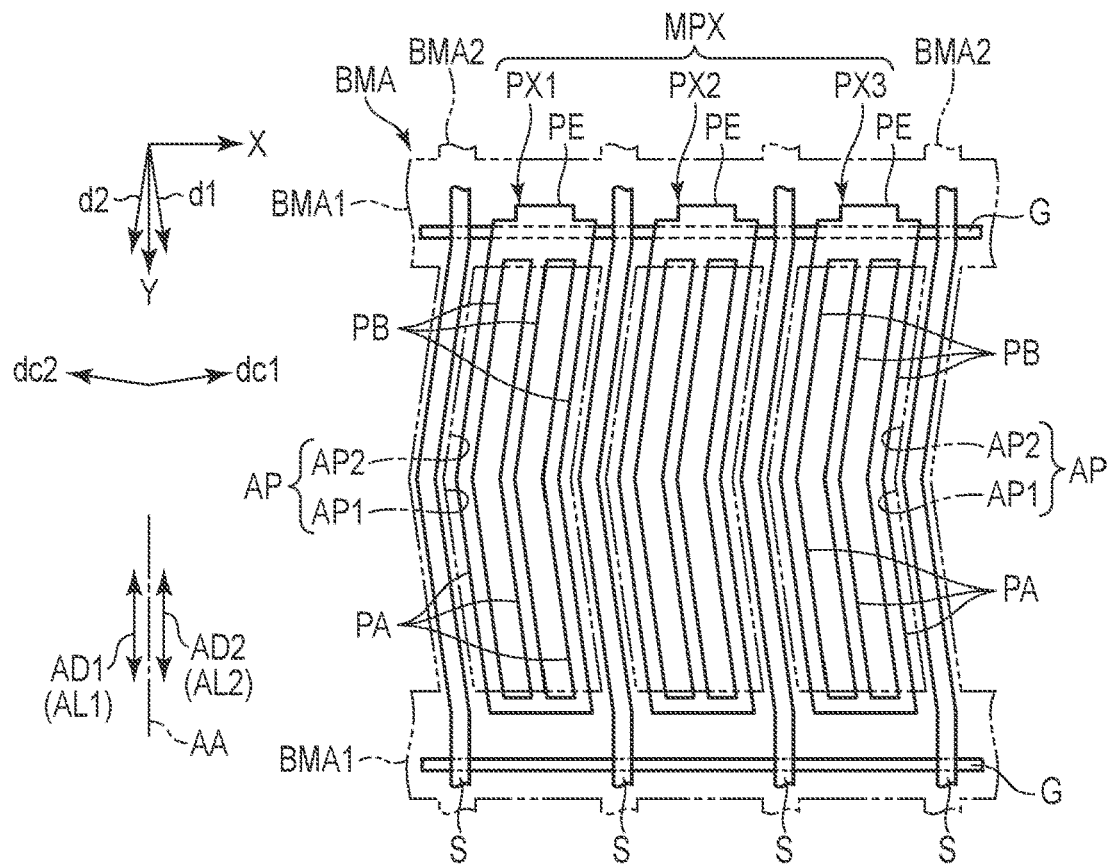
FIG. 6 is a plan view showing a main pixel different from the first embodiment, illustrating a scanning line, a signal line, a pixel electrode, and a light-shielding portion.

As described above, the structure of compensating for the property of viewing angle by one unit pixel UPX has been illustrated in FIG. 4 and FIG. 5. Unlike the first embodiment, however, the structure may compensate for the property of viewing angle by one main pixel MPX. FIG. 6 is a plan view showing a main pixel MPX different from that of the first embodiment, illustrating the scanning lines G, the signal lines S, the pixel electrodes PE, and the light-shielding portion BMA.

As shown in FIG. 6, each aperture AP is shaped in a symbol < and includes a first aperture AP1 and a second aperture AP2. The first aperture AP1 extends in the first extending direction d1, and the second aperture AP2 extends in the second extending direction d2.

The pixel electrode PE comprises a plurality of linear pixel electrodes PA and a plurality of linear pixel electrodes PB. A plurality of linear pixel electrodes PA are located in the first apertures AP1, extend linearly in the first extending direction d1, and are arranged and spaced apart in the orthogonal direction dc1. A plurality of linear pixel electrodes PB are located in the second apertures AP2, extend linearly in the second extending direction d2, and are arranged and spaced apart in the orthogonal direction dc2. One linear pixel electrode PA and one linear pixel electrode PB formed sequentially are shaped in a symbol <.

In planar view in which the pixel PX1 is located on the left side and the pixel PX3 is located on the right side, one linear pixel electrode PA and one linear pixel electrode PB formed sequentially may be shaped in a symbol > and the aperture AP may be shaped in a symbol >.

When a voltage is applied to the liquid crystal layer (LC), a rotated state (aligned state) of liquid crystal molecules in the first apertures AP1 is different from a rotated state (aligned state) of liquid crystal molecules in the second apertures AP2. Each aperture AP has four domains different in rotational direction of the director. For this reason, the liquid crystal panel PNL can obtain a desirable property of viewing angle.

Incidentally, in the first embodiment, the pixel electrodes PE function as display electrodes, and the linear pixel electrodes PA and the linear pixel electrodes PB function as linear display electrodes.

Figure 7:
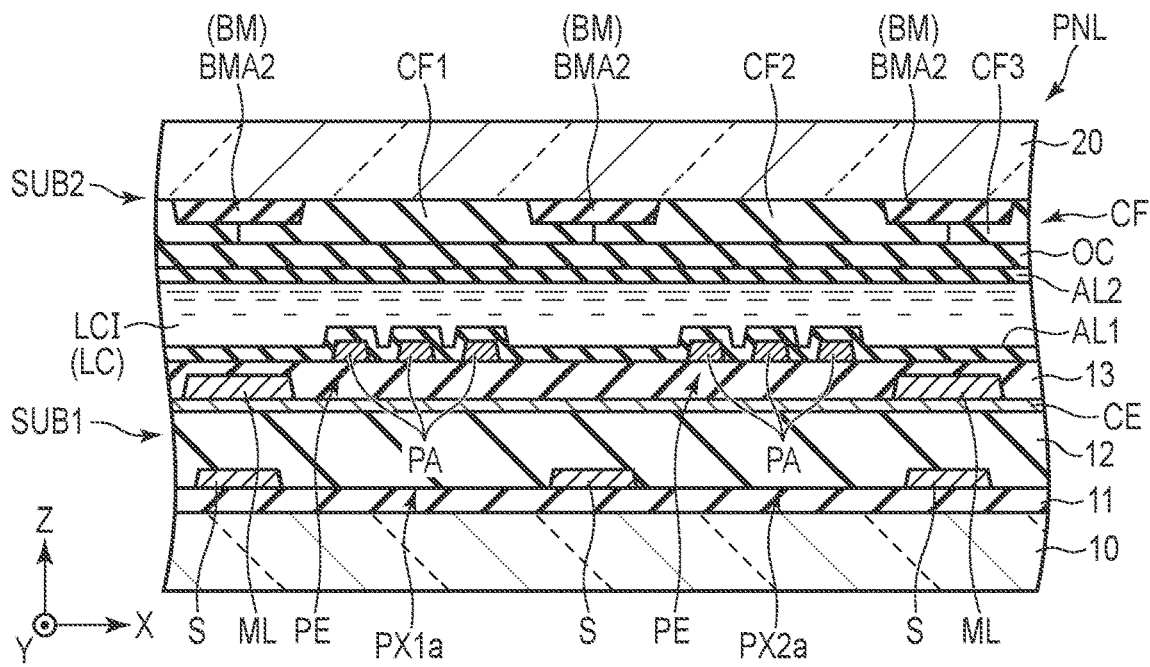
FIG. 7 is a cross-sectional view showing a liquid crystal panel including the pixel shown in FIG. 5.

FIG. 7 is a cross-sectional view showing the liquid crystal panel PNL including the pixels PX1a and PX2a shown in FIG. 5. The liquid crystal panel PNL according to the first embodiment corresponds to the display mode using the lateral electric field.

As shown in FIG. 7, the first substrate SUB1 comprises an insulating layer 11, the signal lines S, an insulating layer 12, the common electrode CE, a metal layer ML, an insulating layer 13, the pixel electrodes PE, and the like between the insulating substrate 10 and the alignment film AL1.

The insulating layer 11 is provided on the insulating substrate 10. The above-described scanning lines (G), gate electrodes and semiconductor layers of the switching elements SW, other insulating layers, and the like are arranged between the insulating substrate 10 and the insulating layer 11, though not described in detail. The signal lines S are formed on the insulating layer 11. The insulating layer 12 is provided on the insulating layer 11 and the signal lines S.

The common electrode CE is provided on the insulating layer 12. The metal layer ML is provided on the common electrode CE and is in contact with the common electrode CE. The metal layer ML is located just above the signal lines S. In the example illustrated, the first substrate SUB1 comprises the metal layer ML but the metal layer ML may be omitted. The insulating layer 13 is provided on the common electrode CE and the metal layer ML.

The pixel electrodes PE are formed on the insulating layer 13. Each of the pixel electrodes PE is located between the adjacent signal lines S and is opposed to the common electrode CE. In addition, each pixel electrode PE has slits at a position opposed to the common electrode CE. The common electrode CE and the pixel electrode PE are formed of a transparent conductive material such as ITO or IZO. The insulating layer 13 is sandwiched between the pixel electrode PE and the common electrode CE. The alignment film AL1 is provided on the insulating layer 13 and the pixel electrodes PE to cover the pixel electrode PE and the like.

In contrast, the second substrate SUB2 comprises the light-shielding layer BM including light-shielding portions BMA2, the color filter CF including colored layers CF1, CF2, and CF3, the transparent layer OC, the alignment film AL2, and the like on the side of the insulating substrate 20 opposed to the first substrate SUB1. The light-shielding portions BMA2 are formed on the inner surface of the insulating substrate 20. The light-shielding portions BMA2 are located just above the signal lines S and the metal layer ML. The colored layers CF1 and CF2 are formed on the inner surface of the insulating substrate 20, and partially overlap the light-shielding portions BMA2. The transparent layer OC covers the color filter CF. The alignment film AL2 covers the transparent layer OC.

Unlike the first embodiment, the liquid crystal panel PNL may be configured without the light-shielding portions BMA2 and BMA1 (FIG. 6) in the display area DA. IN this case, in the display area DA, the metal layer ML may be formed in a grating shape and, instead of the light-shielding portions BMA1 and BMA2, the metal layer ML may be made to comprise the light shielding function.

The liquid crystal layer LC includes a display liquid crystal layer LCI located in the display area DA. For example, in an off state in which no voltage (electric field) is generated between the pixel electrodes PE and the common electrode CE and no voltage is applied to the display liquid crystal layer LCI, in the pixel PX1a, the liquid crystal molecules included in the display liquid crystal layer LCI are subjected to initial alignment in a predetermined direction between the alignment films AL1 and AL2. That is, in the normally-black mode, for example, the pixel PX1a has a minimum transmittance and exhibits black. In the pixel PX1a, the liquid crystal panel PNL exerts the light shielding function.

In contrast, in an on state in which a voltage (electric field) is generated between the pixel electrodes PE and the common electrode CE and a voltage is applied to the display liquid crystal layer LCI, in the pixel PX1a, the liquid crystal molecules are aligned in a direction different from the initial alignment direction, and the alignment direction is controlled by the electric field. In the pixel PX1a, the liquid crystal panel PNL exerts the light transmitting function. For this reason, the pixel PX1a in the on state exhibits a color corresponding to the colored layer CF1.

The above-described mode of the liquid crystal panel PNL is what is called a normally-black mode, which displays black in the off state, but may be what is called a normally-white mode, which displays black in the on state (and displays white in the off state).

In the first embodiment, the electrode closer to the display liquid crystal layer LCI (liquid crystal layer LC), of the pixel electrode PE and the common electrode CE, is the pixel electrode PE, and the pixel electrode PE functions as the display electrode as described above. However, the electrode closer to the display liquid crystal layer LCI (liquid crystal layer LC), of the pixel electrode PE and the common electrode CE, may be the common electrode CE. In this case, the common electrode CE functions as the display electrode as described above and includes linear display electrodes instead of the pixel electrodes PE.

Figure 8:
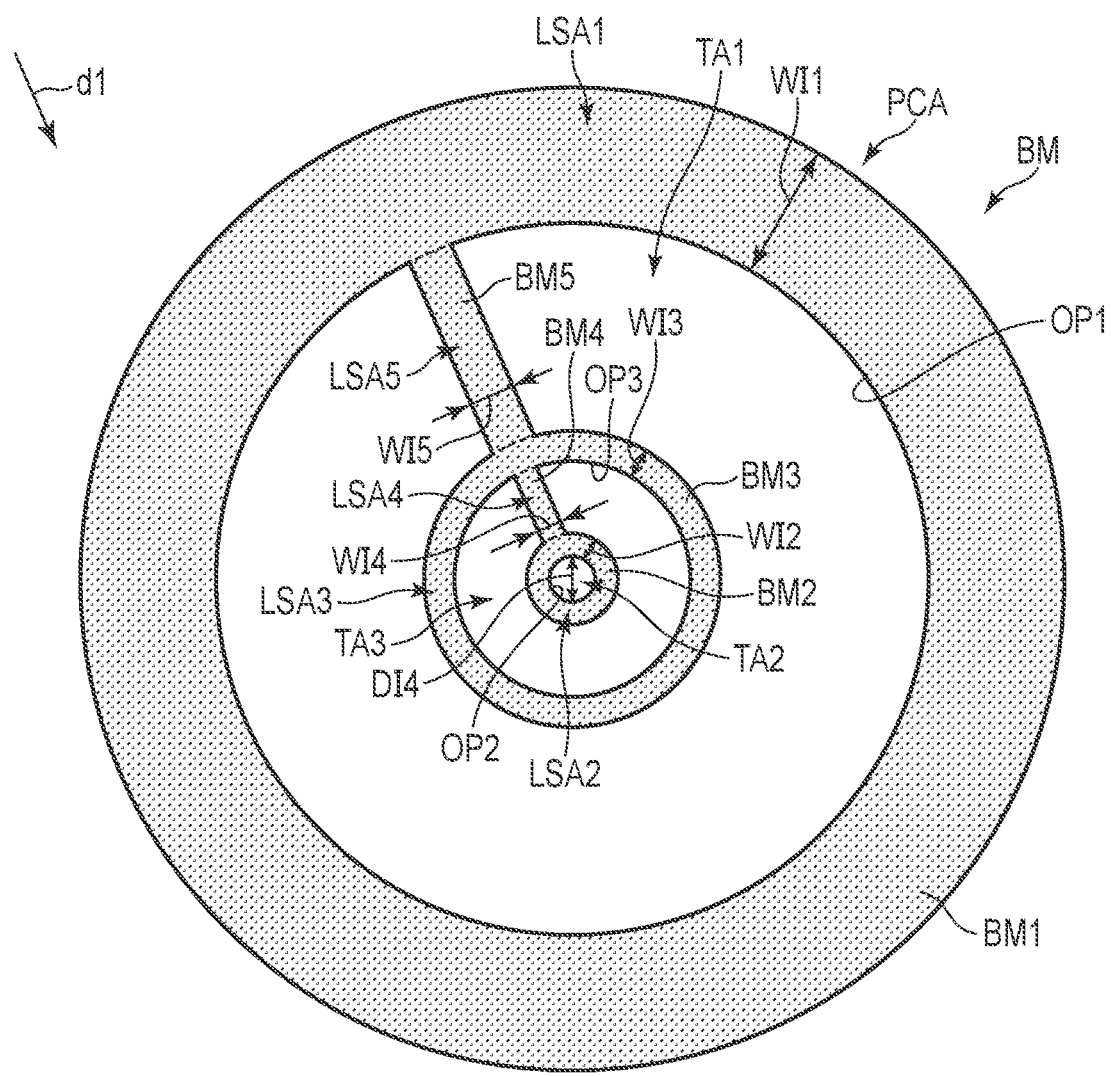
FIG. 8 is a plan view showing a light-shielding layer in an incident light control area of the liquid crystal panel.

FIG. 8 is a plan view showing a light-shielding layer BM in an incident light control area PCA of the liquid crystal panel PNL. As shown in FIG. 8, the incident light control area PCA includes a second incident light control area TA2 in the center, and includes the first light-shielding area LSA1, the first incident light control area TA1, a third light-shielding area LSA3, a third incident light control area TA3, a second light-shielding area LSA2, and the second incident light control area TA2, from the outside to the center.

The first light-shielding area LSA1 is located on the outermost periphery of the incident light control area PCA and has an annular shape. The first incident light control area TA1 is surrounded by the first light-shielding area LSA1, is in contact with the first light-shielding area LSA1, and has an annular shape. The second incident light control area TA2 is located in the center of the incident light control area PCA and has a circular shape. The second light-shielding area LSA2 is in contact with the second incident light control area TA2 to surround the second incident light control area TA2, and has an annular shape. The third light-shielding area LSA3 is surrounded by the first incident light control area TA1, is in contact with the first incident light control area TA1, and has an annular shape. The third incident light control area TA3 is surrounded by the third light-shielding area LSA3, is in contact with the third light-shielding area LSA3 and the second light-shielding area LSA2, and has an annular shape.

In the incident light control area PCA, the light-shielding layer BM includes the first light-shielding portion BM1, the first opening OP1, a second light-shielding portion BM2, a second opening OP2, a third light-shielding portion BM3, and a third opening OP3. The first light-shielding portion BM1 is located in the first light-shielding area LSA1 and has an annular shape. The second light-shielding portion BM2 is located in the second light-shielding area LSA2 and has an annular shape. The third light-shielding portion BM3 is located in the third light-shielding area LSA3 and has an annular shape.

Each light shielding portion of the first light-shielding portion BM1, the second light-shielding portion BM2, and the third light-shielding portion BM3 may be referred to as an annular light shielding portion.

The first opening OP1 is located in the first incident light control area TA1 and has an annular shape. The second opening OP2 is located in the second incident light control area TA2 and has a circular shape. The third opening OP3 is located in the third incident light control area TA3 and has an annular shape.

The incident light control area PCA includes a first annular incident light control portion which is located at the first opening OP1 and at which a first control electrode RL1 and a second control electrode RL2 to be described later are formed, a circular incident light control portion which is located at the second opening OP2 and at which a third control electrode structure RE3 (third control electrode RL3) and a fourth control electrode structure RE4 (fourth control electrode RL4) to be described later are formed, and a second annular incident light control portion which is located at the third opening OP3 and at which a fifth control electrode RL5 and a sixth control electrode RL6 to be described later are formed.

The first annular incident light control portion has an outer periphery which is in contact with the first light-shielding portion BM1 and an inner periphery which is in contact with the third light-shielding portion BM3. An outer periphery of the circular incident light control portion is in contact with the second light-shielding portion BM2. The second annular incident light control portion has an outer periphery which is in contact with the third light-shielding portion BM3 and an inner periphery which is in contact with the second light-shielding portion BM2.

In the first embodiment, the incident light control area PCA further includes a fourth light-shielding area LSA4 and a fifth light-shielding area LSA5. The fourth light-shielding area LSA4 extends linearly in the first extending direction d1 from the second light-shielding area LSA2 to the third light-shielding area LSA3. The fifth light-shielding area LSA5 extends linearly in the first extending direction d1 from the third light-shielding area LSA3 to the first light-shielding area LSA1. The fifth light-shielding area LSA5 is in line with the fourth light-shielding area LSA4 in the first extending direction d1. Based on the above, each of the second incident light control area TA2 and the third incident light control area TA3 is shaped in a substantially C letter.

In the first embodiment, the light-shielding layer BM further includes a fourth light-shielding portion BM4 and a fifth light-shielding portion BM5. The fourth light-shielding portion BM4 is located in the fourth light-shielding area LSA4 and extends linearly in the first extending direction d1 from the second light-shielding portion BM2 to the third light-shielding portion BM3. The fifth light-shielding portion BM5 is located in the fifth light-shielding area LSA5 and extends linearly in the first extending direction d1 from the third light-shielding portion BM3 to the first light-shielding portion BM1.

An outer peripheral circle of the first light-shielding portion BM1, an outer peripheral circle of the first incident light control area TA1, an outer peripheral circle of the second light-shielding portion BM2, the second incident light control area TA2, an outer peripheral circle of the third light-shielding portion BM3, and an outer peripheral circle of the third incident light control area TA3 are concentric circles.

However, the liquid crystal panel PNL may configured without the fourth light-shielding area LSA4, the fifth light-shielding area LSA5, the fourth light-shielding portion BM4, and the fifth light-shielding portion BM5 in the incident light control area PCA. This is because an influence given to the amount of the light by a lead line L to be described later, without providing the fourth light-shielding portion BM4 and the fifth light-shielding portion BM5, is very small and can be corrected.

In addition, the liquid crystal panel PNL may be configured without the third light-shielding area LSA3, the third light-shielding portion BM3, and the third incident light control area TA3. In this case, the first incident light control area TA1 may be in contact with the outer periphery of the second light-shielding area LSA2.

The areas will be explained with examples of concrete numerical values. In the first embodiment, a width WI1 of the first light-shielding portion BM1 is in a range from 800 to 900 μm, a width WI3 of the third light-shielding portion BM3 is in a range from 30 to 40 μm, a width WI2 of the second light-shielding portion BM2 is in a range from 30 to 40 μm, a width WI5 of the fifth light-shielding portion BM5 is in a range from 60 to 70 μm, and a width WI4 of the fourth light-shielding portion BM4 is in a range from 30 to 40 μm, in the radial direction of the incident light control area PCA.

The width WI1 is larger than each of the widths WI3 and WI2. The first width obtained by subtracting the inner diameter from the outer diameter of the first light-shielding portion BM1 is larger than the width obtained by subtracting the inner diameter from the outer diameter of the third light-shielding portion BM3. In addition, the first width is larger than the third width obtained by subtracting the inner diameter from the outer diameter of the second light-shielding portion BM2.

Figure 9:
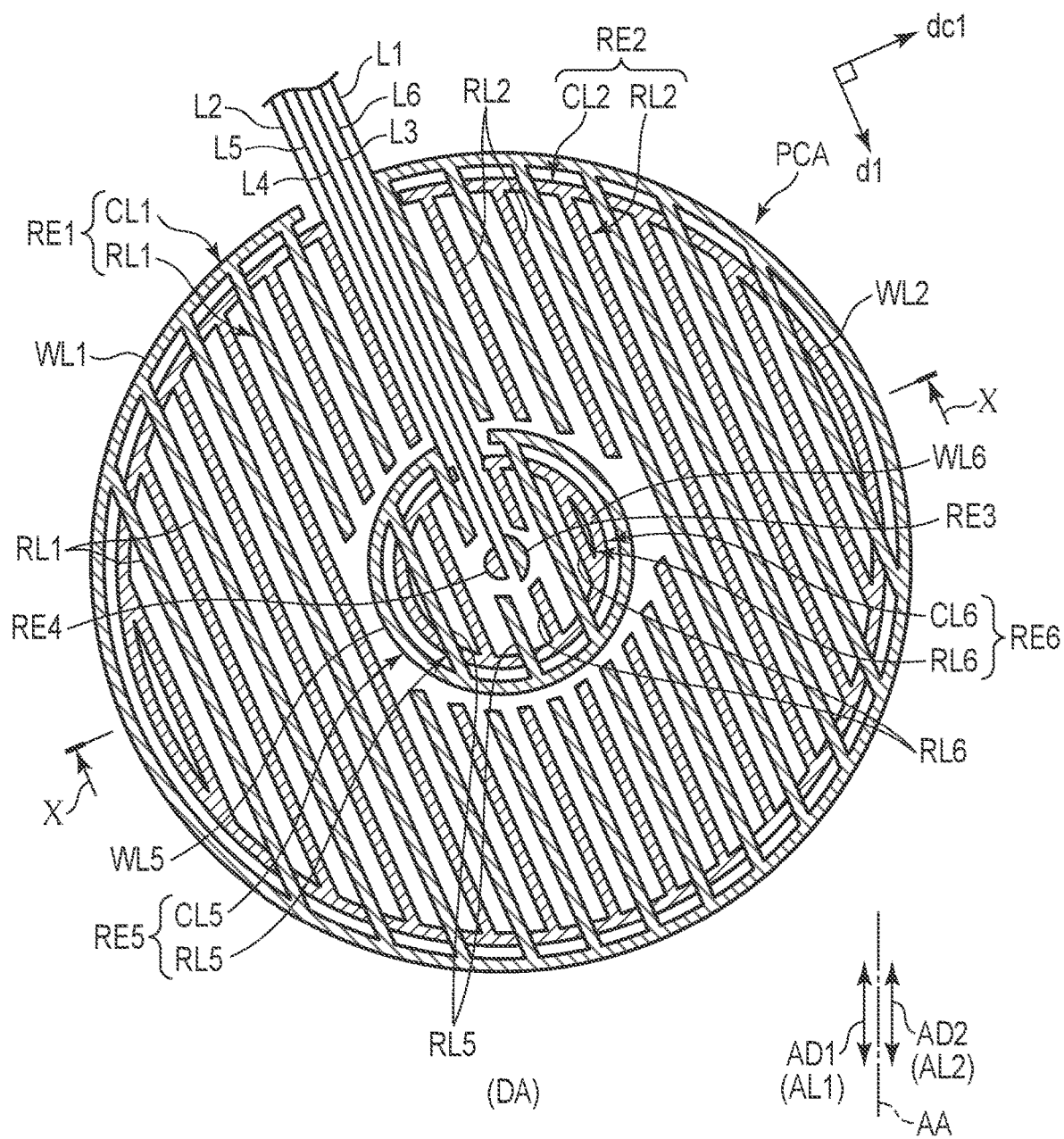
FIG. 9 is a plan view showing a plurality of control electrode structures and a plurality of lead lines of the liquid crystal panel.

FIG. 9 is a plan view showing a plurality of control electrode structures RE and a plurality of lead lines L, illustrating an electrode structure of the incident light control area PCA of the liquid crystal panel PNL. As shown in FIG. 9 and FIG. 8, the liquid crystal panel PNL comprises a first control electrode structure RE1, a second control electrode structure RE2, the third control electrode structure RE3, the fourth control electrode structure RE4, a fifth control electrode structure RE5, a sixth control electrode structure RE6, a first lead line L1, a second lead line L2, a third lead line L3, a fourth lead line L4, a fifth lead line L5, and a sixth lead line L6.

FIG. 9 is a schematic view showing that the electrode has a configuration conforming to the In-Plane Switching (IPS) mode in the incident light control area PCA.

The first control electrode structure RE1 comprises a first power supply line CL1 and the first control electrodes RL1.

The first power supply line CL1 is located in the first light-shielding area LSA1 and includes a first line WL1 having an annular shape. In the first embodiment, the first line WL1 has a C-letter shape and is formed to divide the circular shape in an area where the second lead line L2 to the sixth lead line L6 pass.

A plurality of first control electrodes RL1 are located in the first light-shielding area LSA1 and the first incident light control area TA1, are electrically connected to the first line WL1, extend linearly in the first extending direction d1, and are arranged and spaced apart in the orthogonal direction dc1. In the first embodiment, the first line WL1 and the first control electrode RL1 are formed integrally. The first control electrode RL1 is arranged inside the first line WL1.

A plurality of first control electrodes RL1 include two types of control electrodes, and one of the types includes the first control electrode RL1 having both ends connected to the first line WL1 while the other includes the first control electrode RL1 having one end connected to the first line WL1 and the other end not connected to the first line WL1.

The second control electrode structure RE2 comprises a second power supply line CL2 and the second control electrodes RL2.

The second power supply line CL2 is located in the first light-shielding area LSA1 and includes a second line WL2 having an annular shape. In the first embodiment, the second line WL2 has a C-letter shape and is formed to divide the circular shape in an area where the third lead line L3 to the sixth lead line L6 pass. The second line WL2 is adjacent to the first line WL1. An inner diameter of the second line WL2 is smaller than an inner diameter of the first line WL1. In the first embodiment, the second line WL2 is located on an inner side than the first line WL1 but may be located on an outer side than the first line WL1. In this case, the inner diameter of the second line WL2 may be larger than the inner diameter of the first line WL1.

A plurality of second control electrodes RL2 are located in the first light-shielding area LSA1 and the first incident light control area TA1, are electrically connected to the second line WL2, extend linearly in the first extending direction d1, and are arranged and spaced apart in the orthogonal direction dc1. In the first embodiment, the second line WL2 and the second control electrodes RL2 are formed integrally. The second control electrode RL2 is arranged inside the second line WL2.

A plurality of second control electrodes RL2 include two types of control electrodes, and one of the types includes the second control electrode RL2 having both ends connected to the second line WL2 while the other includes the second control electrode RL2 having one end connected to the second line WL2 and the other end not connected to the second line WL2.

A plurality of first control electrodes RL1 and a plurality of second control electrodes RL2 are arranged alternately in the orthogonal direction dc1.

The third control electrode structure RE3 and the fourth control electrode structure RE4 are located in the second light-shielding area LSA2 and the second incident light control area TA2. The third control electrode structure RE3 and the fourth control electrode structure RE4 are shown as semicircular shapes having parallel sides in the first extending direction d1. The side of the third control electrode structure RE3 and the side of the fourth control electrode structure RE4 are located and spaced apart in the orthogonal direction dc1. Incidentally, approximate shapes of the third control electrode structure RE3 and the fourth control electrode structure RE4 are shown as semicircular shapes but their detailed structures will be described later.

The fifth control electrode structure RE5 comprises a fifth power supply line CL5 and fifth control electrodes RL5.

The fifth power supply line CL5 is located in the third light-shielding area LSA3 and includes a fifth line WL5 having an annular shape. In the first embodiment, the fifth line WL5 has a C-letter shape and is formed to divide the circular shape in an area where the third lead line L3, the fourth lead line L4, and the sixth lead line L6 pass.

A plurality of fifth control electrodes RL5 are located in the third light-shielding area LSA3 and the third incident light control area TA3, are electrically connected to the fifth line WL5, extend linearly in the first extending direction d1, and are arranged and spaced apart in the orthogonal direction dc1. In the first embodiment, the fifth line WL5 and the fifth control electrode RL5 are formed integrally. The fifth control electrode RL5 is arranged inside the fifth line WL5.

A plurality of fifth control electrodes RL5 include two types of control electrodes, and one of the types includes the fifth control electrode RL5 having both ends connected to the fifth line WL5 while the other includes the fifth control electrode RL5 having one end connected to the fifth line WL5 and the other end not connected to the fifth line WL5.

The sixth control electrode structure RE6 comprises a sixth power supply line CL6 and sixth control electrodes RL6.

The sixth power supply line CL6 is located in the third light-shielding area LSA3 and includes a sixth line WL6 having an annular shape. In the first embodiment, the sixth line WL6 has a C-letter shape and is formed to divide the circular shape in an area where the third lead line L3 and the fourth lead line L4 pass. The sixth line WL6 is adjacent to the fifth line WL5. An inner diameter of the fifth line WL5 is smaller than an inner diameter of the second line WL2. An inner diameter of the sixth line WL6 is smaller than an inner diameter of the fifth line WL5. In the first embodiment, the sixth line WL6 is located on an inner side than the fifth line WL5 but may be located on an outer side than the fifth line WL5. In this case, the inner diameter of the sixth line WL6 may be larger than the inner diameter of the fifth line WL5.

A plurality of sixth control electrodes RL6 are located in the third light-shielding area LSA3 and the third incident light control area TA3, are electrically connected to the sixth line WL6, extend linearly in the first extending direction d1, and are arranged and spaced apart in the orthogonal direction dc1. In the first embodiment, the sixth line WL6 and the sixth control electrode RL6 are formed integrally. The sixth control electrode RL6 is arranged inside the sixth line WL6.

A plurality of sixth control electrodes RL6 include two types of control electrodes, and one of the types includes the sixth control electrode RL6 having both ends connected to the sixth line WL6 while the other includes the sixth control electrode RL6 having one end connected to the sixth line WL6 and the other end not connected to the sixth line WL6.

A plurality of fifth control electrodes RL5 and a plurality of sixth control electrodes RL6 are arranged alternately in the orthogonal direction dc1.

The liquid crystal panel PNL has a configuration conforming to the In-Plane Switching (IPS) mode, which is one of the display modes using the lateral electric field in the incident light control area PCA. Each of the above-described first control electrode RL1 to sixth control electrode RL6 has a shape different from the above-described shape of the pixel electrode PE conforming to the FFS mode.

As represented by the first control electrode RL1 and the second control electrode RL2, voltages are supplied to the alternately arranged control electrodes, and the liquid crystal molecules are driven by the potential difference generated between the electrodes. For example, it is possible to extend the line from the display area DA, supply the same video signal as that of the pixel electrode to the first control electrode RL1 and supply the same common voltage as that of the common electrode to the second control electrode RL2. In addition, it is possible to supply a signal positive to the common voltage to the first control electrode RL1 and supply a negative signal to the second control electrode RL2.

In the incident light control area PCA, the above-described alignment films AL1 and AL2 have an alignment axis AA parallel to the direction Y. That is, the alignment axis AA of the alignment films AL1 and AL2 is parallel in the display area DA and the incident light control area PCA. In the incident light control area PCA, the alignment direction AD1 of the alignment film AL1 is parallel to the direction Y, and the alignment direction AD2 of the alignment film AL2 is parallel to the alignment direction AD1.

In a state in which a voltage is not applied to the liquid crystal layer LC, the initial alignment direction of the liquid crystal molecules of the display area DA is the same as the initial alignment direction of the liquid crystal molecules of the incident light control area PCA. The above-described linear pixel electrodes (linear display electrodes) PA and the control electrodes RL extend in parallel. On the X-Y plane of the first embodiment, each of the first extending direction d1 and the second extending direction d2 is inclined to the direction Y at 10 degrees. For this reason, the direction of rotation of the liquid crystal molecules can be arranged by the display area DA and the incident light control area PCA. The inclination of the linear pixel electrodes PA has been described. However, the above-described matters are the same in a case of replacing the inclination of the linear pixel electrodes PA with the inclination of the slit of the common electrode.

Figure 10:
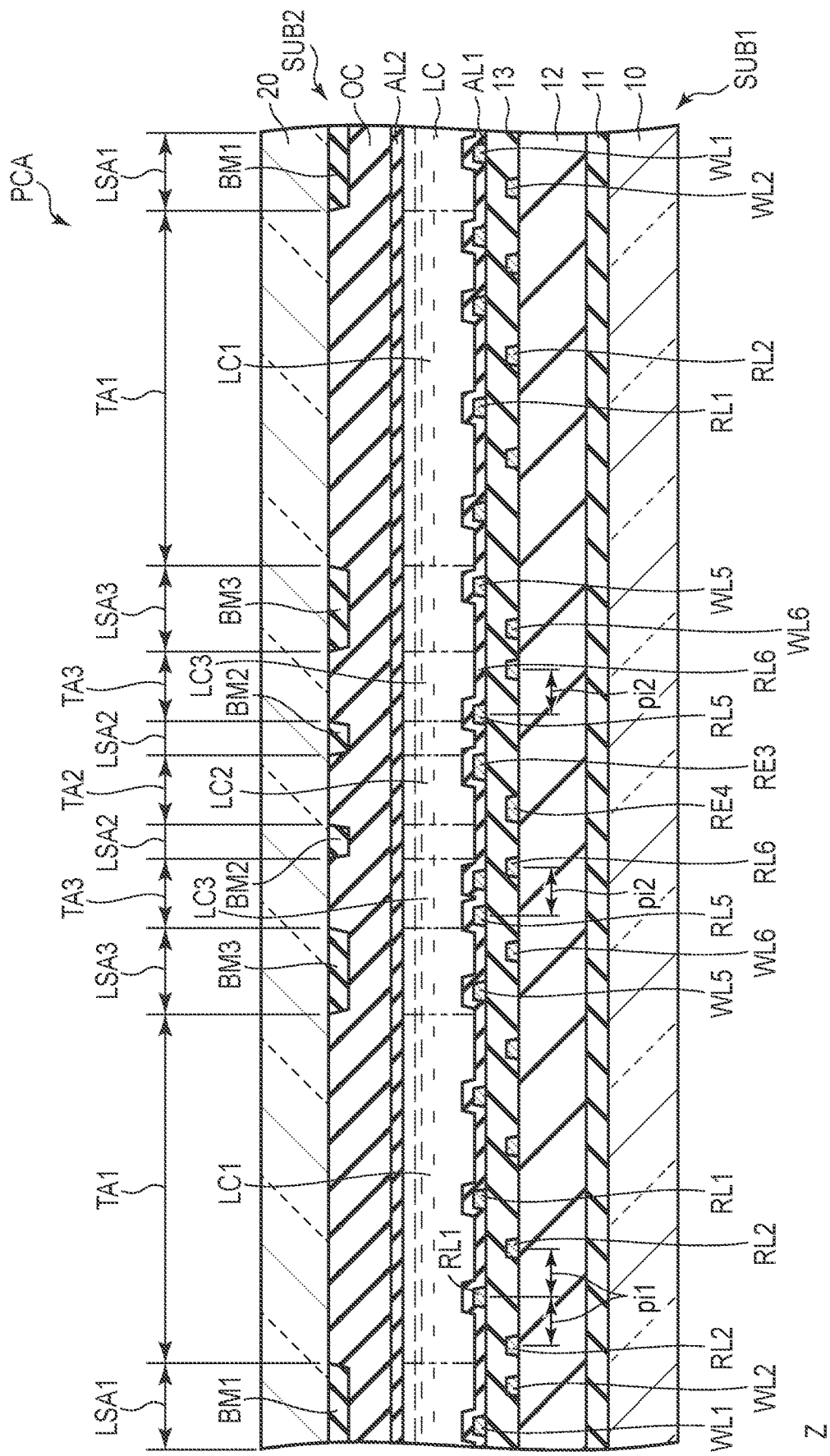
FIG. 10 is a cross-sectional view showing the incident light control area of the liquid crystal panel.

FIG. 10 is a cross-sectional view showing the incident light control area PCA of the liquid crystal panel PNL. In FIG. 10, illustration of the signal lines S, the scanning lines G, and the like is omitted. As shown in FIG. 10, the insulating layer 13 is sandwiched between one or more conductors, of the first wiring line WL1, the first control electrode RL1, the second line WL2, the second control electrode RL2, the third control electrode structure RE3, the fourth control electrode structure RE4, the fifth line WL5, the fifth control electrode RL5, the sixth line WL6, and the sixth control electrode RL6, and the remaining conductors of the first wiring line WL1, the first control electrode RL1, the second line WL2, the second control electrode RL2, the third control electrode structure RE3, the fourth control electrode structure RE4, the fifth line WL5, the fifth control electrode RL5, the sixth line WL6, and the sixth control electrode RL6.

The above-mentioned one or more conductors are provided in the same layer as one of the pixel electrode PE and the common electrode CE, and is formed of the same material as the one of the electrodes. The remaining conductors are provided in the same layer as the other of the pixel electrode PE and the common electrode CE, and is formed of the same material as the other of the electrodes.

In the first embodiment, the second line WL2, the second control electrode RL2, the fourth control electrode structure RE4, the sixth line WL6, and the sixth control electrode RL6 are provided on the insulating layer 12 and covered with the insulating layer 13. The second line WL2, the second control electrode RL2, the fourth control electrode structure RE4, the sixth line WL6, and the sixth control electrode RL6 are provided in the same layer as the common electrode CE and formed of the same transparent conductive material as the common electrode CE.

The first line WL1, the first control electrode RL1, the third control electrode structure RE3, the fifth line WL5, and the fifth control electrode RL5 are provided on the insulating layer 13 and covered with the alignment film AL1. The first control electrode RL1, the third control electrode structure RE3, the fifth line WL5, and the fifth control electrode RL5 are provided in the same layer as the pixel electrode PE and formed of the same transparent conductive material as the pixel electrode PE.

For example, the insulating layer 13 is sandwiched between the first control electrode RL1 (first control electrode structure RE1) and the second control electrode RL2 (second control electrode structure RE2).

In the incident light control area PCA, the first to sixth lead lines L1 to L6 extend in the first extending direction d1. The first to sixth lead lines L1 to L6 are formed of a metal. For example, the first to sixth lead lines L1 to L6 are located in the same layer as the above-mentioned metal layer ML and formed of the same material as the metal layer ML.

The first lead line L1 is electrically connected to the first line WL1 (first power supply line CL1). The second lead line L2 passes through a separated part of the first line WL1 and is electrically connected to the second line WL2 (second power supply line CL2).

The third lead line L3 passes between separated parts of the first line WL1, second line WL2, fifth line WL5, and sixth line WL6, and the first lead line L1 and second lead line L2 and is electrically connected to the third control electrode structure RE3. The fourth lead line L4 passes between separated parts of the first line WL1, second line WL2, fifth line WL5, and sixth line WL6, and the second lead line L2 and third lead line L3 and is electrically connected to the fourth control electrode structure RE4.

The fifth lead line L5 passes between separated parts of the first line WL1 and second line WL2, and the second lead line L2 and fourth lead line L4 and is electrically connected to the fifth line WL5 (fifth power supply line CL5). The sixth lead line L6 passes between separated parts of the first line WL1, second line WL2 and fifth line WL5, and the first lead line L1 and third lead line L3 and is electrically connected to the sixth line WL6 (sixth power supply line CL6).

The first to sixth lead lines L1 to L6 are bundled to cause an area covered with one light-shielding portion (BMA2) in the display area DA to extend. However, the first to sixth lead lines L1 to L6 may not be bundled, and each of the first to sixth lead lines L1 to L6 may cause at least one of the light-shielding portions BMA1 and BMA2 to extend in the display area DA.

Incidentally, the first power supply line CL1, the second power supply line CL2, the fifth power supply line CL5, the sixth power supply line CL6, and the first to sixth lead lines L1 to L6 may be formed of a stacked layer body of transparent conductive layers and metal layers.

As described with reference to FIG. 7, the pixel electrodes PE and the common electrode CE in the display area DA are formed of a transparent conductive material (transparent conductive film), and the pixel PX includes transparent conductive films of two different layers. As described later, the first line WL1 to the sixth line WL6 can be formed of one of the transparent conductive films of two layers, and the first control electrode RL1 to the sixth control electrode RL6 can be formed of the other transparent conductive film, to enable the first control electrode RL1 to the sixth control electrode RL6 to be formed in the same layer. Incidentally, the first line WL1 to the sixth line WL6 can also be formed of multi-layered films of the transparent conductive films and metal films.

In the incident light control area PCA, the alignment film AL1 covers the first line WL1, the first control electrode RL1, the second line WL2, the second control electrode RL2, the third control electrode structure RE3, fourth control electrode structure RE4, the fifth line WL5, the fifth control electrode RL5, the sixth line WL6, and the sixth control electrode RL6 and is in contact with the liquid crystal layer LC.

A pitch in the orthogonal direction dc1 between the first control electrode RL1 and the second control electrode RL2 is referred to as a pitch pi1, and a pitch in the orthogonal direction dc1 between the fifth control electrode RL5 and the sixth control electrode RL6 is referred to as a pitch pi2. In other words, the pitch pi1 is a pitch in the orthogonal direction dc1 between a center of the first control electrodes RL1 and a center of the second control electrode RL2. The pitch pi2 is a pitch in the orthogonal direction dc1 between a center of the fifth control electrodes RL5 and a center of the sixth control electrode RL6.

Each of the pitches pi1 and pi2 may be constant but, desirably, is set at random. Optical interference caused when the pitches pi1 and pi2 are set to be constant can be thereby prevented.

In the second substrate SUB2, the color filter CF is not provided in the incident light control area PCA.

The liquid crystal layer LC includes a first control liquid crystal layer LC1 located in the first incident light control area TA1, a second control liquid crystal layer LC2 located in the second incident light control area TA2, and a third control liquid crystal layer LC3 located in the third incident light control area TA3.

A voltage generated by the first control electrode RL1 and the second control electrode RL2 is applied to the first control liquid crystal layer LC1. A voltage generated by the third control electrode structure RE3 and the fourth control electrode structure RE4 is applied to the second control liquid crystal layer LC2. A voltage generated by the fifth control electrode RL5 and the sixth control electrode RL6 is applied to the third control liquid crystal layer LC3.

In the first embodiment, voltages (electric fields) generated between a plurality of first control electrodes RL1 and a plurality of second control electrodes RL2 are applied to the first control liquid crystal layer LC1. A voltage (electric field) generated between the third control electrode structure RE3 and the fourth control electrode structure RE4 is applied to the second control liquid crystal layer LC2. Voltages (electric fields) generated between a plurality of fifth control electrodes RL5 and a plurality of sixth control electrodes RL6 are applied to the third control liquid crystal layer LC3.

A first control voltage is supplied to the first control electrode structure RE1 via the first lead line L1, a second control voltage is supplied to the second control electrode structure RE2 via the second lead line L2, a third control voltage is supplied to the third control electrode structure RE3 via the third lead line L3, a fourth control voltage is supplied to the fourth control electrode structure RE4 via the fourth lead line L4, a fifth control voltage is supplied to the fifth control electrode structure RE5 via the fifth lead line L5, and a sixth control voltage is supplied to the sixth control electrode structure RE6 via the sixth lead line L6.

The voltage levels of the first control voltage, the third control voltage, and the fifth control voltage may be the same as the voltage level of either of the image signal and the common voltage, and the voltage levels of the second control voltage, the fourth control voltage, and the sixth control voltage may be the same as the voltage level of the other of the image signal and the common voltage.

Alternatively, the first control voltage, the third control voltage, and the fifth control voltage may have a voltage level of a first polarity to the common voltage, and the second control voltage, the fourth control voltage, and the sixth control voltage may have a voltage level of a second polarity to the common voltage. Incidentally, one of the first polarity and the second polarity is a positive polarity while the other is a negative polarity.

A state of an opening of a diaphragm DP will be defined before the incident light control area PCA is described as the diaphragm DP. The liquid crystal display device DSP sets the diaphragm DP to a state (open state) of opening at the maximum level by drive under a first condition. The liquid crystal display device DSP sets the diaphragm DP to a state of narrowing at the minimum level by drive under a second condition. The liquid crystal display device DSP sets the diaphragm DP to a middle state between the state of opening at the maximum level and the state of narrowing at the minimum level by drive under a third condition. The liquid crystal display device DSP sets the diaphragm DP to a closed state by drive under a fourth condition.

As described above, the incident light control area PCA includes the first incident light control area TA1, the third incident light control area TA3, and the second incident light control area TA2 from the outside to the center, and transmissive/non-transmissive states of the first incident light control area TA1, the third incident light control area TA3, and the second incident light control area TA2 conforming to the first to fourth conditions are as follows.

For example, when the first control liquid crystal layer LC1, the second control liquid crystal layer LC2, and the third control liquid crystal layer LC3 are driven under the first condition, the liquid crystal panel PNL sets the first incident light control area TA1, the second incident light control area TA2, and the third incident light control area TA3 to a transmissive state.

When the first control liquid crystal layer LC1, the second control liquid crystal layer LC2, and the third control liquid crystal layer LC3 are driven under the second condition, the liquid crystal panel PNL sets the second incident light control area TA2 to the transmissive state and set the first incident light control area TA1 and the third incident light control area TA3 to the non-transmissive state.

When the first control liquid crystal layer LC1, the second control liquid crystal layer LC2, and the third control liquid crystal layer LC3 are driven under the third condition, the liquid crystal panel PNL sets the third incident light control area TA3 and the second incident light control area TA2 to the transmissive state and sets the first incident light control area TA1 to the non-transmissive state.

When the first control liquid crystal layer LC1, the second control liquid crystal layer LC2, and the third control liquid crystal layer LC3 are driven under the fourth condition, the liquid crystal panel PNL sets the first incident light control area TA1, the third incident light control area TA3, and the second incident light control area TA2 to the non-transmissive state. The non-transmissive state refers to a light-shielding state or a state in which the transmittance is lower than that of the transmissive state.

Based on the above, the incident light control area PCA of the liquid crystal panel PNL constitutes a diaphragm of the camera 1. For this reason, the diaphragm can be opened (first condition), narrowed (third condition), further narrowed (second condition), or closed (fourth condition), and images can be captured by the camera 1 while changing the depth of focus. The liquid crystal panel PNL can concentrically open or narrow the diaphragm. In other words, the liquid crystal panel PNL can concentrically control the light transmissive area in the incident light control area PCA.

The diaphragm under the second condition can function as a pinhole which adjusts the amount of light incident on the camera 1. When the distance between the camera 1 and the subject is several cm, the resolution of the camera 1 can be improved and clear images can be captured at a point-blank range from the subject. As an example of imaging in a case where the subject is close to the camera 1, a fingerprint can be captured for fingerprint authentication. In addition, in a case of a large amount of light, imaging using a pinhole is effective.

According to the liquid crystal display device DSP and the electronic device 100 according to the first embodiment configured as described above, the liquid crystal display device DSP and the electronic device 100 capable of controlling the light transmissive area of the incident light control area PCA can be obtained.

Second Embodiment

Figure 11:
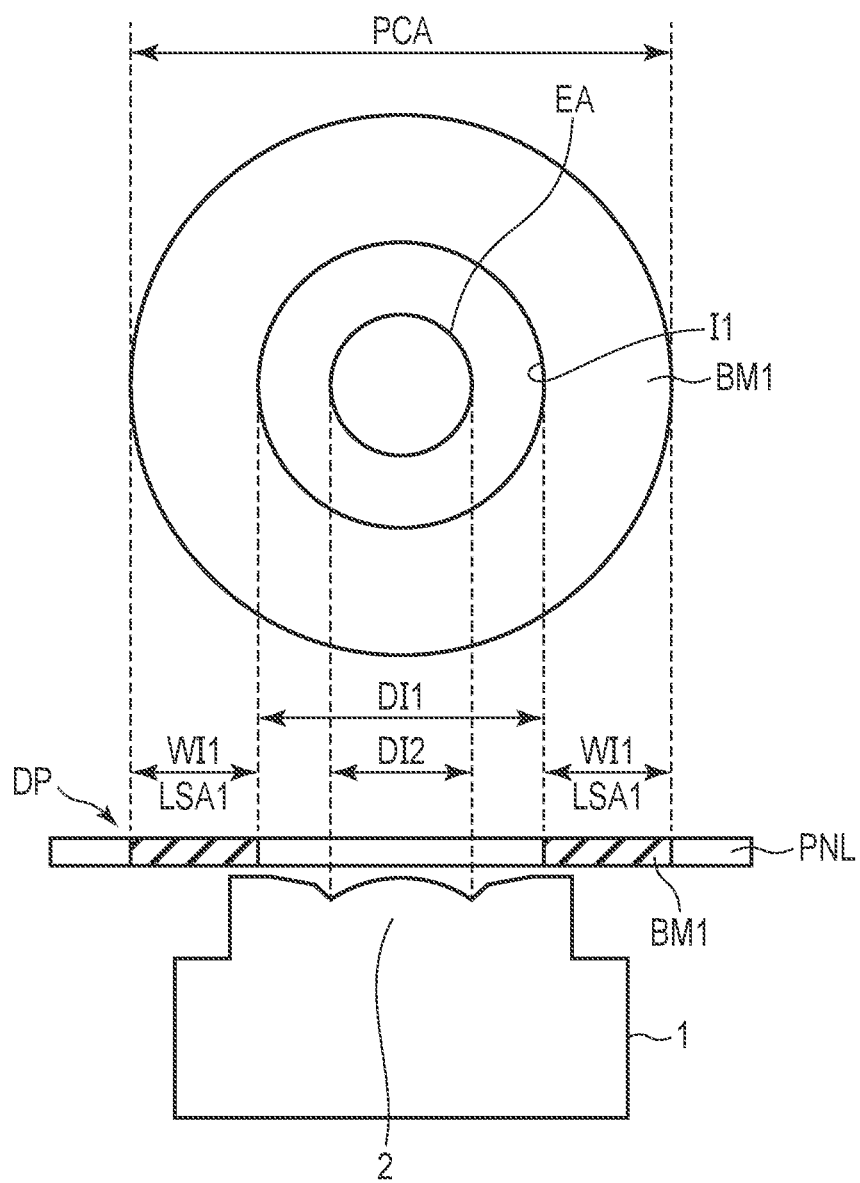
FIG. 11 is a view showing a part of the liquid crystal panel and a camera of an electronic device according to a second embodiment, together with a plan view of the liquid crystal panel and the camera, and a cross-sectional view of the liquid crystal panel and the camera.

Next, a second embodiment will be described. An electronic device 100 is constituted similarly to the first embodiment except for constituent elements described in the second embodiment. FIG. 11 is a view showing a part of the liquid crystal panel PNL and the camera 1 of the electronic device 100 according to the second embodiment, together with a plan view of the liquid crystal panel PNL and the camera 1, and a cross-sectional view of the liquid crystal panel PNL and the camera 1. In the drawing, an outer shape of the camera 1 is shown. As regards the light-shielding layer BM, the only first light-shielding portion BM1 in the incident light control area PCA is shown.

As shown in FIG. 11, the liquid crystal panel PNL constitutes the diaphragm DP which concentrically changes the light transmissive area in the incident light control area PCA. The diaphragm DP is located in front of the camera 1 (i.e., on a side of a cover glass DP of a liquid crystal display device DSP) such that the light passing through the diaphragm DP is made incident on the camera 1. The diaphragm DP can control the amount of the light incident on the camera 1 by using the function of controlling the amount of the transmitted light of the liquid crystal panel PNL. As described below, an outer diameter of the diaphragm DP is determined based on a diameter DI2 of an effective opening EA of the optical system 2 (camera 1), and an inner diameter DI1 of the first light-shielding portion BM1 is larger than the diameter DI2 of the effective opening EA of the optical system 2 (camera 1). The first light-shielding portion BM1 is formed outside the outer periphery of the diaphragm DP to block unnecessary light. Since the boundary is clear, the outer periphery of the diaphragm DP will be described with reference to the inner periphery I1 of the first light-shielding portion BM1. The diaphragm DP can increase or decrease the amount of the light incident on the camera 1 by blocking the light on the inner side of the inner periphery I1 of the first light-shielding portion BM1. The first light-shielding portion BM1 having the width WI1 surrounds the effective opening EA and covers the first light-shielding area LSA1 which is not used for display of the periphery of the camera 1.

Figure 12:
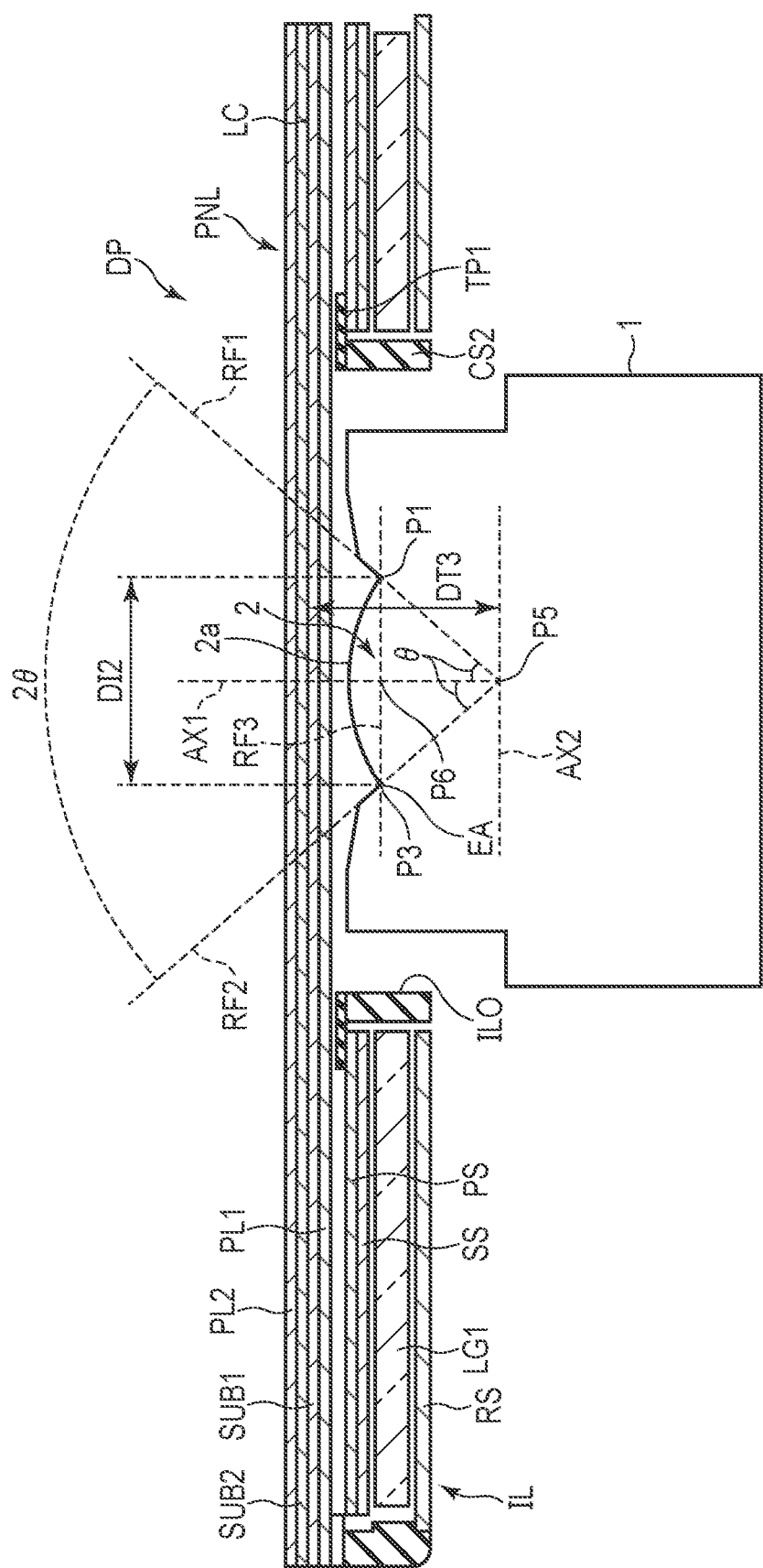
FIG. 12 is a cross-sectional view showing a part of the liquid crystal panel, a part of an illumination device, and the camera according to the second embodiment.

FIG. 12 is a cross-sectional view showing a part of the liquid crystal panel PNL, a part of the illumination device IL, and the camera 1 according to the second embodiment.

The liquid crystal panel PNL comprises a first substrate SUB1, a second substrate SUB2, a liquid crystal layer LC, a polarizer PL1, a polarizer PL2, and the like. In the figure, the liquid crystal layer LC is represented by a line between the first substrate SUB1 and the second substrate SUB2.

The illumination device IL comprises a light guide LG1 which causes the light from the light source EM1 to be emitted as planar light, a light reflective sheet RS which reflects the light from the light guide LG1 to the liquid crystal panel PNL side, an optical sheet which controls the direction of the light from the light guide LG1, and the like. The optical sheet includes, for example, a light diffusion sheet SS and a prism sheet PS. The prism sheet PS may include a prism sheet PS1 and a prism sheet PS2 shown in FIG. 2.

In the illumination device IL, an opening ILO at which the camera 1 is arranged is formed, and a light-shielding wall CS2 is arranged between the light guide LG1, etc. and the opening ILO. The adhesive tape TP1 is stuck to the light-shielding wall CS2 to fix the prism sheet PS. The adhesive tape TP1 also comprises a function of blocking unnecessary light near the light-shielding wall CS2. In addition, the illumination device IL comprises a resin frame FR located at a peripheral portion of the illumination device IL to accommodate the light guide LG1 and the like.

The camera 1 is arranged near the end portion of the liquid crystal panel PNL.

Next, an angle of the light incident on the effective opening EA of the camera 1 will be described. The angle of the light in a virtual plane including a central axis AX1 of the optical system 2 (camera 1) and an orthogonal axis AX2 orthogonal to the central axis AX1 as shown in FIG. 12 will be defined and described.

A point on the outermost periphery of the effective opening EA of the optical system 2 is referred to as a first point P1. A straight line passing at the first point P1 is referred to as a first reference line RF1. The other point on the outermost periphery of the effective opening EA is referred to as a third point P3. A straight line passing at the third point P3 is referred to as a second reference line RF2. A straight line passing at the first point P1, the central axis AX1, and the third point P3 is referred to as a third reference line RF3. A point where the first reference line RF1 intersects the second reference line RF2 is referred to as a fifth point P5. A point where the central axis AX1 intersects the third reference line RF3 is referred to as a sixth point P6.

The sixth point P6 is also a center of the effective opening EA. The central axis AX1 is orthogonal to the third reference line RF3. In addition, the central axis AX1 is a line perpendicular to a plane formed by the effective opening EA and, in general, optical axis of the camera 1 (optical system 2). The first reference line RF1 and the second reference line RF2 are also optical paths of the outermost optical beam of the luminous flux used for capturing, which is determined by the focal length of the camera 1 and the size of the above-mentioned imaging surface 3a.

The effective opening EA has a circle symmetry with the central axis AX1. The central axis AX1 passes at fifth point P5. The first reference line RF1 intersects the central axis AX1 at an angle θ. The second reference line RF2 also intersects the central axis AX1 at the angle θ. Incidentally, a double of the angle θ, i.e., angle 2θ is an angle of view according to the camera 1.

The light-shielding wall CS2 is adjacent to the camera 1 in the direction parallel to a third reference line RF3. The light-shielding wall CS2 is located between the camera 1 and the light guide LG1 and has a cylindrical shape.

Figure 13:
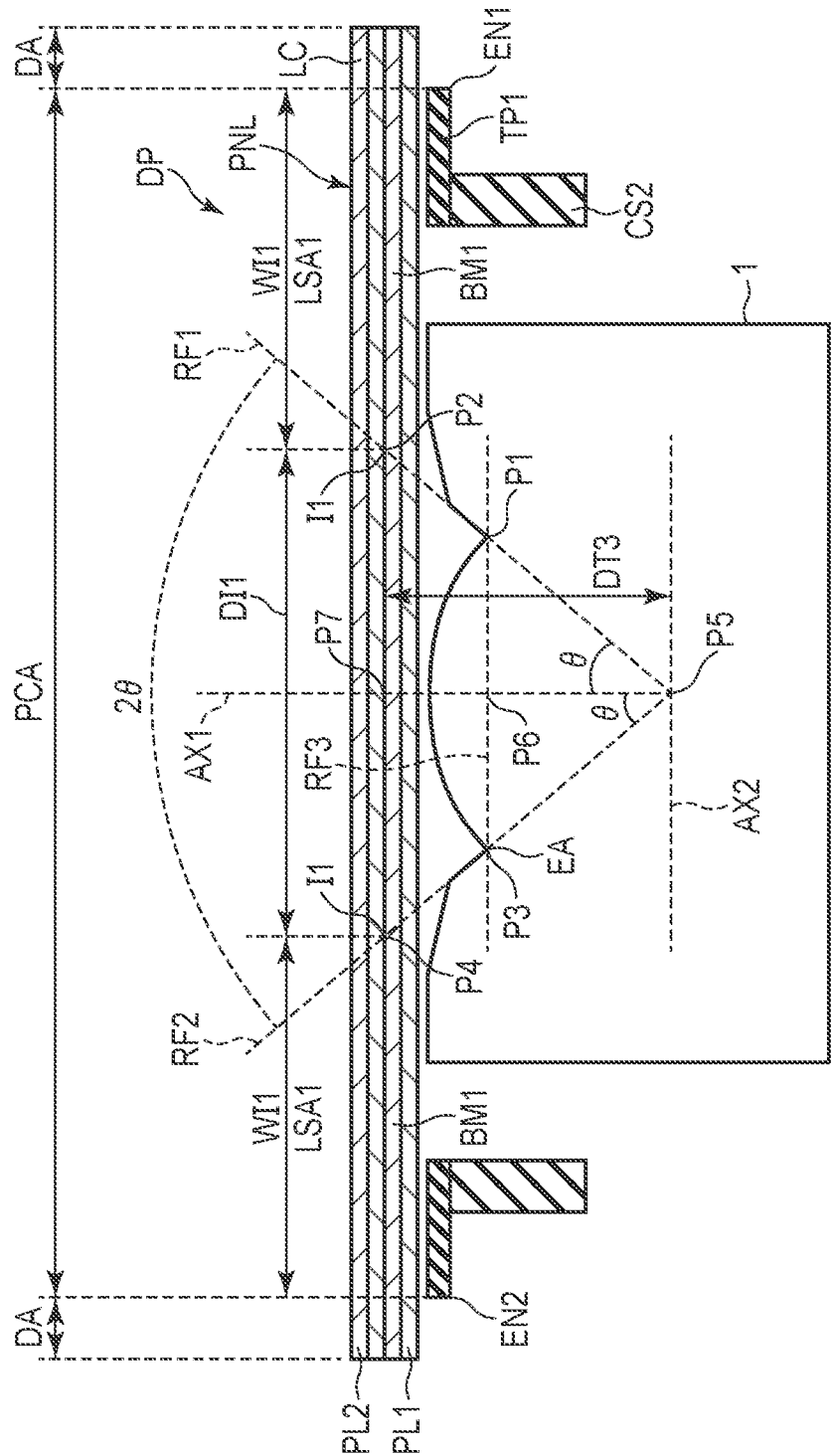
FIG. 13 is another cross-sectional view showing a part of the liquid crystal panel, a part of the illumination device, and the camera according to the second embodiment.

Next, a third distance DT3 and the inner diameter DI1 will be described. The third distance DT3 is a linear distance on the central axis AX1 from the fifth point P5 to the opening (second opening OP2) of the light-shielding layer BM. FIG. 13 is another cross-sectional view showing a part of the liquid crystal panel PNL, a part of the illumination device IL, and the camera 1 according to the second embodiment. The angle of the light in a virtual plane including the central axis AX1 and the orthogonal axis AX2 will be defined and described here, too.

As shown in FIG. 13, a point on the inner periphery I1 of the first light-shielding portion BM1 close to the first point P1 is referred to as a second point P2. A point on the inner periphery I1 of the first light-shielding portion BM1 close to the third point P3 is referred to as a fourth point P4. The first reference line RF1 is a straight line passing at the first point P1 and the second point P2. The second reference line RF2 is a straight line passing at the third point P3 and the fourth point P4.

The light beam intersecting the central axis AX1 at an angle smaller than or equal to the angle θ, of the light traveling from the side outer than the second point P2 (right side in the figure) to the camera 1, is not made incident on the effective opening EA since the light beam passes outside the effective opening EA. In addition, the light beam intersecting the central axis AX1 at an angle smaller than or equal to the angle θ, of the light traveling from the side outer than the fourth point P4 (left side in the figure) to the camera 1, is not made incident on the effective opening EA. Even when the first incident light control area (TA1) is located on the right side of the second point P2 and the left side of the fourth point P4, the amount of the light incident on the effective opening EA is hardly influenced.

Therefore, the periphery formed by the point where the line intersecting the central axis AX1 at the angle θ and passing the outermost periphery of the effective opening EA, which is represented by the first reference line RF1, intersects the liquid crystal layer LC, is the effective maximum inner diameter of the diaphragm DP.

The liquid crystal layer LC does not comprise the light-shielding function. For light shielding, the functions of the liquid crystal layer LC, the polarizer PL1, the polarizer PL2, and the like need to be combined. Strictly speaking, it is considered that the liquid crystal layer LC is not the diaphragm DP, but the diaphragm DP is formed in the liquid crystal layer LC. Furthermore, since the boundary is clarified, it is assumed that the inside of the opening of the first light-shielding portion BM1 refers to the diaphragm DP in a plane formed by the first light-shielding portion BM1. Incidentally, the color filter CF, the transparent layer OC, and the alignment film AL2 are provided between the liquid crystal layer LC and the light-shielding layer BM as shown in FIG. 7. However, since a total of their thicknesses is several μm, it is assumed that the liquid crystal layer LC and the light-shielding layer BM are provided in the same plane. The first light-shielding portion BM1 having the width WI1 blocks the unnecessary light near the outer periphery of the incident light control area PCA. For this reason, the inner periphery I1 can also be considered as the outermost periphery of the diaphragm DP.

Furthermore, the optical path of the outermost light beam can also be considered to be on the first reference line RF1 and the second reference line RF2. That is, the optical path of the outermost light beam is a line connecting the outermost periphery of the constituent element which functions as the diaphragm DP to the outermost periphery of the effective opening EA of the camera 1.

A point located at the opening (second opening OP2) of the light-shielding layer BM on the central axis AX1 is referred to as a seventh point P7. When a triangle formed by the fifth point P5, the second point P2, and the seventh point P7 and a triangle formed by the fifth point P5, the fourth point P4, and the seventh point P7 are focused, the following relationship holds.

$$DI1/2 = DT3 \times \tan\theta$$

As the third distance DT3 from the fifth point P5 to the seventh point P7 is longer, the inner diameter DI1 of the first light-shielding portion BM1 becomes longer. Therefore, when the inner diameter DI1 needs to be smaller, the camera 1 needs to be closer to the liquid crystal panel PNL.

The liquid crystal panel PNL is not irradiated with the light from the illumination device IL, inside the area surrounded by the light-shielding wall CS2. For this reason, the first light-shielding portion BM1 is arranged in the first light-shielding area LSA1 (i.e., the range indicated by the width WI1 from the second point P2 to the end EN1 on the light-irradiated area side of the adhesive tape TP1, and a range indicated by the width WI1 from the fourth point P4 to the end EN2 on the light-irradiated area side of the adhesive tape TP1). This is because the first light-shielding area LSA1 is an area which is not used for the diaphragm DP or display.

To form the display area DA as large as possible, the first light-shielding portion BM1 needs to be made as small as possible. By providing the camera 1 closely to the liquid crystal panel PNL, the inner diameter DI1 can be made smaller and the area surrounded by the first light-shielding portion BM1 can be made smaller.

Next, a relationship between the inner diameter DI1 of the first light-shielding portion BM1 and the diameter DI2 of the effective opening EA of the camera 1 will be described. FIG. 14 is a cross-sectional view showing a part of the liquid crystal panel PNL, and the camera 1 according to the second embodiment. To simplify the figure, the first light-shielding portion BM1 is represented by a sold line and the liquid crystal layer LC at the opening of the first light-shielding portion BM1 is represented by a dashed line, on the liquid crystal panel PNL. The angle of the light in a virtual plane including the central axis AX1 and the orthogonal axis AX2 will be defined and described here, too.

As shown in FIG. 14, a linear distance on the central axis AX1 from the fifth point P5 to the sixth point P6 is referred to as a first distance DT1. A linear distance on the central axis AX1 from the sixth point P6 to a seventh point P7 (opening of the light-shielding layer BM) is referred to as a second distance DT2. The inner diameter DI1 and the diameter DI2 can be obtained from the following relational equations.

$$DI1/2 = DT3 \times \tan\theta$$

$$DI2/2 = DT1 \times \tan\theta$$

The following relationship holds by the above relational equations.

$$DI1/DI2 = DT3/DT1$$

For example, when the inner diameter DI1 is set to be smaller than or equal to a double of the diameter DI2, the second distance DT2 (DT3−DT1) needs to be shorter than the first distance DT1.

Opening the diaphragm DP has been described in FIG. 14 (first condition). For this reason, in the incident light control area PCA, all the first incident light control area TA1, the second incident light control area TA2, and the third incident light control area TA3 are set to the transmissive state (FIG. 8).

Next, narrowing the diaphragm DP will be described (third condition). For this reason, in the incident light control area PCA, the second incident light control area TA2 and the third incident light control area TA3 are set to the transmissive state, and the first incident light control area TA1 is set to the non-transmissive state (FIG. 8). FIG. 15 is the other cross-sectional view showing a part of the liquid crystal panel PNL, and the camera 1 according to the second embodiment. To simplify the figure, the first light-shielding portion BM1 and the third light-shielding portion BM3 are represented by sold lines and the liquid crystal layer LC other than the first light-shielding portion BM1 and the third light-shielding portion BM3 is represented by a dashed line, on the liquid crystal panel PNL. The angle of the light in a virtual plane including the central axis AX1 and the orthogonal axis AX2 will be defined and described here, too.

As shown in FIG. 15, when the light beam incident on the camera 1 is narrowed by making the opening of the diaphragm DP smaller, an oblique incident light beam intersecting the central axis AX1 at a large angle is reduced as compared with the incident light beam intersecting the central axis AX1 at a small angle. For this reason, a problem arises that the amount of light at the peripheral portion of an image of the camera 1 decreases.

Then, an inner diameter DI3 of the third light-shielding portion BM3 to prevent the oblique incident light beam from being extremely reduced will be reviewed. A straight line which is parallel to the second reference line RF2 and which passes at the first point P1 is referred to as a fourth reference line RF4. A straight line which is parallel to the first reference line RF1 and which passes at the third point P3 is referred to as a fifth reference line RF5. A point where the fourth reference line RF4 intersects the light-shielding layer BM is referred to as an eighth point P8. A point where the fifth reference line RF5 intersects the light-shielding layer BM is referred to as a ninth point P9.

When the fourth reference line RF4 is focused, light on an outer side than the fourth reference line RF4 with respect to the effective opening EA, of the light (oblique light beam OL1) intersecting the central axis AX1 at the angle θ, is not made incident on the effective opening EA. For this reason, even when the light is blocked on the outer side (right side in the figure) than the eighth point P8, the oblique light beam OL1 does not increase or decrease. Thus, the inner periphery I3 of the third light-shielding portion BM3 is located at the eighth point P8.

Similarly, when the fifth reference line RF5 is focused, light on an outer side than the fifth reference line RF5 with respect to the effective opening EA, of the light (oblique light beam OL2) intersecting the central axis AX1 at the angle θ, is not made incident on the effective opening EA. For this reason, even when the light is blocked on the outer side (left side in the figure) from the ninth point P9, the oblique light beam OL2 does not increase or decrease. On the other hand, the inner periphery I3 of the third light-shielding portion BM3 is located at the ninth point P9. However, when the light is blocked on an outer side than the ninth point P9, the light on an outer side than the ninth point P9, of the oblique light beam OL1, is blocked.

The inner diameter DI3 of the third light-shielding portion BM3 matches a distance between the eighth point P8 and the ninth point P9 to prevent the amount of the light at the peripheral part of the image of the camera 1 from being extremely reduced.

Figure 16:
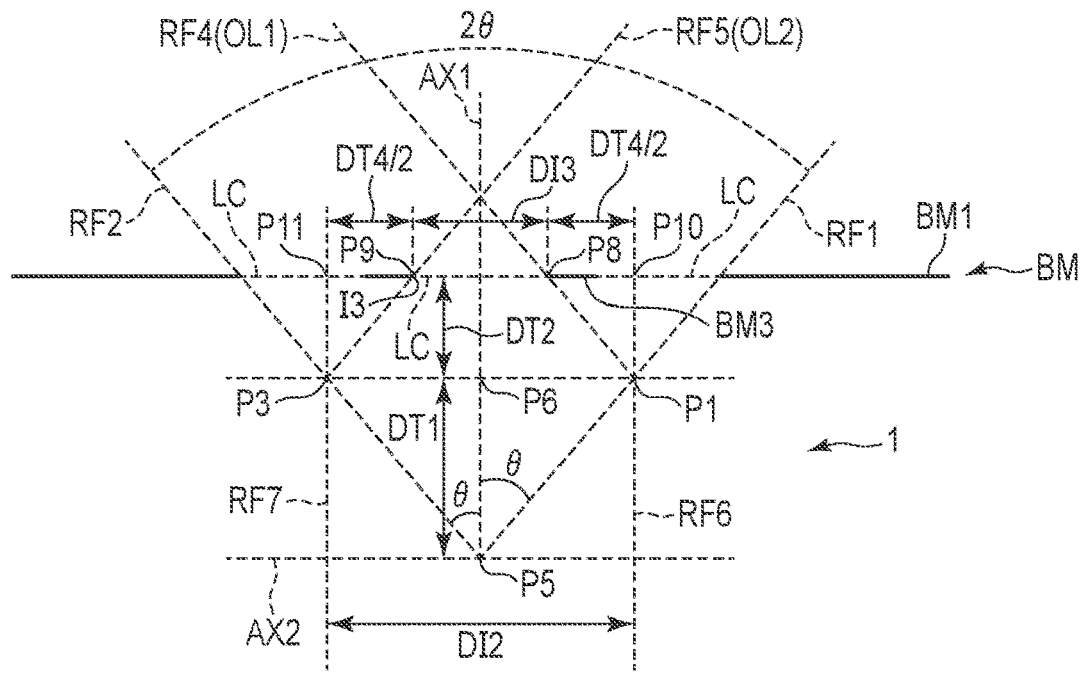
FIG. 16 is a cross-sectional view showing a position of a part of the liquid crystal panel and the camera according to the second embodiment.

Next, the area inside the inner periphery I3 in a case of narrowing the diaphragm DP will be described (third condition). FIG. 16 is a cross-sectional view showing a position of a part of the liquid crystal panel PNL and the camera 1 according to the second embodiment. To simplify the figure, the first light-shielding portion BM1 and the third light-shielding portion BM3 are represented by sold lines and the liquid crystal layer LC other than the first light-shielding portion BM1 and the third light-shielding portion BM3 is represented by a dashed line, on the liquid crystal panel PNL. The angle of the light in a virtual plane including the central axis AX1 and the orthogonal axis AX2 will be defined and described here, too.

As shown in FIG. 16, a straight line passing at the first point P1 and which is parallel to the central axis AX1 is referred to as a sixth reference line RF6. A straight line which passes at the third point P3 and which is parallel to the central axis AX1 is referred to as a seventh reference line RF7. A point where the sixth reference line RF6 intersects the liquid crystal layer LC is referred to as a tenth point P10. A point where the seventh reference line RF7 intersects the liquid crystal layer LC is referred to as an eleventh point P11.

Since the fourth reference line RF4 intersects the central axis AX1 at the angle θ, the triangle having the first point P1, the eighth point P8, and the tenth point P10 as vertexes is similar to the triangle having the fifth point P5, the first point P1, and the sixth point P6 as vertexes. Since the fifth reference line RF5 also intersects the central axis AX1 at the angle θ, the triangle having the third point P3, the ninth point P9, and the eleventh point P11 as vertexes is similar to the triangle having the fifth point P5, the third point P3, and the sixth point P6 as vertexes.

A linear distance from the first point P1 to the tenth point P10 is referred to as a second distance DT2. In addition, each of a linear distance from the eighth point P8 to the tenth point P10 and a linear distance from the ninth point P9 to the eleventh point P11 is referred to as a distance DT4/2. A linear distance which is a double of the distance DT4/2 is referred to as a fourth distance DT4. A relationship DT4/DT2=DI2/DT1 holds, and then DT4=DI2×(DT2/DT1).

Based on a relationship DT4=DI2−DI3, DI2×(DT2/DT1)=DI2−DI3, DI2 (1−DT2/DT1)=DI3, and then a relationship DI3/DI2=1−(DT2/DT1) holds.

When the second distance DT2 is set to 50% of the first distance DT1, DI3/DI2=0.5.

In this case, since the radius is 50%, the area inside the inner periphery I3 of the third light-shielding portion BM3 is 0.25% of the area of the effective opening EA.

Furthermore, when the second distance DT2 is set to 60% of the first distance DT1, DI3=0.4×DI2 and the area inside the inner periphery I3 is 0.16% of the area of the effective opening EA.

Since a relationship DT4=DI2×(DT2/DT1) holds, DT4=DI2 and the area inside the inner periphery I3 is 0 when DT2=DT1. For this reason, the first distance DT1 needs to be longer than the second distance DT2 to implement the opening inside the inner periphery I3 (DT1>DT2).

Figure 17:
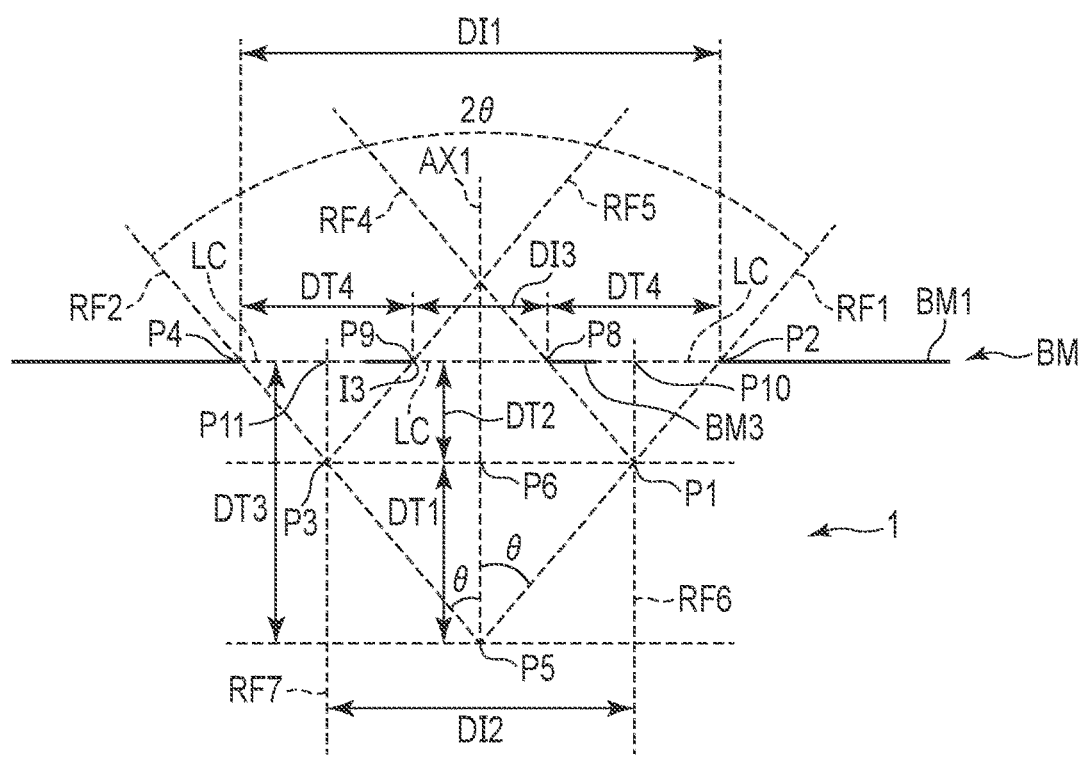
FIG. 17 is another cross-sectional view showing a position of a part of the liquid crystal panel and the camera according to the second embodiment.

Next, a relationship between the inner diameter DI1 of the first light-shielding portion BM1 and the inner diameter DI3 of the third light-shielding portion BM3 will be described. FIG. 17 is the other cross-sectional view showing a position of a part of the liquid crystal panel PNL and the camera 1 according to the second embodiment. To simplify the figure, the first light-shielding portion BM1 and the third light-shielding portion BM3 are represented by sold lines and the liquid crystal layer LC other than the first light-shielding portion BM1 and the third light-shielding portion BM3 is represented by a dashed line, on the liquid crystal panel PNL. The angle of the light in a virtual plane including the central axis AX1 and the orthogonal axis AX2 will be defined and described here, too.

As shown in FIG. 17, the triangle having the first point P1, the eighth point P8, and the tenth point P10 as vertexes is similar to a triangle having the fifth point P5, the second point P2, and the seventh point P7 as vertexes. Incidentally, the triangle having the third point P3, the ninth point P9, and the eleventh point P11 as vertexes is similar to a triangle having the fifth point P5, the fourth point P4, and the seventh point P7 as vertexes.

Based on the above,
a relationship DT4/DT2=DI1/DT3 holds, and DT4=(DI1×DT2)/DT3.

Based on a relationship DI3=DI1−(2×DT4), DI3=DI1−(2×DI1×DT2)/DT3, and a relationship DI3/DI1=1−(2×DT2)/DT3 holds.

For example, when the second distance DT2 is set to 25% of the second distance DT3, DI3=0.5×DI1.

In addition, when the second distance DT2 is set to 50% of the first distance DT1, the third distance DT3 is 150% of the first distance DT1. Since the second distance DT2 is one third of the third distance DT3, DI3=DI1/3.

Figure 18:
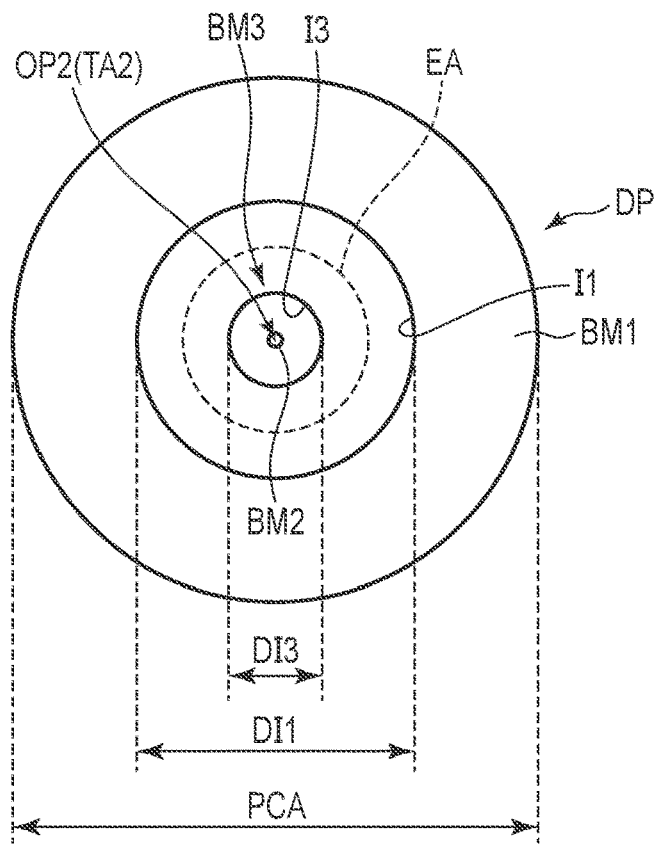
FIG. 18 is a plan view showing an incident light control area of the liquid crystal panel, and the camera according to the second embodiment.

FIG. 18 is a plan view showing an incident light control area PCA of the liquid crystal panel PNL, and the camera 1 according to the second embodiment. In the figure, the liquid crystal panel PNL is located on the front side, and the camera 1 is located on the back side. It is assumed here that the inner diameter DI3 of the third light-shielding portion BM3 is one third of the inner diameter DI1 of the first light-shielding portion BM1.

As shown in FIG. 18, for example, when the inner diameter DI1 is 1.8 mm, the inner diameter DI3 is 0.6 mm. The second opening OP2 (second incident light control area TA2) surrounded by the second light-shielding portion BM2 is provided inside the inner periphery I3 of the third light-shielding portion BM3, which is also shown in FIG. 8. The second opening OP2 is, for example, an opening having a diameter of 0.2 mm, which is used for pinhole imaging. For this reason, the inner diameter DI4 of the second light-shielding portion BM2 shown in FIG. 8 is 0.2 mm. The second opening OP2 is a comparatively small. For this reason, alignment of the liquid crystal panel PNL and the camera 1 can be executed with the light passing through the second opening OP2.

Figure 19:
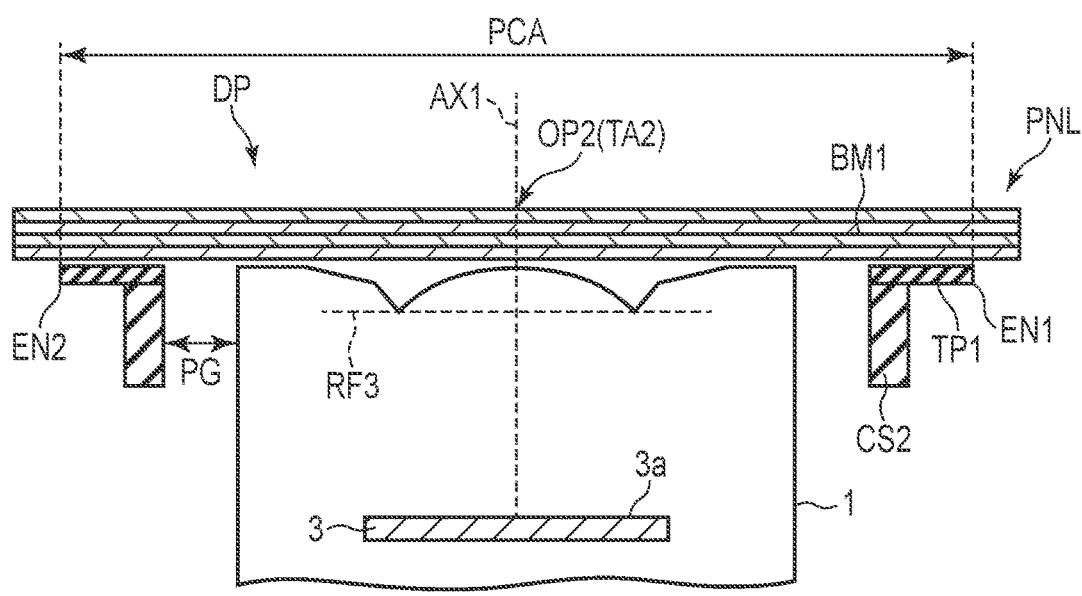
FIG. 19 is a cross-sectional view showing a part of the liquid crystal panel, a part of the illumination device, and the camera according to the second embodiment.

Next, alignment of the liquid crystal panel PNL and the camera 1 will be described. FIG. 19 is a cross-sectional view showing a part of the liquid crystal panel PNL, a part of the illumination device IL, and the camera 1 according to the second embodiment.

As shown in FIG. 19, the light is made incident on the camera 1 from the opening having the area limited by the diaphragm DP. For this reason, when the center of the incident light control area PCA is displaced from the central axis AX1 of the optical system 2, a problem arises that the light considered necessary does not reach the imaging surface 3a. For this reason, the center of the incident light control area PCA and the central axis AX1 need to be aligned with a high accuracy.

Therefore, to improve the accuracy for alignment, the second opening OP2, which is the smallest of the openings of the incident light control area PCA, is used. That is, the diaphragm DP is further narrowed (third condition) and, in the incident light control area PCA, the second incident light control area TA2 is set to the transmissive state, and the first incident light control area TA1 and the third incident light control area TA3 are set to the non-transmissive state (FIG. 8).

The light transmitted through the second opening OP2 (second incident light control area TA2) can be detected on the imaging surface 3a by applying parallel light such as laser light or LED light perpendicularly to the liquid crystal panel PNL. Then, the degree of coincidence of the center of the incident light control area PCA and the central axis AX1 can be measured and the alignment can be executed, based on the intensity of the light of the area where the central axis AX1 passes, of the imaging surface 3a.

When the center of the incident light control area PCA and the central axis AX1 can be aligned with a high accuracy, a peripheral gap PG between the camera 1 and the light-shielding wall CS2 can be narrowed. The peripheral gap PG refers to a gap from the camera 1 to the light-shielding wall CS2, in the direction parallel to the third reference line RF3. The size of the diaphragm DP (incident light control area PCA) including the first light-shielding portion BM1 can be thereby reduced.

Thus, to narrow the peripheral gap PG, the inner diameter DI4 of the second light-shielding portion BM2 (diameter of the second opening OP2) is, desirably, much shorter than the peripheral gap PG (DI4<PG) (FIG. 8).

Desirably, the inner diameter DI4 is longer than or equal to 0.1 mm to prevent optical diffraction (0.1 mm≤DI4) (FIG. 8).

According to the electronic device 100 of the second embodiment configured as described above, the electronic device 100 capable of desirably imaging can be obtained.

Third Embodiment

Figure 20:
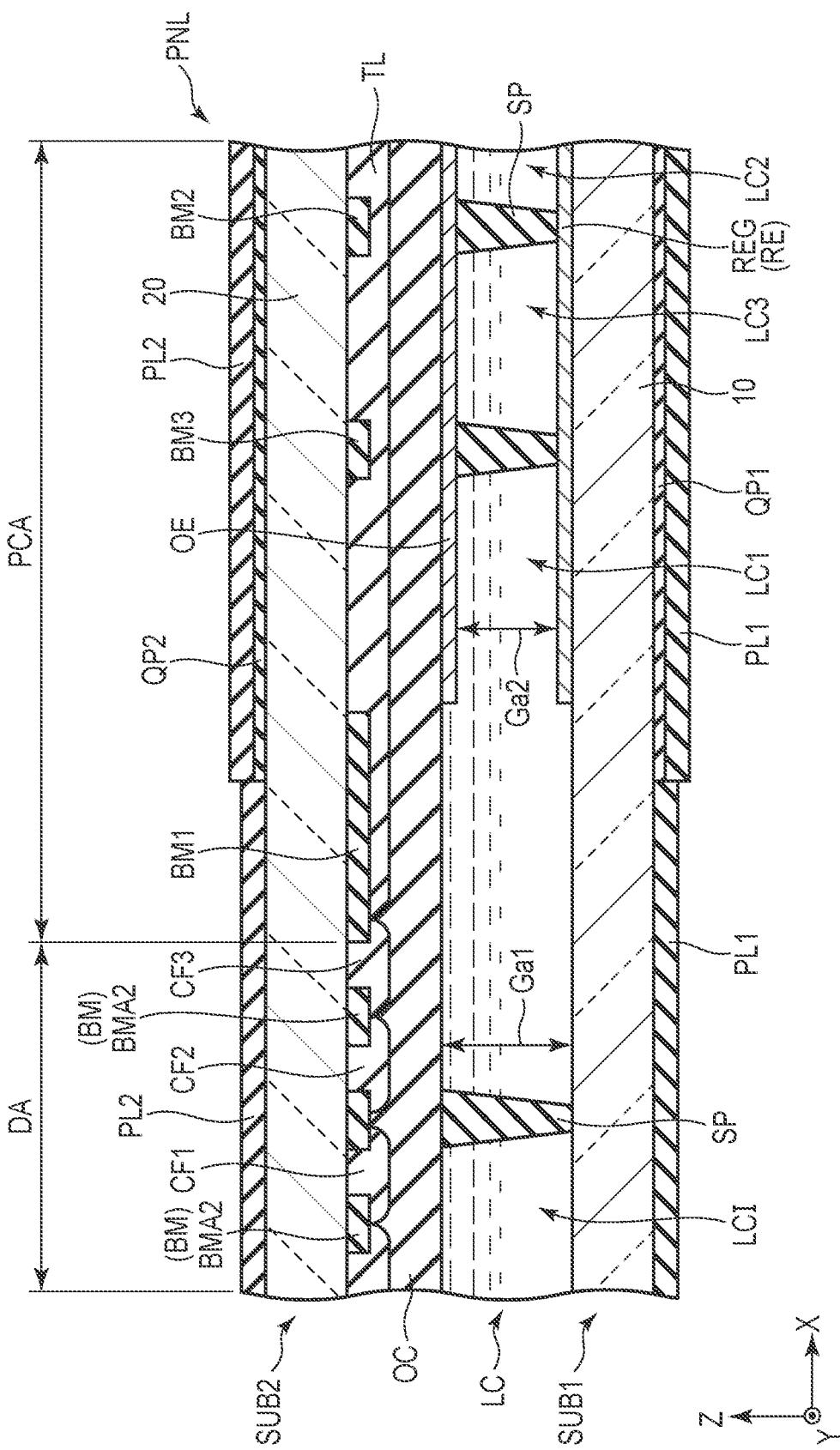
FIG. 20 is a cross-sectional view showing a part of a liquid crystal panel of an electronic device according to a third embodiment.

Next, a third embodiment will be described. An electronic device 100 is constituted similarly to the first embodiment except for constituent elements related to a longitudinal electric field mode described in the third embodiment. FIG. 20 is a cross-sectional view showing a part of a liquid crystal panel PNL of an electronic device 100 according to the third embodiment. FIG. 20 shows a boundary area between the display area DA and the incident light control area PCA. In addition, only members necessary for descriptions, of the liquid crystal panel PNL, are illustrated but the illustration of the above-described alignment films AL1 and AL2 and the like is omitted.

As shown in FIG. 20, the control electrode structure RE is not only provided on the insulating substrate 10, but the counter-electrode OE is also provided on the insulating substrate 20, in the configuration of the longitudinal electric field mode. In the longitudinal electric field mode, the liquid crystal layer LC of the incident light control area PCA is driven with a voltage applied between the control electrode structure RE and the counter-electrode OE. Incidentally, the common electrode CE (FIG. 3) can be referred to as a first common electrode, and the counter-electrode OE can be referred to as a second common electrode.

A plurality of spacers SP are provided between the insulating substrate 10 and the insulating substrate 20. A first gap Ga1 between the first substrate SUB1 and the second substrate SUB2 in the display area DA and a second gap Ga2 between the first substrate SUB1 and the second substrate SUB2 in the incident light control area PCA are held by the spacers SP. Two types of spaces SP, i.e., spaces SP1 and spaces SP2, are disposed, and each space SP1 constitutes a gap GaP1 and each space SP2 constitutes a gap GaP2. In the display area DA, the spacers SP are covered with the light-shielding portion BMA2 (light-shielding portion BMA). In the incident light control area PCA, the spacers SP are covered with the second light-shielding portion BM2 or third light-shielding portion BM3.

In the incident light control area PCA, a quarter-wave retarder QP2 is sandwiched between the polarizer PL2 and the insulating substrate 20 and a quarter-wave retarder QP1 is sandwiched between the polarizer PL1 and the insulating substrate 10 since the first control liquid crystal layer LC1, the second control liquid crystal layer LC2, and the third control liquid crystal layer LC3 are driven in electrically controlled birefringence (ECB) mode of the longitudinal electric field mode.

In the display area DA and the incident light control area PCA, the polarizer PL1 and the polarizer PL2 are common. On the polarizer PL1 and the polarizer PL2, an easy axis of transmission (polarization axis) faces in the same direction in the display area DA and the incident light control area PCA. The easy axis of transmission of the polarizer PL1 is orthogonal to the easy axis of transmission of the polarizer PL2.

In contrast, in the display area DA, the display liquid crystal layer LCI is driven in the lateral electric field similarly to the above-described first embodiment. In the third embodiment, the display liquid crystal layer LCI is driven in the FFS mode but may be driven in the IPS mode. In the display area DA, the alignment axis (fast axis) of the liquid crystal molecules is orthogonal or parallel or the easy axis of transmission of the polarizer PL1 (or the polarizer PL2), in a state in which no voltage is applied between the pixel electrode PE and the common electrode CE. For this reason, since a phase difference is not made in the display liquid crystal layer LCI, in the state in which no voltage is applied to the display liquid crystal layer LCI, and since the easy axis of transmission of the polarizer PL2 is orthogonal to the easy axis of transmission of the polarizer PL1, the light is blocked (normally-black mode).

When the voltage is applied between the pixel electrode PE and the common electrode CE, the liquid crystal molecules rotate, the fast axis of the liquid crystal molecules makes an angle to the polarization direction of the linearly polarized light, and a retardation is thereby made. In the display liquid crystal layer LCI, when the liquid crystal molecules rotate (the fast axis is oblique to the polarization direction at 45 degrees), birefringence $\Delta n$ and the gap Ga are adjusted such that the retardation becomes $\pi$ ($\Delta n \times Ga = 1/2\lambda$). The light transmitted through the display liquid crystal layer LCI changes from linearly polarized light parallel to the easy axis of transmission of the polarizer PL1 to linearly polarized light oblique to the easy axis of transmission of the polarizer PL1 at 90 degrees. Therefore, the light is made transmitted by applying the voltage between the pixel electrode PE and the common electrode CE, in the display area DA.

In the third embodiment, the same liquid crystal layers LC and the polarizers PL1 and PL2 are used and the alignment axes of the liquid crystal molecules are the same directions, in the display area DA and the incident light control area PCA. Therefore, the retardations of the liquid crystal layer LC are the same, and the directions of the alignment axes of the liquid crystal molecules to the easy axes of transmission of the polarizers PL1 and PL2 are also the same.

Thus, the quarter-wave retarder QP2 and the quarter-wave retarder QP1 are sandwiched between the polarizer PL2 and the polarizer PL1, in the incident light control area PCA. A slow axis of the quarter-wave retarder QP2 is oblique to the easy axis of transmission of the polarizer PL2 at 45 degrees, and a slow axis of the quarter-wave retarder QP1 is oblique to the easy axis of transmission of the polarizer PL1 at 45 degrees. The light transmitted through the quarter-wave retarder QP2 and the quarter-wave retarder QP1 changes from the linearly polarized light to the circularly polarized light or changes from the circularly polarized light to the linearly polarized light.

In the third embodiment, the slow axis of the quarter-wave retarder QP1 is oblique to the easy axis of transmission of the polarizer PL1 at +45 degrees, and the linearly polarized light emitted from the polarizer PL1 changes to clockwise circularly polarized light. In the first control liquid crystal layer LC1, the second control liquid crystal layer LC2, and the third control liquid crystal layer LC3, the birefringence $\Delta n$ and a second gap Ga2 are adjusted ($\Delta n \times Ga2 = 1/2\lambda$) such that the retardation becomes $\Pi$, and the clockwise circularly polarized light is changed to counterclockwise circularly polarized light.

The slow axis of the quarter-wave retarder QP2 is oblique to the easy axis of transmission of the polarizer PL1 at −45 degrees, and the light passed through the quarter-wave retarder QP2 becomes the linearly polarized light oblique to the easy axis of transmission of the polarizer PL1 at 90 degrees and is transmitted through the polarizer PL2.

In the third embodiment, a control electrode structure group REG including a plurality of control electrode structures RE is located in the incident light control area PCA and is provided in the first substrate SUB1. The second substrate SUB2 is located in the incident light control area PCA and comprises a counter-electrode OE opposed to the control electrode structure group REG. Therefore, in the incident light control area PCA, the light is transmitted in a state in which no voltage is applied between the control electrode structure RE and the counter-electrode OE (normally-white mode). Incidentally, the second substrate SUB2 of the third embodiment comprises a transparent layer TL instead of the color filter CF, in the incident light control area PCA.

In the ECB mode, the amount of the transmitted light is controlled by using variation of the birefringence ($\Delta n$) of the liquid crystal molecules by applying the voltage between the control electrode structure RE and the counter-electrode OE and aligning the liquid crystal molecules along a direction perpendicular to the first substrate SUB1 and the second substrate SUB2.

In the third embodiment, the birefringence becomes smaller to the transmitted light and the amount of the transmitted light is reduced by applying the voltage between the control electrode structure RE and the counter-electrode OE and aligning the longer-axis direction of the liquid crystal molecules along a direction perpendicular to the first substrate SUB1 and the second substrate SUB2.

For example, when the birefringence $\Delta n$ becomes 0 and the retardation becomes 0, the light transmitted through the first control liquid crystal layer LC1, the second control liquid crystal layer LC2, and the third control liquid crystal layer LC3 remains clockwise circularly polarized light, and the clockwise circularly polarized light passing through the quarter-wave retarder QP2 becomes linearly polarized light parallel to the easy axis of transmission of the polarizer PL1 and is not transmitted through the polarizer PL2. Therefore, the light incident on the camera 1 can be reduced by the diaphragm DP by applying the voltage between the control electrode structure RE and the counter-electrode OE (non-transmissive state).

Figure 21:
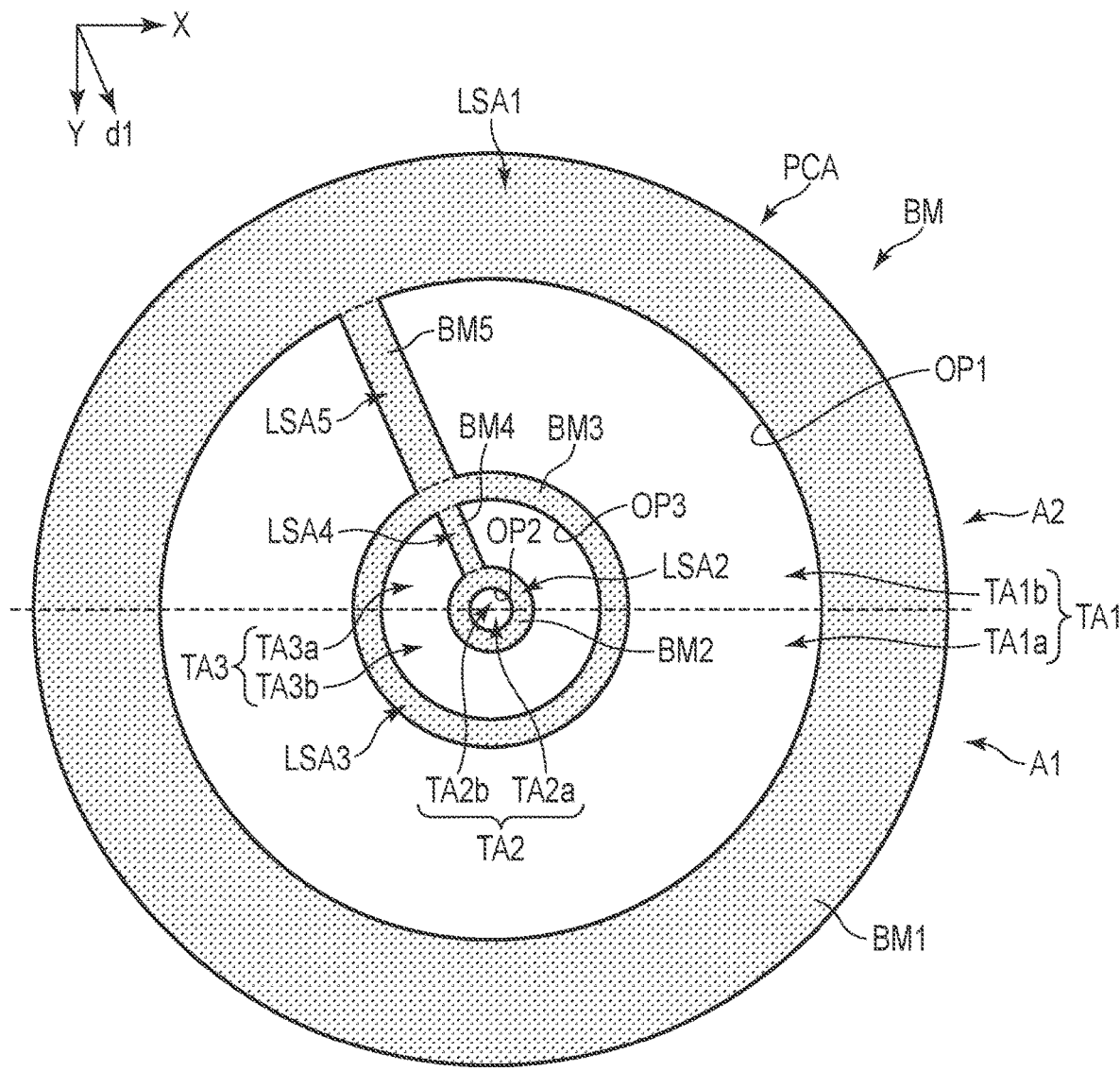
FIG. 21 is a plan view showing a light-shielding layer in an incident light control area of the liquid crystal panel according to the third embodiment.

FIG. 21 is a plan view showing a light-shielding layer BM in an incident light control area PCA of the liquid crystal panel PNL, according to the third embodiment. The third embodiment is different from the first embodiment (FIG. 8) with respect to a feature that each of the first incident light control area TA1, the second incident light control area TA2, and the third incident light control area TA3 is divided into two ranges.

As shown in FIG. 21, the first incident light control area TA1 includes a first range TA1a, and a second range TA1b other than the first range TA1a. The second incident light control area TA2 includes a third range TA2a, and a fourth range TA2b other than the third range TA2a. The third incident light control area TA3 includes a fifth range TA3a, and a sixth range TA3b other than the fifth range TA3a.

In the third embodiment, the first range TA1a is adjacent to the second range TA1b in the direction Y, the third range TA2a is adjacent to the fourth range TA2b in the direction Y, and the fifth range TA3a is adjacent to the sixth range TA3b in the direction Y. A boundary between the first range TA1a and the second range TA1b, a boundary between the third range TA2a and the fourth range TA2b, and a boundary between the fifth range TA3a and the sixth range TA3b are in line with the direction X.

The incident light control area PCA is divided into a first area A1 and a second area A2 by a diameter of a circle formed by the outer periphery of the first light-shielding portion BM1. In the third embodiment, the first area A1 includes a first range TA1a, a third range TA2a, and a sixth range TA3b. The second area A2 includes a second range TA1b, a fourth range TA2b, and a fifth range TA3a.

However, the manner of dividing each of the first incident light control area TA1, the second incident light control area TA2, and the third incident light control area TA3 into two ranges is exemplified in the third embodiment and can be variously modified.

Figure 22:
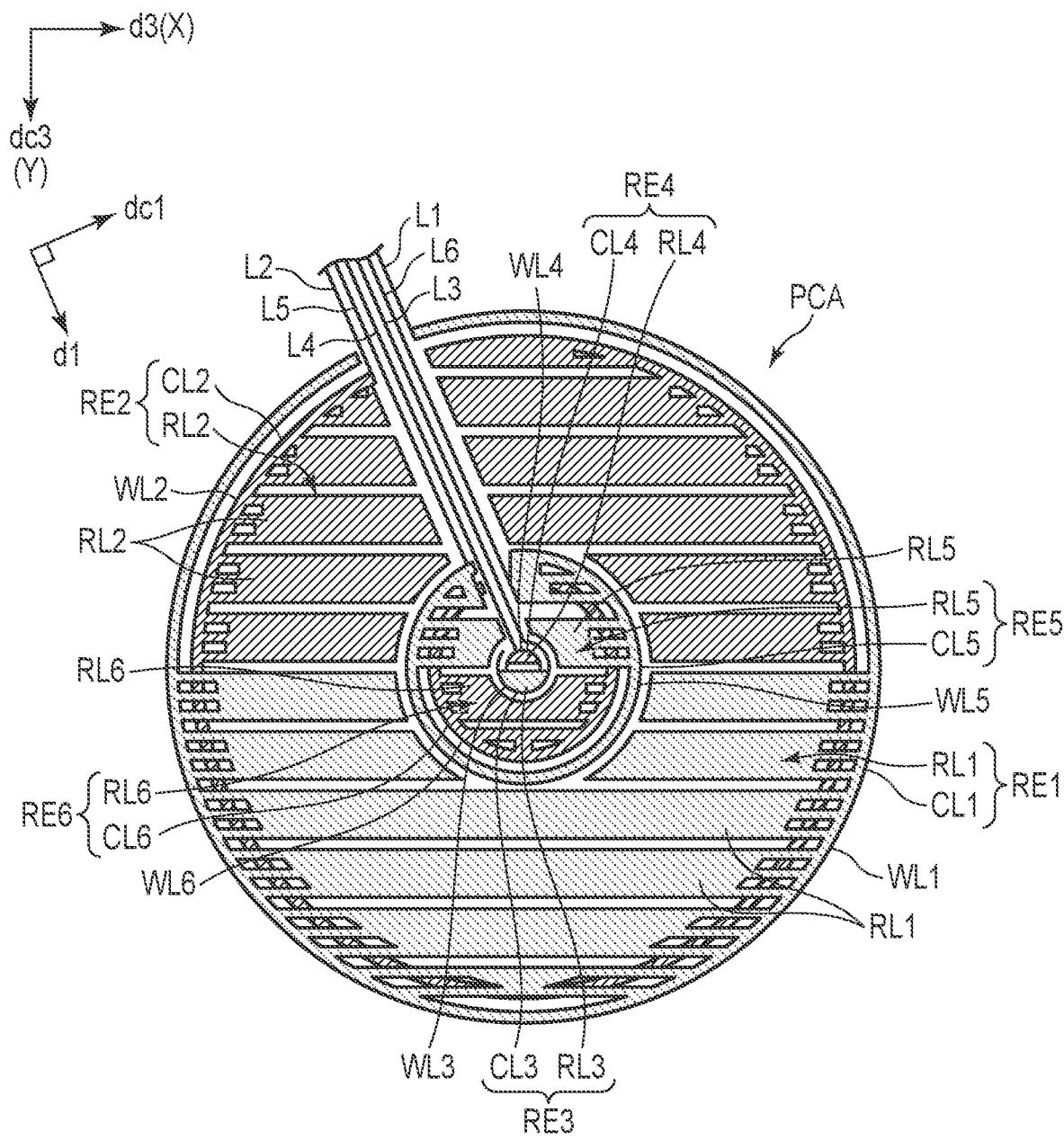
FIG. 22 is a plan view showing a plurality of control electrode structures and a plurality of lead lines of a first substrate according to the third embodiment.

Next, the configuration of the first control electrode structure RE1, the second control electrode structure RE2, the third control electrode structure RE3, the fourth control electrode structure RE4, the fifth control electrode structure RE5, the sixth control electrode structure RE6, and the counter-electrode OE in a case of driving the first control liquid crystal layer LC1, the second control liquid crystal layer LC2, and the third control liquid crystal layer LC3 in the longitudinal electric field mode, in the incident light control area PCA, will be described. FIG. 22 is a plan view showing a plurality of control electrode structures RE and a plurality of lead lines L of a first substrate SUB1 according to the third embodiment.

As shown in FIG. 22 and FIG. 21, the first control electrode structure RE1 comprises a first power supply line CL1 located in the first light-shielding area LSA1, and a first control electrode RL1 located in the first light-shielding area LSA1 and a first range TA1a. The first power supply line CL1 includes a first line WL1. In the third embodiment, the first line WL1 and the first control electrode RL1 are formed integrally.

The second control electrode structure RE2 comprises a second power supply line CL2 located in the first light-shielding area LSA1, and a second control electrode RL2 located in the first light-shielding area LSA1 and a second range TA1b. The second power supply line CL2 includes a second line WL2. In the third embodiment, the second line WL2 and the second control electrode RL2 are formed integrally.

The third control electrode structure RE3 comprises a third power supply line CL3 located in the second light-shielding area LSA2, and a third control electrode RL3 located in the second light-shielding area LSA2 and a third range TA2a. The third power supply line CL3 includes a third line WL3.

The fourth control electrode structure RE4 comprises a fourth power supply line CL4 located in the second light-shielding area LSA2, and a fourth control electrode RL4 located in the second light-shielding area LSA2 and a fourth range TA2b. The fourth power supply line CL4 includes a fourth line WL4.

The fifth control electrode structure RE5 comprises a fifth power supply line CL5 located in the third light-shielding area LSA3, and a fifth control electrode RL5 located in the third light-shielding area LSA3 and a fifth range TA3a. The fifth power supply line CL5 includes a fifth line WL5. In the third embodiment, the fifth line WL5 and the fifth control electrode RL5 are formed integrally.

The sixth control electrode structure RE6 comprises a sixth power supply line CL6 located in the third light-shielding area LSA3, and a sixth control electrode RL6 located in the third light-shielding area LSA3 and a sixth range TA3b. The sixth power supply line CL6 includes a sixth line WL6. In the third embodiment, the sixth line WL6 and the sixth control electrode RL6 are formed integrally.

Incidentally, in the third embodiment, the first control electrode structure RE1, the third control electrode structure RE3, and the fifth control electrode structure RE5 are located between the insulating layer 13 and the alignment film AL1. The second control electrode structure RE2, the fourth control electrode structure RE4, and the sixth control electrode structure RE6 are located between the insulating layers 12 and 13.

Figure 23:
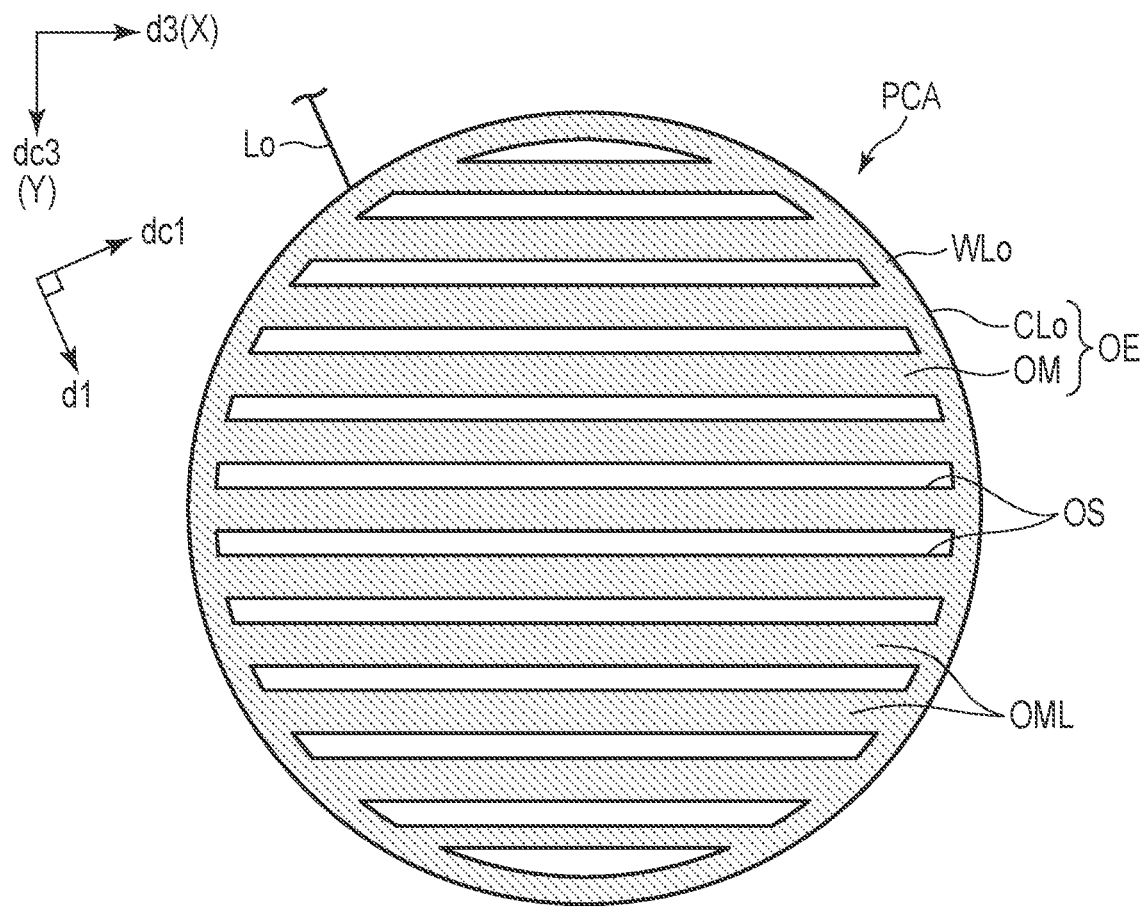
FIG. 23 is a plan view showing a counter-electrode and a lead line of a second substrate according to the third embodiment.

FIG. 23 is a plan view showing a counter-electrode OE and a lead line Lo of a second substrate SUB2 according to the third embodiment. As shown in FIG. 23 and FIG. 21, the counter-electrode OE is located in the incident light control area PCA. The counter-electrode OE comprises a counter-supply line CLo located in the first light-shielding area LSA1 and a counter-electrode main body OM located in the incident light control area PCA. The counter-supply line CLo includes a counter-line WLo having an annular shape. In the third embodiment, the counter-line WLo and the counter-electrode main body OM are formed of a transparent conductive material such as ITO.

The counter-electrode main body OM includes a plurality of linear counter-electrodes OML. A plurality of linear counter-electrodes OML are located in the incident light control area PCA, are electrically connected to the counter-line WLo, extend linearly in the third extending direction d3, and are arranged and spaced apart in an orthogonal direction dc3 that is orthogonal to the third extending direction d3.

In the third embodiment, the counter-line WLo and the linear counter-electrode OML are formed integrally. In addition, the third extending direction d3 is the same as the direction X, and the orthogonal direction dc3 is the same as the direction Y. Based on the above, the counter-electrode OE is an electrode including a plurality of slits OS that extend in the third extending direction d3 and are arranged and spaced apart in the orthogonal direction dc3.

In the incident light control area PCA, the lead line Lo extends in the first extending direction d1. The lead line Lo is formed of a metal and electrically connected to the counter-line WLo. The lead line Lo causes an area covered with one light-shielding portion (BMA2) to extend in the display area DA. However, the lead line Lo may cause at least one of the light-shielding portions BMA1 and BMA2 to extend in the display area DA.

Incidentally, the counter-supply line CLo and the lead line Lo may be formed of a stacked layer body of transparent conductive layers and metal layers.

The voltage applied to the counter-electrode OE via the lead line Lo is referred to as a counter-voltage. Incidentally, the voltage applied to the counter-electrode (second common electrode) OE is often referred to as a common voltage.

FIG. 24 is a plan view showing a plurality of first control electrodes RL1, a plurality of second control electrodes RL2, and a plurality of linear counter-electrodes OML according to the third embodiment.

As shown in FIG. 24, a plurality of first control electrodes RL1 are located in the first light-shielding area LSA1 and the first range TA1a, are electrically connected to the first line WL1, extend linearly in the third extending direction d3, and are arranged and spaced apart in the orthogonal direction dc3. A plurality of second control electrodes RL2 are located in the first light-shielding area LSA1 and the second range TA1b, are electrically connected to the second line WL2, extend linearly in the third extending direction d3, and are arranged and spaced apart in the orthogonal direction dc3.

Each of the first control electrodes RL1 and the second control electrodes RL2 has a stripe-shaped portion having a side along the diameter, which separates the first area A1 and the second area A2.

FIG. 25 is a cross-sectional view showing a liquid crystal panel PNL as viewed along line XXV-XXV of FIG. 24, illustrating an insulating substrate 10, an insulating substrate 20, a plurality of first control electrodes RL1, a plurality of second control electrodes RL2, a plurality of linear counter-electrodes OML, and a first control liquid crystal layer LC1. In FIG. 25, the only constituent elements necessary for descriptions are shown.

As shown in FIG. 25, a first gap SC1 between a pair of adjacent first control electrodes RL1 is opposed to one corresponding linear counter-electrode OML. A second gap SC2 between a pair of adjacent second control electrodes RL2 is opposed to one corresponding linear counter-electrode OML. A third gap SC3 between the adjacent first control electrode RL1 and second control electrode RL2 is opposed to one corresponding linear counter-electrode OML. A fourth gap SC4 between a pair of adjacent linear counter-electrodes OML is opposed to one corresponding first control electrode RL1 or one corresponding second control electrode RL2.

An example will be described with concrete numerical values. In the orthogonal direction dc3, each of the width WD1 of the first control electrode RL1 and the width WD2 of the second control electrode RL2 is 390 µm, and each of the first gap SC1, the second gap SC2, and the third gap SC3 is 10 µm. In addition, in the orthogonal direction dc3, the width WDo of the linear counter-electrode OML is 390 µm and the fourth gap SC4 is 10 µm.

Incidentally, the pitch in the orthogonal direction dc3 between the first control electrode RL1 and the second control electrode RL2 and the pitch of the linear counter-electrode OML may be set at random, similarly to the first embodiment (FIG. 10).

When the first control electrode structure RE1, the second control electrode structure RE2, and the counter-electrode OE are driven under the first condition (i.e., the condition for opening the diaphragm DP), the liquid crystal panel PNL sets the first incident light control area TA1 to a transmissive state. Each of the first control voltage applied to the first control electrode structure RE1 and the second control voltage applied to the second control electrode structure RE2 is the same as the counter-voltage applied to the counter-electrode OE.

In contrast, when the first control electrode structure RE1, the second control electrode structure RE2, and the counter-electrode OE are driven under the third condition (i.e., the condition for narrowing the diaphragm DP), the second condition (i.e., the condition for further narrowing the diaphragm DP), and the fourth condition (i.e., the condition for closing the diaphragm DP), the liquid crystal panel PNL sets the first incident light control area TA1 to a non-transmissive state.

When a part of the period for driving the first control liquid crystal layer LC1 is focused, one of the first control voltage and the second control voltage becomes positive due to the counter-voltage. During the period, the other of the first control voltage and the second control voltage becomes negative due to the counter-voltage. A polarity of the first control voltage is different from a polarity of the second control voltage with respect to the counter-voltage.

For this reason, a polarity of the voltage generated between the first control electrode structure RE1 and the counter-electrode OE and applied to the first control liquid crystal layer LC1 is different from a polarity of the voltage generated between the second control electrode structure RE2 and the counter-electrode OE and applied to the first control liquid crystal layer LC1. An influence of the potential variation of the counter-electrode OE which results from the potential variation of the first control electrode structure RE1 and an influence of the potential variation of the counter-electrode OE which results from the potential variation of the second control electrode structure RE2 cancel each other. Undesired potential variation of the counter-electrode OE can be thereby suppressed.

In the third embodiment, an absolute value of a difference between the counter-voltage and the first control voltage is the same as an absolute value of a difference between the counter-voltage and the second control voltage. For this reason, undesired potential variation of the counter-electrode OE can be further suppressed.

Incidentally, it is undesirable that the polarities of the first control voltage and the second control voltage to the counter-voltage are the same as each other, unlike the third embodiment, since undesired potential variation of the counter-electrode OE is caused.

As described above, inversion drive of inverting the polarities of the first control voltage and the second control voltage with reference to the counter-voltage may be executed during a period of driving the first control liquid crystal layer LC1 under the second to fourth conditions. The counter-voltage is a constant voltage during the above period.

In addition, the positional relationship between each of the first gap SC1, second gap SC2, and third gap SC3, and the linear counter-electrode OML has been described above. The positional relationship between the fourth gap SC4 and each of the first control electrode RL1 and the second control electrode RL2 has been described above. An oblique electric field can be generated between the first control electrode RL1 and the linear counter-electrode OML, and an oblique electric field can be generated between the second control electrode RL2 and the linear counter-electrode OML, during a period of driving the first control liquid crystal layer LC1 under the second to fourth conditions. For this reason, the direction in which the liquid crystal molecules of the first control liquid crystal layer LC1 rise can be further controlled as compared with the case where the electric field is parallel to the direction Z. In the figure, the above electric field is represented by a dashed line.

Figure 26:
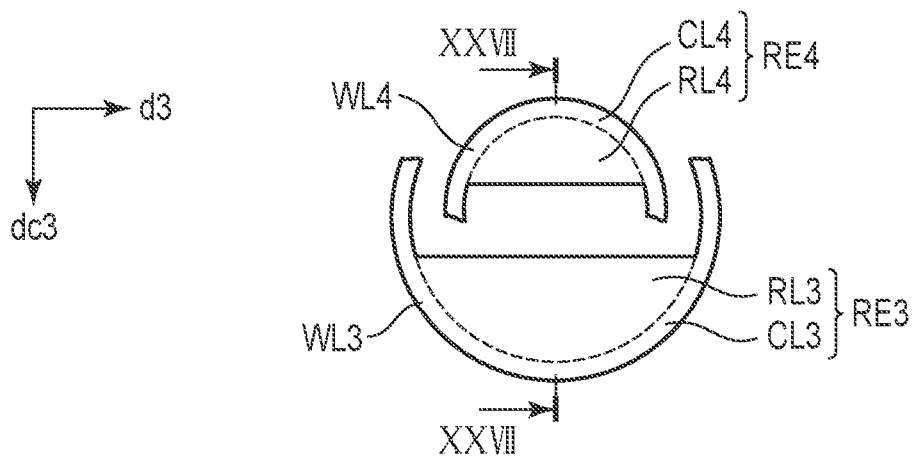
FIG. 26 is a plan view showing a third control electrode structure and a fourth control electrode structure according to the third embodiment.

FIG. 26 is a plan view showing a third control electrode structure RE3 and a fourth control electrode structure RE4 according to the third embodiment.

As shown in FIG. 26, each of the third control electrode RL3 and the fourth control electrode RL4 has a semicircular shape having a side parallel to the third extending direction d3. The above sides of the third control electrode RL3 and the fourth control electrode RL4 are aligned with the diameter separating the first area A1 and second area A2. The third control electrode RL3 and the fourth control electrode RL4 are arranged and spaced apart in the orthogonal direction dc3.

As shown in FIG. 26 and FIG. 22, the inner diameter of the third line WL3 is smaller than the inner diameter of the sixth line WL6. An inner diameter of the fourth line WL4 is smaller than the inner diameter of the third line WL3.

Figure 27:
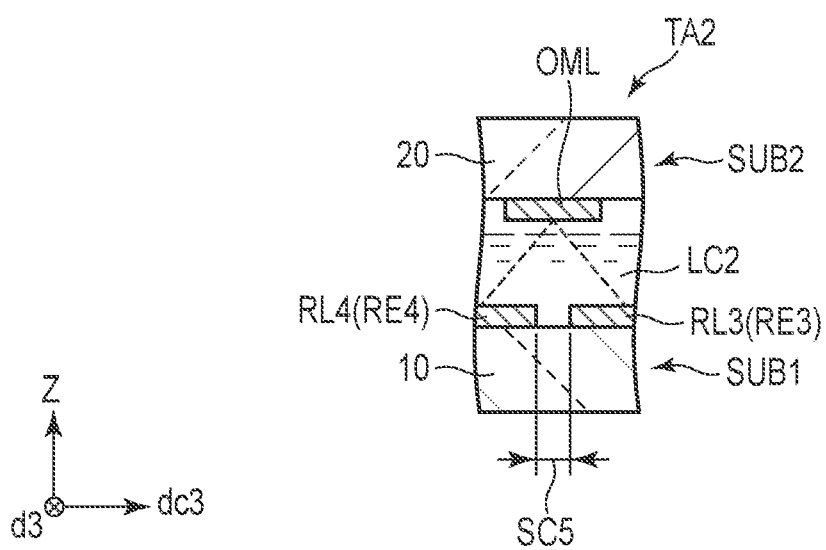
FIG. 27 is a cross-sectional view showing the liquid crystal panel as viewed along line XXVII-XXVII of FIG. 26, illustrating an insulating substrate, the third control electrode structure, the fourth control electrode structure, the linear counter-electrode, and a second control liquid crystal layer.

FIG. 27 is a cross-sectional view showing the liquid crystal panel PNL as viewed along line XXVII-XXVII of FIG. 26, illustrating the insulating substrates 10 and 20, the third control electrode structure RE3, the fourth control electrode structure RE4, the linear counter-electrode OML, and a second control liquid crystal layer LC2. In FIG. 27, the only constituent elements necessary for descriptions are shown.

As shown in FIG. 27, a fifth gap SC5 between the adjacent third control electrode RL3 and fourth control electrode RL4 is opposed to one corresponding linear counter-electrode OML. The fifth gap SC5 is in line with the third gap SC3 in the third extending direction d3 (FIG. 22 and FIG. 25).

When the third control electrode structure RE3, the fourth control electrode structure RE4, and the counter-electrode OE are driven under the first condition, the second condition, and the third condition, the liquid crystal panel PNL sets the second incident light control area TA2 to a transmissive state. Each of the third control voltage applied to the third control electrode structure RE3 and the fourth control voltage applied to the fourth control electrode structure RE4 is the same as the counter-voltage applied to the counter-electrode OE.

In contrast, when the third control electrode structure RE3, the fourth control electrode structure RE4, and the counter-electrode OE are driven under the fourth condition, the liquid crystal panel PNL sets the second incident light control area TA2 to a non-transmissive state.

When a part of the period for driving the second control liquid crystal layer LC2 is focused, one of the third control voltage and the fourth control voltage becomes positive due to the counter-voltage. During the period, the other of the third control voltage and the fourth control voltage becomes negative due to the counter-voltage.

For this reason, a polarity of the voltage generated between the third control electrode structure RE3 and the counter-electrode OE and applied to the second control liquid crystal layer LC2 is different from a polarity of the voltage generated between the fourth control electrode structure RE4 and the counter-electrode OE and applied to the second control liquid crystal layer LC2. In the third embodiment, an absolute value of a difference between the counter-voltage and the third control voltage is the same as an absolute value of a difference between the counter-voltage and the fourth control voltage.

Incidentally, it is undesirable that the polarities of the third control voltage and the fourth control voltage to the counter-voltage are the same as each other, unlike the third embodiment, since undesired potential variation of the counter-electrode OE is caused.

As described above, inversion drive of inverting the polarities of the third control voltage and the fourth control voltage with reference to the counter-voltage may be executed during a period of driving the second control liquid crystal layer LC2 under the fourth condition. The counter-voltage is a constant voltage during the above period. In addition, when driving the third control electrode structure RE3 and the fourth control electrode structure RE4 under the first condition, the inversion drive of the third control electrode structure RE3 and the fourth control electrode structure RE4 may be executed synchronously with the inversion drive of the first control electrode structure RE1 and the second control electrode structure RE2.

In addition, the positional relationship between the fifth gap SC5 and the linear counter-electrode OML has been described above. For this reason, the direction in which the liquid crystal molecules of the second control liquid crystal layer LC2 rise can be further controlled as compared with the case where the electric field generated between the third control electrode RL3 and the linear counter-electrode OML and the electric field generated between the fourth control electrode RL4 and the linear counter-electrode OML are parallel to the direction Z.

Figure 28:
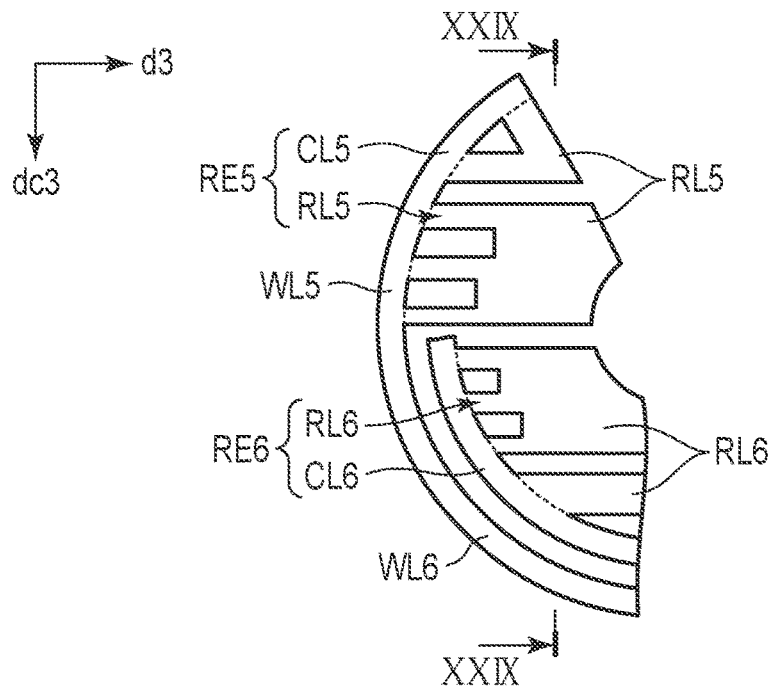
FIG. 28 is a plan view showing a fifth control electrode structure and a sixth control electrode structure according to the third embodiment.

FIG. 28 is a plan view showing parts of a fifth control electrode structure RE5 and a sixth control electrode structure RE6 according to the third embodiment.

As shown in FIG. 28, a plurality of fifth control electrodes RL5 are located in the third light-shielding area LSA3 and the fifth range TA3a, are electrically connected to the fifth line WL5, extend linearly in the third extending direction d3, and are arranged and spaced apart in the orthogonal direction dc3. A plurality of sixth control electrodes RL6 are located in the first light-shielding area LSA1 and the sixth range TA3b, are electrically connected to the sixth line WL6, extend linearly in the third extending direction d3, and are arranged and spaced apart in the orthogonal direction dc3.

Each of the fifth line WL5 and the sixth control electrode RL6 has a stripe-shaped portion having a side along the diameter, which separates the first area A1 and the second area A2.

Figure 29:
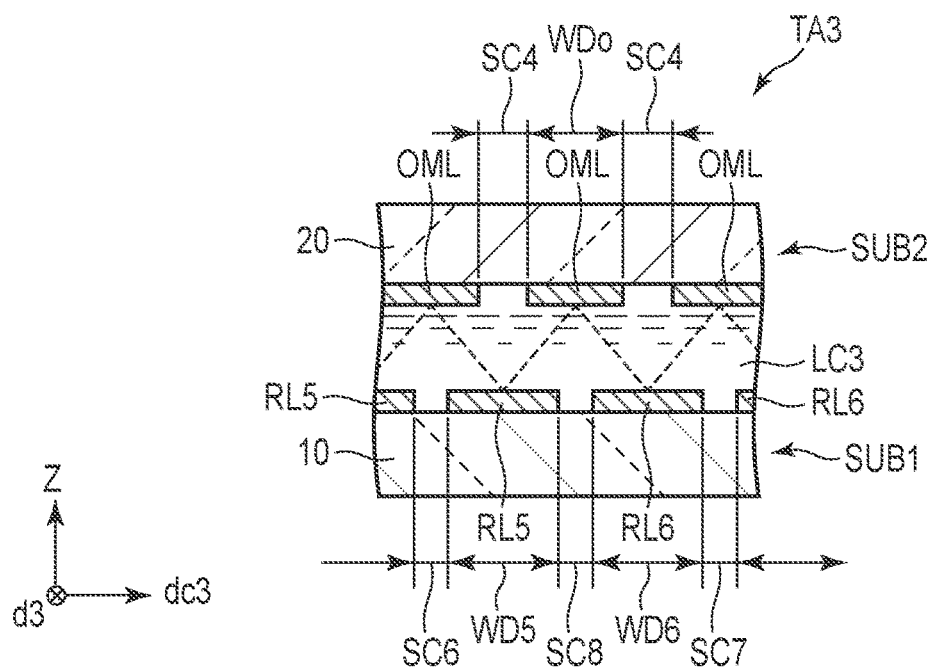
FIG. 29 is a cross-sectional view showing a liquid crystal panel as viewed along line XXIX-XXIX of FIG. 28, illustrating an insulating substrate, a plurality of fifth control electrodes, a plurality of sixth control electrodes, a plurality of linear counter-electrodes, and a third control liquid crystal layer.

FIG. 29 is a cross-sectional view showing the liquid crystal panel PNL as viewed along line XXIX-XXIX of FIG. 28, illustrating insulating substrates 10 and 20, a plurality of fifth control electrodes RL5, a plurality of sixth control electrodes RL6, a plurality of linear counter-electrodes OML, and a third control liquid crystal layer LC3. In FIG. 29, the only constituent elements necessary for descriptions are shown.

As shown in FIG. 29, a sixth gap SC6 between a pair of adjacent fifth control electrodes RL5 is opposed to one corresponding linear counter-electrode OML. A seventh gap SC7 between a pair of adjacent sixth control electrodes RL6 is opposed to one corresponding linear counter-electrode OML. An eighth gap SC8 between the adjacent fifth control electrode RL5 and sixth control electrode RL6 is opposed to one corresponding linear counter-electrode OML. The fourth gap SC4 is opposed to one corresponding fifth control electrode RL5 or one corresponding sixth control electrode RL6.

The eighth gap SC8 is in line with the third gap SC3 and the fifth gap SC5 in the third extending direction d3 (FIG. 22, FIG. 25, and FIG. 27). The sixth gap SC6 is in line with the second gap SC2 in the third extending direction d3 (FIG.

22 and FIG. 25). The seventh gap SC7 is in line with the first gap SC1 in the third extending direction d3 (FIG. 22 and FIG. 25).

An example will be described with concrete numerical values. In the orthogonal direction dc3, each of the width WD5 of the fifth control electrode RL5 and the width WD6 of the sixth control electrode RL6 is 390 µm, and each of the sixth gap SC6, the seventh gap SC7, and the eighth gap SC8 is 10 µm.

Incidentally, the pitch in the orthogonal direction dc3 between the fifth control electrode RL5 and the sixth control electrode RL6 may be set at random similarly to the first embodiment (FIG. 10).

When the fifth control electrode structure RE5, the sixth control electrode structure RE6, and the counter-electrode OE are driven under the first and third conditions, the liquid crystal panel PNL sets the third incident light control area TA3 to a transmissive state. Each of the fifth control voltage applied to the fifth control electrode structure RE5 and the sixth control voltage applied to the sixth control electrode structure RE6 is the same as the counter-voltage applied to the counter-electrode OE.

In contrast, when the fifth control electrode structure RE5, the sixth control electrode structure RE6, and the counter-electrode OE are driven under the second and fourth conditions, the liquid crystal panel PNL sets the third incident light control area TA3 to a non-transmissive state.

When a part of the period for driving the third control liquid crystal layer LC3 is focused, one of the fifth control voltage and the sixth control voltage becomes positive due to the counter-voltage. During the period, the other of the fifth control voltage and the sixth control voltage becomes negative due to the counter-voltage.

For this reason, a polarity of the voltage generated between the fifth control electrode structure RE5 and the counter-electrode OE and applied to the third control liquid crystal layer LC3 is different from a polarity of the voltage generated between the sixth control electrode structure RE6 and the counter-electrode OE and applied to the third control liquid crystal layer LC3. In the third embodiment, an absolute value of a difference between the counter-voltage and the fifth control voltage is the same as an absolute value of a difference between the counter-voltage and the sixth control voltage.

Incidentally, it is undesirable that the polarities of the fifth control voltage and the sixth control voltage to the counter-voltage are the same as each other, unlike the third embodiment, since undesired potential variation of the counter-electrode OE is caused.

As described above, inversion drive of inverting the polarities of the fifth control voltage and the sixth control voltage with reference to the counter-voltage may be executed during a period of driving the third control liquid crystal layer LC3 under the second and fourth conditions. The counter-voltage is a constant voltage during the above period. In addition, when driving the fifth control electrode structure RE5 and the sixth control electrode structure RE6 under the second and fourth conditions, the inversion drive of the fifth control electrode structure RE5 and the sixth control electrode structure RE6 may be executed synchronously with the inversion drive of the first control electrode structure RE1 and the second control electrode structure RE2.

In addition, the positional relationship between each of the sixth gap SC6, seventh gap SC7, and eighth gap SC8, and the linear counter-electrode OML has been described above. For this reason, the direction in which the liquid crystal molecules of the third control liquid crystal layer LC3 rise can be further controlled as compared with the case where the electric field generated between the fifth control electrode RL5 and the linear counter-electrode OML and the electric field generated between the sixth control electrode RL6 and the linear counter-electrode OML are parallel to the direction Z.

According to the liquid crystal display device DSP and the electronic device 100 according to the third embodiment configured as described above, the liquid crystal display device DSP and the electronic device 100 capable of controlling the light transmissive area of the incident light control area PCA can be obtained.

Fourth Embodiment

Figure 30:
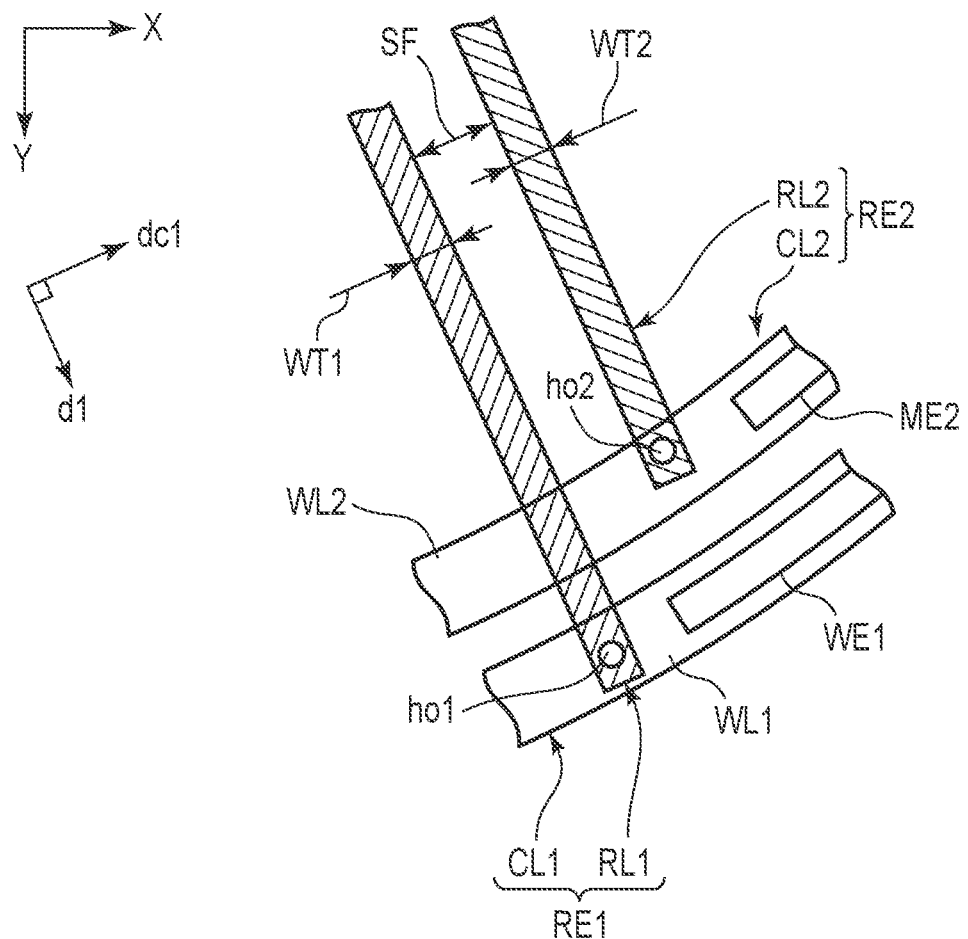
FIG. 30 is a plan view showing a first control electrode structure and a second control electrode structure of a liquid crystal panel of an electronic device according to a fourth embodiment.

Next, a fourth embodiment will be described. An electronic device 100 is constituted similarly to the first embodiment except for constituent elements described in the fourth embodiment. FIG. 30 is a plan view showing a first control electrode structure RE1 and a second control electrode structure RE2 of a liquid crystal panel PNL of an electronic device 100 according to a fourth embodiment. In FIG. 30, the only constituent elements necessary for descriptions are shown.

As shown in FIG. 30, each of the first line WL1, the first control electrode RL1, the second line WL2, and the second control electrode RL2 is formed of a transparent conductive material such as ITO. The insulating layer 13 is sandwiched between one or more conductors of the first line WL1, the first control electrode RL1, the second line WL2, and the second control electrode RL2 and the remaining conductors of the first line WL1, the first control electrode RL1, the second line WL2, and the second control electrode RL2 (FIG. 10).

The above-mentioned one or more conductors are provided in the same layer as one of the pixel electrode PE and the common electrode CE, and is formed of the same material as the one of the electrodes (FIG. 7). The remaining conductors are provided in the same layer as the other of the pixel electrode PE and the common electrode CE, and is formed of the same material as the other of the electrodes (FIG. 7).

In the fourth embodiment, the insulating layer 13 is sandwiched between a line group of the first line WL1 and the second line WL2, and an electrode group of the first control electrode RL1 and the second control electrode RL2 (FIG. 10). In other words, the lines WL and the control electrodes RL are formed in different layers while sandwiching the insulating layer 13.

The first line WL1 and the second line WL2 are provided in the same layer as the common electrode CE, formed of the same transparent conductive material as the common electrode CE, and arranged and spaced apart from each other (FIG. 7). The first control electrode RL1 and the second control electrode RL2 are provided in the same layer as the pixel electrode PE, formed of the same transparent conductive material as the pixel electrode PE, and arranged and spaced apart from each other in the orthogonal direction dc3 (FIG. 7). Based on the above, the first control electrode RL1, the second control electrode RL2, and the pixel electrode PE are formed in the first conductive layer (transparent conductive layer). The first line WL1, the second line WL2, and the common electrode CE are formed in the second conductive layer (transparent conductive layer).

The first control electrode structure RE1 further includes one or more first metal layers ME1. The first metal layers ME1 are located in the first light-shielding area LSA1, are in contact with the first line WL1, and constitute the first power supply line CL1 together with the first line WL1. The first metal layers ME1 contribute to the reduction in resistance of the first power supply line CL1.

The second control electrode structure RE2 further includes one or more second metal layers ME2. The second metal layers ME2 are located in the first light-shielding area LSA1, are in contact with the second line WL2, and constitute the second power supply line CL2 together with the second line WL2. The second metal layers ME2 contribute to the reduction in resistance of the second power supply line CL2.

Incidentally, in the fourth embodiment, the first metal layers ME1 and the second metal layers ME2 are provided in the same layer as the metal layer ML and formed of the same metal material as the metal layer ML.

The first control electrode RL1 is in contact with the first line WL1 through a contact hole ho1 formed in the insulating layer 13. The second control electrode RL2 is in contact with the second line WL2 through a contact hole ho2 formed in the insulating layer 13. The first control electrodes RL1 and the second control electrodes RL2 are arranged alternately in the orthogonal direction dc1. The first control electrode RL1 intersects the second line WL2 and extends in the first extending direction d1.

An example will be described with concrete numerical values. In the orthogonal direction dc1, the width WT1 of the first control electrode RL1 is 2 µm, the width WT2 of the second control electrode RL2 is 2 µm, and a plurality of gaps SF are not constant. The gaps SF are also referred to as gaps between the first control electrode RL1 and the second control electrode RL2, and change at random in the first incident light control area TA1.

For example, the gaps SF change at random in units of 0.25 µm around 8 µm. Then, the gaps SF arranged in the orthogonal direction dc1 are changed in the order of 7.75 µm, 6.25 µm, 10.25 µm, 8.75 µm, 7.25 µm, 5.75 µm, 6.75 µm, 9.25 µm, 8.25 µm, and 9.75 µm.

The pitch between the first control electrode RL1 and the second control electrode RL2 may be constant but, desirably, are set at random like the fourth embodiment. Occurrence of optical diffraction and optical interference caused when the pitches are set to be constant can be thereby prevented. Incidentally, the gap SF may be changed at random in units of 0.25 µm about a range from 8 to 18 µm.

The first control electrode structure RE1 and the second control electrode structure RE2 have been described above with reference to FIG. 30, but the techniques described with reference to FIG. 30 can also be applied to the fifth control electrode structure RE5 and the sixth control electrode structure RE6.

Figure 31:
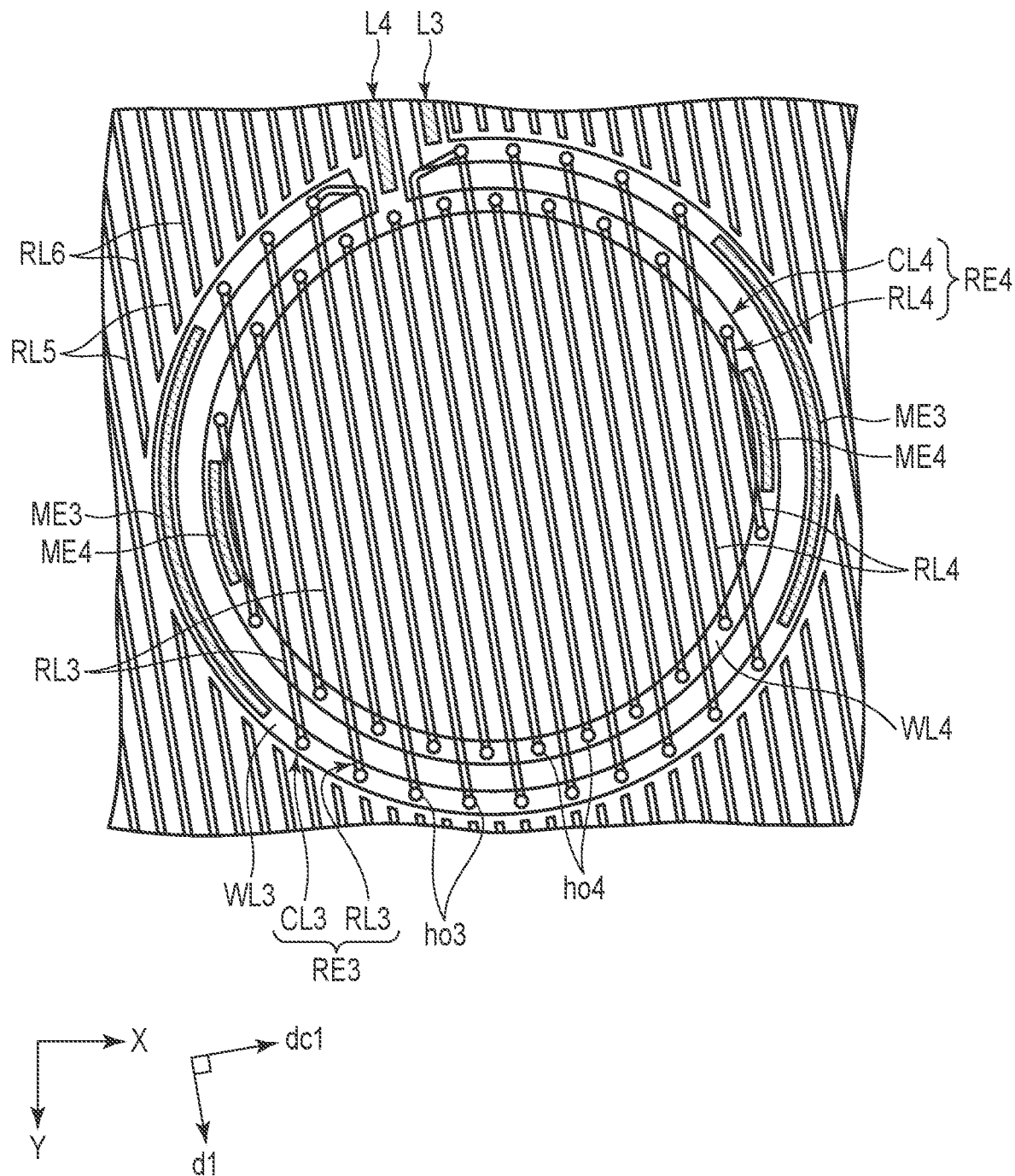
FIG. 31 is a plan view showing a third control electrode structure, a fourth control electrode structure, a fifth control electrode, a sixth control electrode, a third lead line, and a fourth lead line according to the fourth embodiment.

FIG. 31 is a plan view showing a third control electrode structure RE3, a fourth control electrode structure RE4, a fifth control electrode structure RE5, a sixth control electrode structure RE6, a third lead line L3, and a fourth lead line L4 according to the fourth embodiment.

As shown in FIG. 31, the liquid crystal panel PNL has the configuration corresponding to the IPS mode, in the second incident light control area TA2, too.

The third control electrode structure RE3 comprises a third power supply line CL3 and a third control electrode RL3.

The third power supply line CL3 is located in the second light-shielding area LSA2 and includes a third line WL3 having an annular shape and a third metal layer ME3 (FIG. 8). In the fourth embodiment, the third line WL3 has a C-letter shape and is formed to divide the circular shape in an area where the fourth lead line L4 passes. The third metal layer ME3 is located in the second light-shielding area LSA2, is in contact with the third line WL3, and constitutes the third power supply line CL3 together with the third line WL3. The third metal layer ME3 contributes to the reduction in resistance of the third power supply line CL3.

A plurality of third control electrodes RL3 are located in the second light-shielding area LSA2 and the second incident light control area TA2, are electrically connected to the third line WL3, extend linearly in the first extending direction d1, and are arranged and spaced apart in the orthogonal direction dc1 (FIG. 8).

Some of the plurality of third control electrodes RL3 are connected to the third line WL3 at both end parts. However, the other of the plurality of third control electrodes RL3 may be connected to the third line WL3 at one-side end parts, and the other side end parts may comprise the third control electrodes RL3 which are not connected to the third line WL3. All the plurality of third control electrodes RL3 may be connected to the third line WL3 at one-side end parts, and may be not connected to the third line WL3 at the other side end parts.

The fourth control electrode structure RE4 comprises a fourth power supply line CL4 and a fourth control electrode RL4.

The fourth power supply line CL4 is located in the second light-shielding area LSA2 and includes a fourth line WL4 having an annular shape and a fourth metal layer ME4 (FIG. 8). The fourth line WL4 is adjacent to the third line WL3. In the fourth embodiment, the fourth line WL4 is located on an inner side than the third line WL3 but may be located on an outer side than the third line WL3. The fourth metal layer ME4 is located in the second light-shielding area LSA2, is in contact with the fourth line WL4, and constitutes the fourth power supply line CL4 together with the fourth line WL4. The fourth metal layers ME4 contributes to the reduction in resistance of the fourth power supply line CL4.

A plurality of fourth control electrodes RL4 are located in the second light-shielding area LSA2 and the second incident light control area TA2, are electrically connected to the fourth line WL4, extend linearly in the first extending direction d1, and are arranged and spaced apart in the orthogonal direction dc1 (FIG. 8).

Some of the plurality of fourth control electrodes RL4 are connected to the fourth line WL4 at both end parts. However, the other of the plurality of fourth control electrodes RL4 may be connected to the fourth line WL4 at one-side end parts, and the other side end parts may be the fourth control electrodes RL4 which are not connected to the fourth line WL4. All the plurality of fourth control electrodes RL4 may be connected to the fourth line WL4 at one-side end parts, and may be not connected to the fourth line WL4 at the other side end parts.

The third control electrodes RL3 intersect the fourth line WL4. A plurality of third control electrodes RL3 and a plurality of fourth control electrodes RL4 are arranged alternately in the orthogonal direction dc1. Each of the third line WL3, the third control electrode RL3, the fourth line WL4, and the fourth control electrode RL4 is formed of a transparent conductive material such as ITO. The insulating layer 13 is sandwiched between one or more conductors of the third line WL3, the third control electrode RL3, the fourth line WL4, and the fourth control electrode RL4, and the remaining conductors of the third line WL3, the third control electrode RL3, the fourth line WL4, and the fourth control electrode RL4 (FIG. 10).

The above-mentioned one or more conductors are provided in the same layer as one of the pixel electrode PE and the common electrode CE, and are formed of the same material as the one of the electrodes (FIG. 7). The remaining conductors are provided in the same layer as the other of the pixel electrode PE and the common electrode CE, and are formed of the same material as the other of the electrodes (FIG. 7).

In the fourth embodiment, the insulating layer 13 is sandwiched between a line group of the third line WL3 and the fourth line WL4, and an electrode group of the third control electrode RL3 and the fourth control electrode RL4 (FIG. 10).

The third line WL3 and the fourth line WL4 are provided in the same layer as the common electrode CE, formed of the same transparent conductive material as the common electrode CE, and arranged and spaced apart from each other (FIG. 7). The third control electrode RL3 and the fourth control electrode RL4 are provided in the same layer as the pixel electrode PE, and formed of the same transparent conductive material as the pixel electrode PE (FIG. 7).

The third control electrode RL3 is in contact with the third line WL3 through a contact hole ho3 formed in the insulating layer 13. The fourth control electrode RL4 is in contact with the fourth line WL4 through a contact hole ho4 formed in the insulating layer 13.

In the fourth embodiment, the inner diameter DI4 of the second light-shielding portion BM2 is 200 μm (FIG. 8). A plurality of third control electrodes RL3 and a plurality of fourth control electrodes RL4 are arranged at random pitches around 10 μm in the orthogonal direction dc1.

In the fourth embodiment, each of the third lead line L3 and the fourth lead line L4 is composed of a stacked layer body of transparent conductive layers and metal layers.

According to the liquid crystal display device DSP and the electronic device 100 according to the fourth embodiment configured as described above, the liquid crystal display device DSP and the electronic device 100 capable of controlling the light transmissive area of the incident light control area PCA can be obtained.

Fifth Embodiment

Next, a fifth embodiment will be described. An electronic device 100 is constituted similarly to that of the third embodiment (FIG. 22) except for constituent elements described in the fifth embodiment. FIG. 32 is a plan view showing a first control electrode structure RE1 and a second control electrode structure RE2 of a liquid crystal panel PNL of an electronic device 100 according to a fifth embodiment. In FIG. 32, the only constituent elements necessary for descriptions are shown.

As shown in FIG. 32, each of the first line WL1, the first control electrode RL1, the second line WL2, and the second control electrode RL2 is formed of a transparent conductive material such as ITO. The insulating layer 13 is sandwiched between one or more conductors of the first line WL1, the first control electrode RL1, the second line WL2, and the second control electrode RL2 and the remaining conductors of the first line WL1, the first control electrode RL1, the second line WL2, and the second control electrode RL2 (FIG. 10).

The above-mentioned one or more conductors are provided in the same layer as one of the pixel electrode PE and the common electrode CE, and are formed of the same material as the one of the electrodes (FIG. 7). The remaining conductors are provided in the same layer as the other of the pixel electrode PE and the common electrode CE, and are formed of the same material as the other of the electrodes (FIG. 7).

In the fifth embodiment, the insulating layer 13 is sandwiched between a line group of the first line WL1 and the second line WL2, and an electrode group of the first control electrode RL1 and the second control electrode RL2 (FIG. 10).

The first line WL1 and the second line WL2 are provided in the same layer as the common electrode CE, formed of the same transparent conductive material as the common electrode CE, and arranged and spaced apart from each other (FIG. 7). The first control electrode RL1 and the second control electrode RL2 are provided in the same layer as the pixel electrode PE, formed of the same transparent conductive material as the pixel electrode PE, and arranged and spaced apart from each other in the orthogonal direction dc3 (FIG. 7).

The first control electrode structure RE1 further includes one or more first metal layers ME1. The first metal layers ME1 are located in the first light-shielding area LSA1, are in contact with the first line WL1, and constitute the first power supply line CL1 together with the first line WL1 (FIG. 21). The first metal layers ME1 contribute to the reduction in resistance of the first power supply line CL1.

The second control electrode structure RE2 further includes one or more second metal layers ME2. The second metal layers ME2 are located in the first light-shielding area LSA1, are in contact with the second line WL2, and constitute the second power supply line CL2 together with the second line WL2 (FIG. 21). The second metal layers ME2 contribute to the reduction in resistance of the second power supply line CL2.

Incidentally, in the fifth embodiment, the first metal layers ME1 and the second metal layers ME2 are provided in the same layer as the metal layer ML and formed of the same metal material as the metal layer ML.

The first control electrode RL1 is located in the first range TA1a, intersects the second line WL2, and extends in the third extending direction d3. The second control electrode RL2 is located in the second range TA1b and extends in the third extending direction d3.

The first control electrode RL1 is in contact with the first line WL1 through a contact hole ho1 formed in the insulating layer 13. The second control electrode RL2 is in contact with the second line WL2 through a contact hole ho2 formed in the insulating layer 13. In the fifth embodiment, each of the first control electrode RL1 and the second control electrode RL2 is in contact with the corresponding line WL at two points.

Incidentally, the example that the first power supply line CL1 includes the first metal layers ME1 and the second power supply line CL2 includes the second metal layers ME2 has been described, but the first power supply line CL1, the second power supply line CL2, and the lead line L can also be formed of a transparent conductive layer alone in a case where the control electrode structure RE and the lead line L are not covered with the light-shielding layer BM or the other cases.

The first control electrode structure RE1 and the second control electrode structure RE2 have been described above with reference to FIG. 32, but the techniques described with reference to FIG. 32 can also be applied to the fifth control electrode structure RE5 and the sixth control electrode structure RE6.

Figure 33:
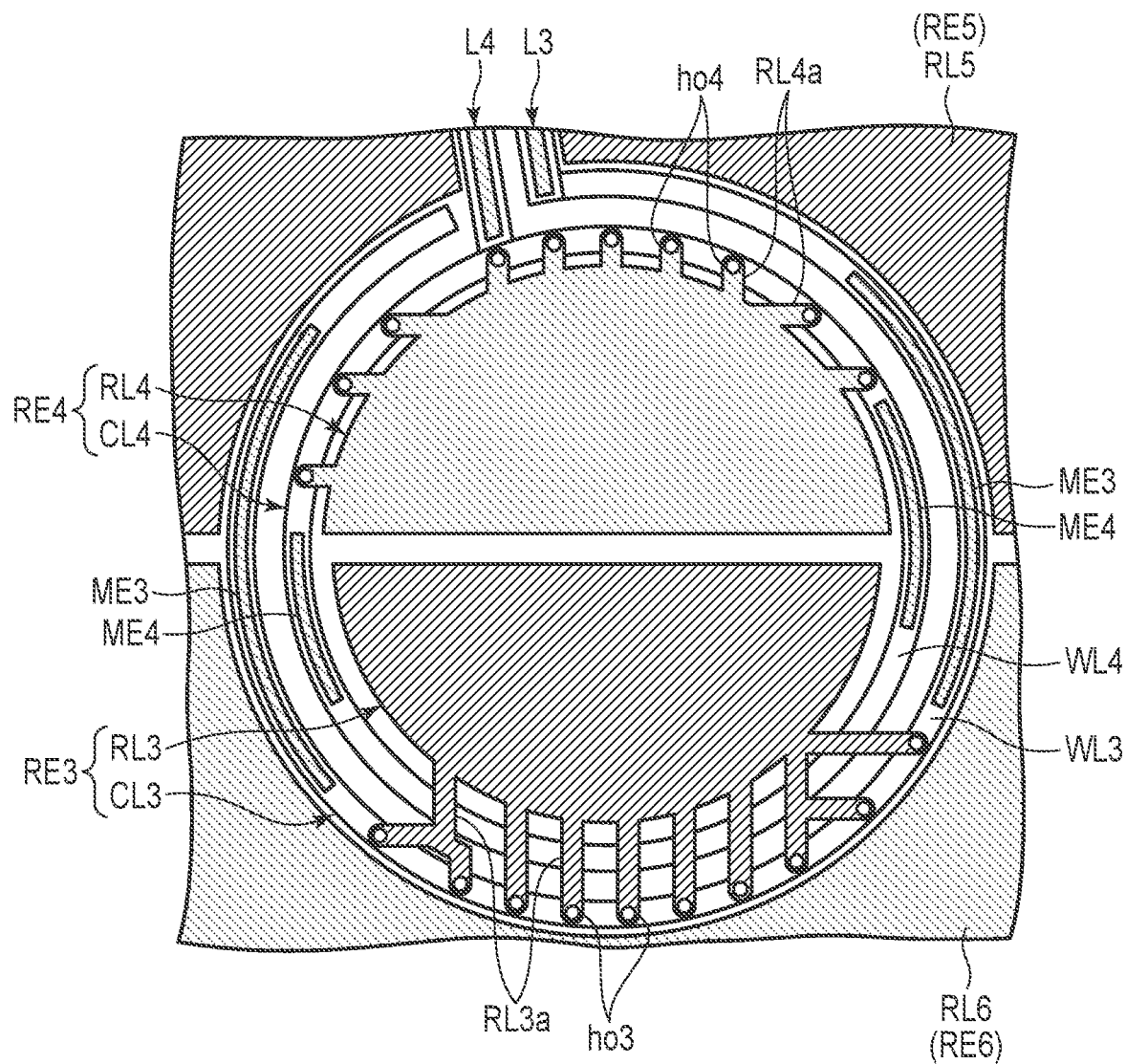
FIG. 33 is a plan view showing a third control electrode structure, a fourth control electrode structure, a fifth control electrode structure, a sixth control electrode structure, a third lead line, and a fourth lead line according to the fifth embodiment.

FIG. 33 is a plan view showing a third control electrode structure RE3, a fourth control electrode structure RE4, a fifth control electrode structure RE5, a sixth control electrode structure RE6, a third lead line L3, and a fourth lead line L4 according to the fifth embodiment.

As shown in FIG. 33, the liquid crystal panel PNL has the configuration corresponding to the longitudinal electric field mode, in the second incident light control area TA2, too.

The third control electrode structure RE3 comprises a third power supply line CL3 and a third control electrode RL3.

The third power supply line CL3 is located in the second light-shielding area LSA2 and includes a third line WL3 having an annular shape and a third metal layer ME3 (FIG. 21). In the fifth embodiment, the third line WL3 has a C-letter shape and is formed to be sectioned in an area where the fourth lead line L4 passes. The third metal layer ME3 is located in the second light-shielding area LSA2, is in contact with the third line WL3, and constitutes the third power supply line CL3 together with the third line WL3. The third metal layer ME3 contributes to the reduction in resistance of the third power supply line CL3. The third control electrode RL3 is located in the second light-shielding area LSA2 and the third range TA2a and is electrically connected to the third line WL3 (FIG. 21).

The fourth control electrode structure RE4 comprises a fourth power supply line CL4 and a fourth control electrode RL4.

The fourth power supply line CL4 is located in the second light-shielding area LSA2 and includes a fourth line WL4 having an annular shape and a fourth metal layer ME4 (FIG. 21). In the fifth embodiment, the fourth line WL4 is located on an inner side than the third line WL3 but may be located on an outer side than the third line WL3. In this case, the third line WL3 may be constituted in a circular shape and the fourth line WL4 may be constituted in a C-letter shape. The fourth metal layer ME4 is located in the second light-shielding area LSA2, is in contact with the fourth line WL4, and constitutes the fourth power supply line CL4 together with the fourth line WL4. The fourth metal layers ME4 contributes to the reduction in resistance of the fourth power supply line CL4. The fourth control electrode RL4 is located in the second light-shielding area LSA2 and the fourth range TA2b and is electrically connected to the fourth line WL4 (FIG. 21).

Each of the third line WL3, the third control electrode RL3, the fourth line WL4, and the fourth control electrode RL4 is formed of a transparent conductive material such as ITO. The insulating layer 13 is sandwiched between one or more conductors of the third line WL3, the third control electrode RL3, the fourth line WL4, and the fourth control electrode RL4, and the remaining conductors of the third line WL3, the third control electrode RL3, the fourth line WL4, and the fourth control electrode RL4 (FIG. 10).

The above-mentioned one or more conductors are provided in the same layer as one of the pixel electrode PE and the common electrode CE, and are formed of the same material as the one of the electrodes (FIG. 7). The remaining conductors are provided in the same layer as the other of the pixel electrode PE and the common electrode CE, and are formed of the same material as the other of the electrodes (FIG. 7).

In the fifth embodiment, the insulating layer 13 is sandwiched between a line group of the third line WL3 and the fourth line WL4, and an electrode group of the third control electrode RL3 and the fourth control electrode RL4 (FIG. 10).

The third line WL3 and the fourth line WL4 are provided in the same layer as the common electrode CE, formed of the same transparent conductive material as the common electrode CE, and arranged and spaced apart from each other (FIG. 7). The third control electrode RL3 and the fourth control electrode RL4 are provided in the same layer as the pixel electrode PE, and formed of the same transparent conductive material as the pixel electrode PE (FIG. 7).

In the fifth embodiment, the inner diameter (DI4) of the second light-shielding portion BM2 is, for example, 200 µm. The widths WD1 and WD2 shown in FIG. 32 are substantially 400 µm as described above. For this reason, the third control electrode RL3 is not separated or does not include a slit, in the third range TA2a. Similarly, the fourth control electrode RL4 is not separated or does not include a slit, in the fourth range TA2b.

The third control electrode RL3 comprises extending portions RL3a. In the fifth embodiment, the third control electrode RL3 comprises a plurality of extending portions RL3a. Each of the extending portions RL3a intersects the fourth line WL4, and is in contact with the third line WL3 through a contact hole ho3 formed in the insulating layer 13.

The fourth control electrode RL4 comprises extending portions RL4a. In the fifth embodiment, the fourth control electrode RL4 comprises a plurality of extending portions RL4a. Each of the extending portions RL4a is in contact with the fourth line WL4 through a contact hole ho4 formed in the insulating layer 13.

In the fifth embodiment, each of the third lead line L3 and the fourth lead line L4 is composed of a stacked layer body of transparent conductive layers and metal layers.

According to the liquid crystal display device DSP and the electronic device 100 according to the fifth embodiment configured as described above, the liquid crystal display device DSP and the electronic device 100 capable of controlling the light transmissive area of the incident light control area PCA can be obtained.

Sixth Embodiment

Figure 34:
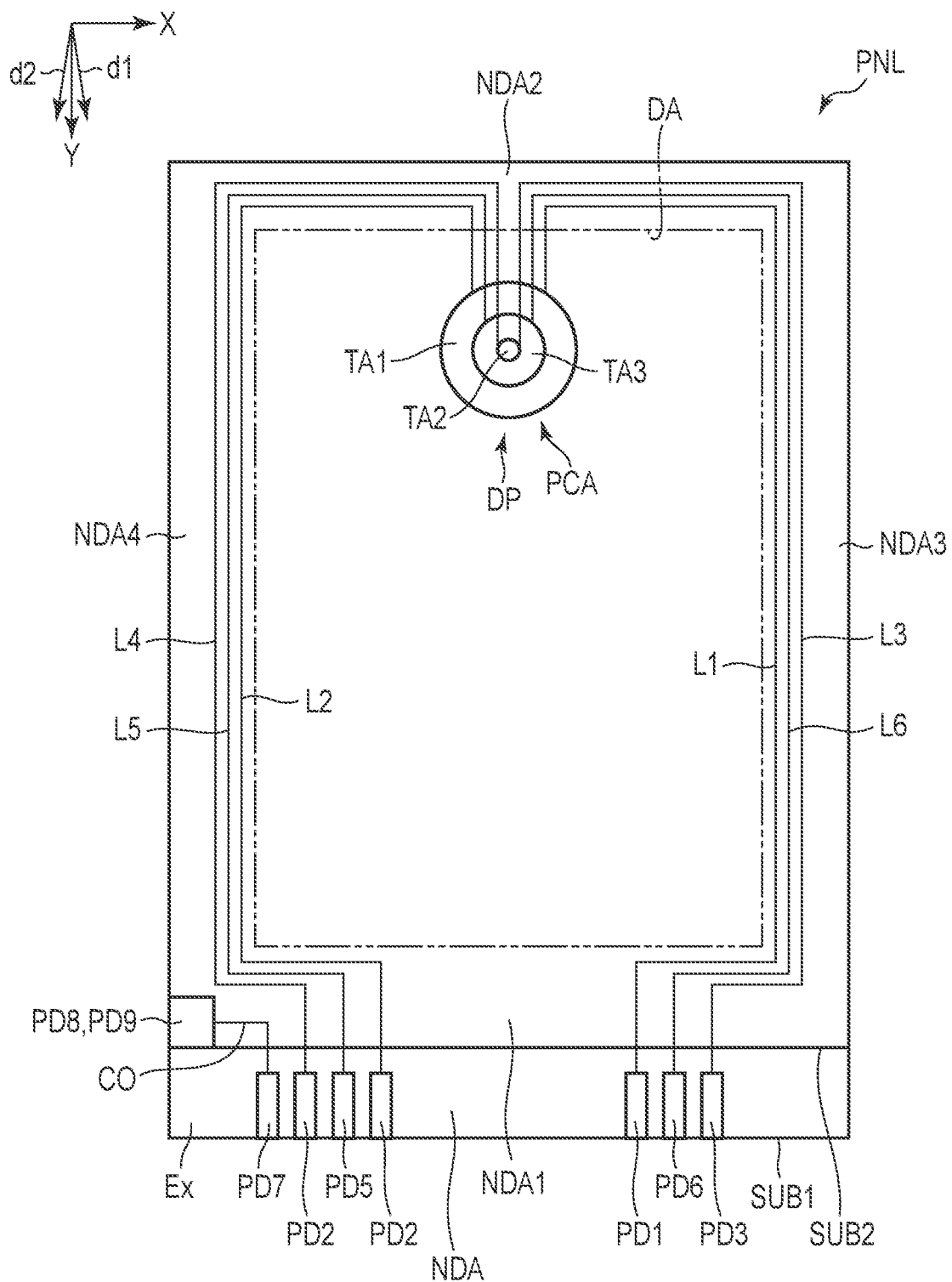
FIG. 34 is a plan view showing a liquid crystal panel of an electronic device according to a sixth embodiment.

Next, a sixth embodiment will be described. An electronic device 100 is constituted similarly to that of the third embodiment (FIG. 20) except for constituent elements described in the sixth embodiment. FIG. 34 is a plan view showing a liquid crystal panel PNL of an electronic device 100 according to the sixth embodiment. In FIG. 34, the only constituent elements necessary for descriptions are shown.

As shown in FIG. 34, the non-display area NDA includes a first non-display area NDA1 including an area where an extending portion Ex of the first substrate SUB1 is located, a second non-display area NDA2 located on a side opposite to the first non-display area NDA1 across the display area DA, a third non-display area NDA3 located between the first non-display area NDA1 and the second non-display area NDA2, and a fourth non-display area NDA4 located on a side opposite to the third non-display area NDA3 across the display area DA.

In the sixth embodiment, when a direction in which the extending portion Ex is located is referred to as a downward or lower direction, the first non-display area NDA1 is located on the lower side, the second non-display area NDA2 is located on the upper side, the third non-display area NDA3 is located on the right side, and the fourth non-display area NDA4 is located on the left side, with respect to the display area DA, in the figure.

The first substrate SUB1 further includes a plurality of pads PD such as a first pad PD1, a second pad PD2, a third pad PD3, a fourth pad PD4, a fifth pad PD5, a sixth pad PD6, and a seventh pad PD7. These pads PD are located at the extending portion Ex of the first non-display area NDA1 of the first substrate SUB1 and arranged in the direction X.

The first lead line L1, the second lead line L2, the third lead line L3, the fourth lead line L4, the fifth lead line L5, and the sixth lead line L6 cause the incident light control area PCA, the display area DA, and the non-display area NDA to extend. In the sixth embodiment, the diaphragm DP (incident light control area PCA) is provided at a position near the second non-display area NDA2, of the first to fourth non-display areas NDA1 to NDA4. For this reason, the first to sixth lead lines L1 to L6 cause the non-display area NDA to extend beyond the display area DA such that the distance to cause the display area DA to extend is as short as possible.

A relationship in connection between the control electrode structure RE and the pad (connection terminal) PD will be described.

As shown in FIG. 34 and FIG. 22, the first lead line L1 electrically connects the first control electrode structure RE1 located in the first incident light control area TA1 to the first pad PD1. The second lead line L2 electrically connects the second control electrode structure RE2 located in the first incident light control area TA1 to the second pad PD2.

The third lead line L3 electrically connects the third control electrode structure RE3 located in the second incident light control area TA2 to the third pad PD3. The fourth lead line L4 electrically connects the fourth control electrode structure RE4 located in the second incident light control area TA2 to the fourth pad PD4.

The fifth lead line L5 electrically connects the fifth control electrode structure RE5 located in the third incident light control area TA3 to the fifth pad PD5. The sixth lead line L6 electrically connects the sixth control electrode structure RE6 located in the third incident light control area TA3 to the sixth pad PD6.

In the sixth embodiment, the first lead line L1, the third lead line L3, and the sixth lead line L6 cause the second non-display area NDA2, the third non-display area NDA3, and the first non-display area NDA1 to extend, respectively. The second lead line L2, the fourth lead line L4, and the fifth lead line L5 cause the second non-display area NDA2, the fourth non-display area NDA4, and the first non-display area NDA1 to extend, respectively.

In the incident light control area PCA, the third lead line L3 and the fourth lead line L4 are sandwiched between the fifth lead line L5 and the sixth lead line L6. The fifth lead line L5 and the sixth lead line L6 are sandwiched between the first lead line L1 and the second lead line L2.

In the second non-display area NDA2, the third non-display area NDA3, and the first non-display area NDA1, the first lead line L1 is located more closely to the display area DA side than to the sixth lead line L6, and the sixth lead line L6 is located more closely to the display area DA side than to the third lead line L3.

In the second non-display area NDA2, the fourth non-display area NDA4, and the first non-display area NDA1, the second lead line L2 is located more closely to the display area DA side than to the fifth lead line L5, and the fifth lead line L5 is located more closely to the display area DA side than to the fourth lead line L4.

At each of the above-described first to sixth lead lines L1 to L6, a portion located in the display area DA between the non-display area NDA and the incident light control area PCA may be referred to as a lead line and a portion located in the non-display area NDA may be referred to as a peripheral line. In this case, the above-described lead lines are connected to the corresponding control electrodes RL via corresponding lines WL. In addition, the peripheral lines extend from the corresponding pads PD to the corresponding lead lines in the non-display area NDA and are connected to the corresponding pads PD and the corresponding lead lines.

Incidentally, the diaphragm DP (incident light control area PCA) may not be provided at a position near the second non-display area NDA2. For example, the diaphragm DP (incident light control area PCA) may be provided at a position near the third non-display area NDA3, of the first to fourth non-display areas NDA1 to NDA4. In this case, the first to sixth lead lines L1 to L6 may cause the third non-display area NDA3 and the first non-display area NDA1 to extend, of the non-display area NDA.

As described above, in the sixth embodiment, the lead lines L are used to apply the voltage to the control electrode structures RE, but the liquid crystal panel PNL needs only to apply the voltage to the control electrode structure RE and may be configured without the lead lines L. For example, the control electrode structure RE and the IC chip 6 may be electrically connected by using several signal lines S of the plurality of signal lines S (FIG. 3), and the control electrode structure RE may be driven via the signal lines S dedicated to the control electrode structure RE.

The first substrate SUB1 further comprises an eighth pad PD8 located in the non-display area NDA, and a connection line CO located in the non-display area NDA to electrically connect the eighth pad PD8 to the seventh pad PD7. The second substrate SUB2 further comprises a ninth pad PD9 which is located in the non-display area NDA and which at least partially overlaps the eighth pad PD8. A lead line Lo is electrically connected to the ninth pad PD9 (FIG. 23).

For example, the lead line Lo causes the second non-display area NDA2, the fourth non-display area NDA4, and the first non-display area NDA1 to extend and electrically connects the counter-electrode OE to the ninth pad PD9, similarly to the second lead line L2 and the like. The eighth pad PD8 is electrically connected to the ninth pad PD9 by a conductive member (not shown). The counter-voltage can be thereby applied to the counter-electrode OE via the seventh pad PD7, the connection line CO, the eighth pad PD8, the ninth pad PD9, the lead line Lo, and the like.

A relationship between the counter-voltage applied to the counter-electrode OE and the first to sixth control voltages applied to the first to sixth control electrode structures RE1 to RE6 will be described.

As shown in FIG. 34, FIG. 25, FIG. 27, and FIG. 29, each of the first to sixth control voltages is the same as the counter-voltage under the first condition. For example, each of the first to sixth control voltages and the counter-voltage is 0V during an arbitrary period under the first condition. The liquid crystal panel PNL can set the first to third incident light control areas TA1 to TA3 to the transmissive state.

In this case, the voltages supplied to the third non-display area NDA3 by the first lead line L1, the third lead line L3, and the sixth lead line L6 do not substantially have an influence, and the voltages supplied to the fourth non-display area NDA4 by the second lead line L2, the fourth lead line L4, and the fifth lead line L5 do not substantially have an influence.

A polarity of the first control voltage is different from a polarity of the second control voltage with respect to the counter-voltage, under the second condition. That is, the polarities of the first control voltage and the second control voltage are the reversed polarities. A polarity of the fifth control voltage is different from a polarity of the sixth control voltage with respect to the counter-voltage. The third control voltage and the fourth control voltage are the same as the counter-voltage. For example, each of the third control voltage, the fourth control voltage, and the counter-voltage is 0V, each of the first control voltage and the fifth control voltage is +αV, and each of the second control voltage and the sixth control voltage is −αV, during an arbitrary period, under the above-described second condition. The liquid crystal panel PNL can set the second incident light control area TA2 to the transmissive state, and set the first incident light control area TA1 and the third incident light control area TA3 to the non-transmissive state.

In this case, the first lead line L1 and the sixth lead line L6 are set to reversed polarities, and the second lead line L2 and the fifth lead line L5 are set to reversed polarities. For this reason, influence of the voltage which may be given to the third non-display area NDA3 and the fourth non-display area NDA4 can be suppressed as compared with a case where the polarities of the first lead line L1 and the sixth lead line L6 are the same as each other and the polarities of the second lead line L2 and the fifth lead line L5 are the same as each other.

A polarity of the first control voltage is different from a polarity of the second control voltage with respect to the counter-voltage, under the third condition. The third control voltage, the fourth control voltage, the fifth control voltage, and the sixth control voltage are the same as the counter-voltage. For example, each of the third control voltage, the fourth control voltage, the fifth control voltage, the sixth control voltage, and the counter-voltage is 0V, the first control voltage is +αV, and the second control voltage is −αV, during an arbitrary period, under the above-described third condition. The liquid crystal panel PNL can set the second incident light control area TA2 and the third incident light control area TA3 to the transmissive state, and set the first incident light control area TA1 to the non-transmissive state.

In this case, the third lead line L3 and the sixth lead line L6 are set to 0V, and the fourth lead line L4 and the fifth lead line L5 are set to 0V. For this reason, influence of the voltage which may be given to the third non-display area NDA3 and the fourth non-display area NDA4 by the lead line L is small under the third condition, too.

A polarity of the first control voltage is different from a polarity of the second control voltage with respect to the counter-voltage, under the fourth condition. A polarity of the fifth control voltage is different from a polarity of the sixth control voltage with respect to the counter-voltage. A polarity of the third control voltage is different from a polarity of the fourth control voltage with respect to the counter-voltage. For example, each of the first control voltage, the third control voltage, and the fifth control voltage is +αV, and each of the second control voltage, the fourth control voltage, and the sixth control voltage is −αV, during an arbitrary period, under the above-described fourth condition. The liquid crystal panel PNL can set the first to third incident light control areas TA1 to TA3 to the non-transmissive state.

In this case, the polarities of the first lead line L1, the third lead line L3, and the sixth lead line L6 are not the same as one another, and the polarities of the second lead line L2, the fourth lead line L4, and the fifth lead line L5 are not the same as one another. For this reason, influence of the voltage which may be given to the third non-display area NDA3 and the fourth non-display area NDA4 can be suppressed as compared with a case where the above polarities are the same as each other.

As described above, the capacity resulting from the lead line L is balanced in the third non-display area NDA3 and the fourth non-display area NDA4. For example, bad influence to the circuit located in the third non-display area NDA3 and the fourth non-display area NDA4 can be suppressed.

According to the liquid crystal display device DSP and the electronic device 100 according to the sixth embodiment configured as described above, the liquid crystal display device DSP and the electronic device 100 capable of controlling the light transmissive area of the incident light control area PCA can be obtained.

Seventh Embodiment

Figure 35:
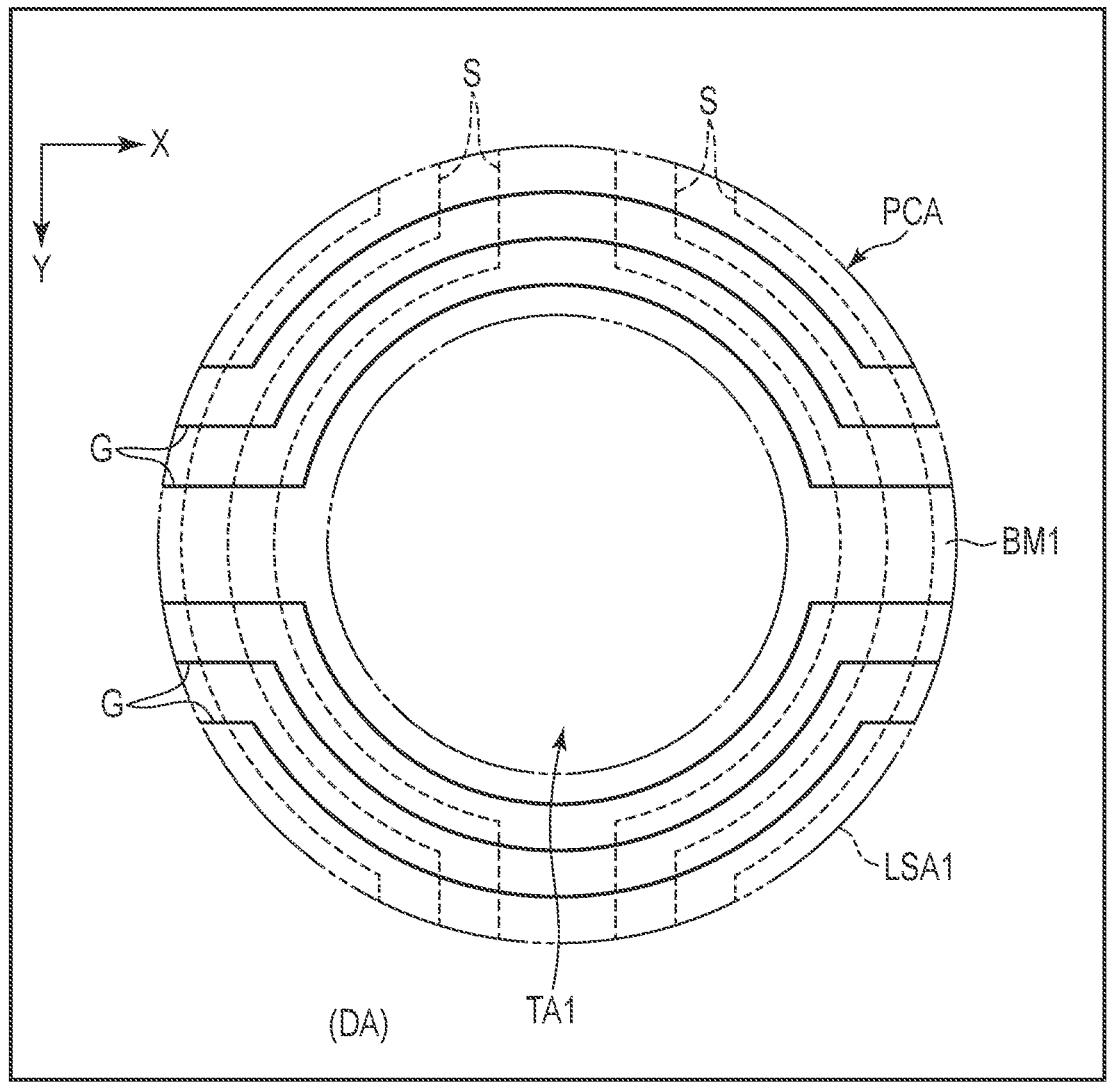
FIG. 35 is a plan view showing a scanning line and a signal line in an incident light control area of a liquid crystal panel of an electronic device according to a seventh embodiment.

Next, a seventh embodiment will be described. FIG. 35 is a plan view showing scanning lines G and signal lines S in an incident light control area PCA of a liquid crystal panel PNL of an electronic device 100 according to a seventh embodiment. In FIG. 35, scanning lines G are represented by solid lines, signal lines S are represented by dashed lines, and the inner periphery and outer periphery of the first light-shielding area LSA1 are represented by double chain lines. In FIG. 35, the only constituent elements necessary for descriptions are shown. The electronic device 100 of the seventh embodiment is constituted similarly to the electronic device 100 of any one of the above-described first to sixth embodiments, except for the scanning lines G and the signal lines S in the incident light control area PCA.

As shown in FIG. 35, a plurality of scanning lines G are arranged in the direction Y and spaced apart at intervals of 60 to 180 μm, in the display area DA. A plurality of signal lines S are arranged in the direction X and spaced apart at intervals of 20 to 60 μm. The scanning lines G and the signal lines S also extend in the incident light control area PCA.

One or more lines that cause the display area DA to extend toward the first incident light control area TA1, of the plurality of scanning lines G and the plurality of signal lines S, bypass the first incident light control area TA1 and causes the first light-shielding area LSA1 of the incident light control area PCA to extend. Therefore, when the diameter of the outer periphery of the first light-shielding area LSA1 (first light-shielding portion BM1) is 6 to 7 mm, 30 to 120 scanning lines G and 100 to 350 signal lines S bypass the first incident light control area TA1 and are arranged in the first light-shielding area LSA1 covered with the first light-shielding portion BM1. For this reason, even when the incident light control area PCA surrounded by the display area DA exists, the scanning lines G, the signal lines S, and the like can be arranged desirably.

According to the liquid crystal display device DSP and the electronic device 100 according to the seventh embodiment configured as described above, the same advantage as those of the above-described embodiments can be obtained since the electronic device 100 is configured similarly to the electronic device 100 of the above-described embodiments.

Eighth Embodiment

Figure 36:
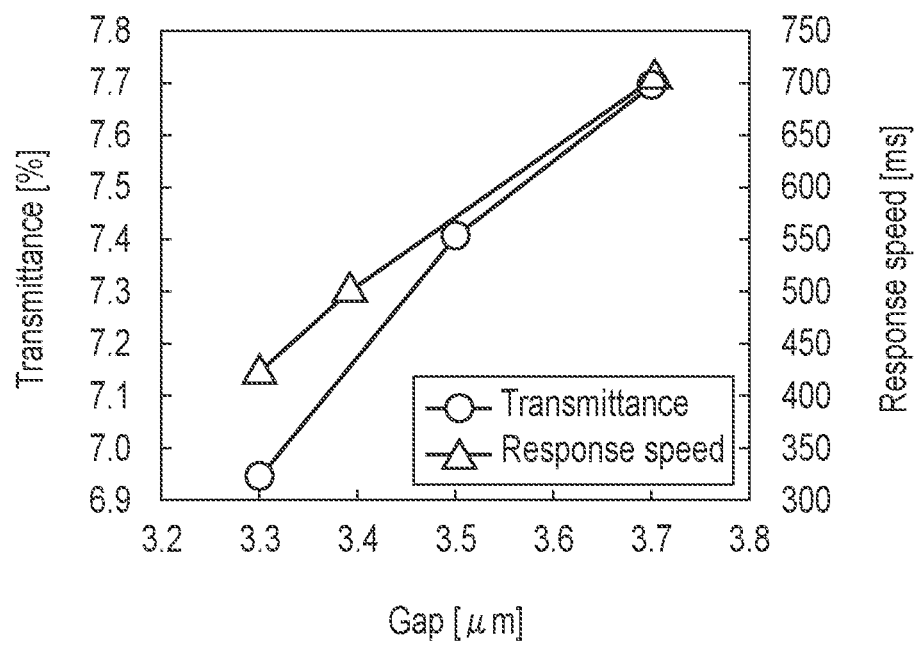
FIG. 36 is a graph showing a variation of a light transmittance to a gap of a liquid crystal layer and a variation of a response speed of liquid crystal to the gap, in a liquid crystal panel of an electronic device according to an eighth embodiment.

Next, an eighth embodiment will be described. First, a relationship between a gap Ga of the liquid crystal layer LC and the transmittance and response speed will be described. FIG. 36 is a graph showing a variation of a light transmittance to the gap Ga of a liquid crystal layer LC and a variation of a response speed of liquid crystal to the gap Ga, on a liquid crystal panel PNL of an electronic device 100 according to an eighth embodiment. The electronic device 100 is constituted similarly to that of the third embodiment (FIG. 20) except for constituent elements described in the eighth embodiment.

FIG. 36 shows a relationship between the gap Ga shown in FIG. 20 and the response speed of the liquid crystal. It can be understood that the response speed of the liquid crystal becomes higher as the gap Ga is made narrower. Incidentally, in the present specification, the response speed of the liquid crystal is referred to as a speed at which the liquid crystal molecules change from the initial alignment to a predetermined state of what is called a speed at rise. Thus, in the eighth embodiment, a second gap Ga2 is set to be smaller than a first gap Ga1 (Ga2<Ga1). For example, the second gap Ga2 is set to a half of the first gap Ga1 (Ga2=Ga1/2).

The response speed of the liquid crystal in each of the first control liquid crystal layer LC1, the second control liquid crystal layer LC2, and the third control liquid crystal layer LC3 in the incident light control area PCA can be thereby made higher than the response speed of the liquid crystal in the display liquid crystal layer LCI in the display area DA. For example, the incident light control area PCA (diaphragm DP) of the liquid crystal panel PNL can be caused to function as a liquid crystal shutter.

The shutter speed is required to be higher than or equal to 0.001 seconds in some cases and, for the incident light control area PCA which functions as the liquid crystal shutter, the time at which the voltage is applied to the control electrode RL becomes shorter than the time at which the voltage is applied to the pixel electrode PE. Therefore, the response speed of the liquid crystal driven by the control electrode RL is also required to be higher.

However, it should be noticed that the light transmittance in the incident light control area PCA becomes lower as the second gap Ga2 is made narrower.

Incidentally, the first gap Ga1 may be made narrower, and the response speed of the liquid crystal in the display liquid crystal layer LCI can be made higher. However, it should be noticed that the light transmittance in the display area DA becomes lower and the display images become darker.

Figure 37:
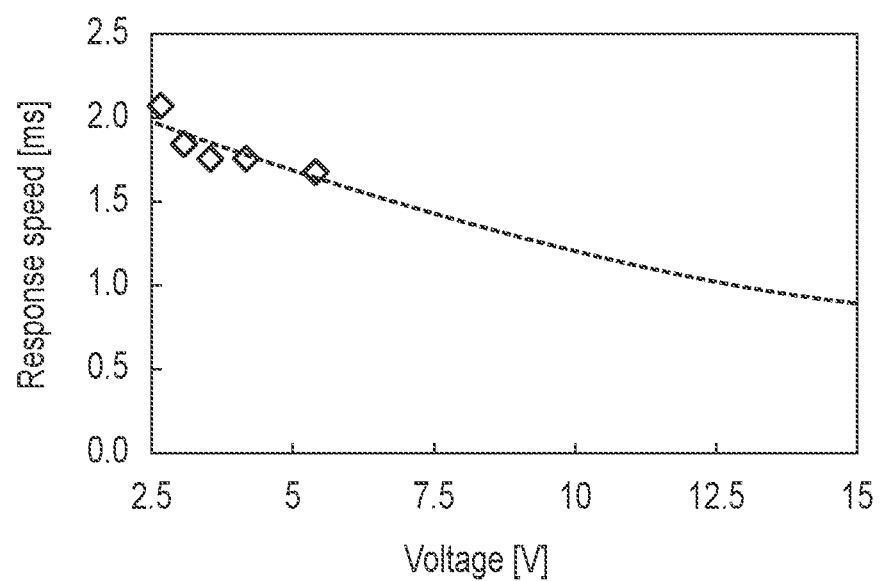
FIG. 37 is a graph showing a variation of a response speed of the liquid crystal to a voltage applied to the liquid crystal layer, according to the eighth embodiment.

Next, a relationship between the voltage applied to the liquid crystal layer LC and the response speed will be described. FIG. 37 is a graph showing a variation of a response speed of the liquid crystal to a voltage applied to the liquid crystal layer LC, according to the eighth embodiment. In FIG. 37, the second gap Ga2 is set to 1.7 μm.

As shown in FIG. 37, it can be understood that the response speed of the liquid crystal becomes higher as the potential difference between the control electrode structure RE and the counter-electrode OE is made larger. When the incident light control area PCA (diaphragm DP) is caused to function as the liquid crystal shutter, the response speed of the liquid crystal is desirably slower than or equal to 1.0 ms. It can be understood that when the response speed of the liquid crystal slower than or equal to 1.0 ms is to be obtained, the voltage (absolute value of the voltage) applied between the control electrode structure RE and the counter-electrode OE needs to be higher than or equal to 13V.

For example, when changing the state of the first incident light control area TA1, the second incident light control area TA2, and the third incident light control area TA3 from the transmissive state to the non-transmissive state at a high speed, a voltage higher than or equal to 13V may be applied to the first control liquid crystal layer LC1, the second control liquid crystal layer LC2, and the third control liquid crystal layer LC3.

Incidentally, when causing the incident light control area PCA (diaphragm DP) to function as the liquid crystal shutter, each of the absolute value of the voltage applied to the first control liquid crystal layer LC1, the absolute value of the voltage applied to the second control liquid crystal layer LC2, and the absolute value of the voltage applied to the third control liquid crystal layer LC3 is higher than the absolute value of the voltage applied to the display liquid crystal layer LCI.

Based on the above, with respect to the voltage, too, the response speed of the liquid crystal in each of the first control liquid crystal layer LC1, the second control liquid crystal layer LC2, and the third control liquid crystal layer LC3 in the incident light control area PCA can be made higher than the response speed of the liquid crystal in the display liquid crystal layer LCI in the display area DA.

The incident light control area PCA (diaphragm DP) of the liquid crystal panel PNL can function as a first liquid crystal shutter by changing the fourth condition to the first condition and then changing back the state to the fourth condition. The liquid crystal panel PNL can obtain the first liquid crystal shutter by simultaneously changing the state of the first incident light control area TA1, the second incident light control area TA2, and the third incident light control area TA3 from the non-transmissive state to the transmissive state and then changing back the state to the non-transmissive state.

When changing back the state of the first incident light control area TA1, the second incident light control area TA2, and the third incident light control area TA3 from the transmissive state to the non-transmissive state as described above, the liquid crystal panel PNL simultaneously applies a voltage higher than or equal to 13V to the first control liquid crystal layer LC1, the second control liquid crystal layer LC2, and the third control liquid crystal layer LC3 to simultaneously drive the first control liquid crystal layer LC1, the second control liquid crystal layer LC2, and the third control liquid crystal layer LC3.

The incident light control area PCA (diaphragm DP) of the liquid crystal panel PNL can function as a second liquid crystal shutter by changing the fourth condition to the second condition and then changing back the state to the fourth condition. The liquid crystal panel PNL can obtain the second liquid crystal shutter by changing the state of the second incident light control area TA2 from the non-transmissive state to the transmissive state and then changing back the state to the non-transmissive state in a state in which the first incident light control area TA1 and the third incident light control area TA3 are held in the non-transmissive state. The second liquid crystal shutter can cause the diaphragm DP to function both the pinhole and the shutter.

Incidentally, the voltage applied to the first control liquid crystal layer LC1 and the third control liquid crystal layer LC3 may be lower than 13V during a period of holding the first incident light control area TA1 and the third incident light control area TA3 in the non-transmissive state. For example, the voltage applied to the first control liquid crystal layer LC1 and the third control liquid crystal layer LC3 to hold the first incident light control area TA1 and the third incident light control area TA3 in the non-transmissive state may be the same level as the voltage applied to the display liquid crystal layer LCI.

When changing back the state of the second incident light control area TA2 from the transmissive state to the non-transmissive state as described above, the liquid crystal panel PNL applies the voltage higher than or equal to 13V to the second control liquid crystal layer LC2 to drive the second control liquid crystal layer LC2.

The incident light control area PCA (diaphragm DP) of the liquid crystal panel PNL can function as a third liquid crystal shutter by changing the fourth condition to the third condition and then changing back the state to the fourth condition. The liquid crystal panel PNL can obtain the third liquid crystal shutter by simultaneously changing the second incident light control area TA2 and the third incident light control area TA3 from the non-transmissive state to the transmissive state and then changing back the state to the non-transmissive state in a state in which the first incident light control area TA1 is held in the non-transmissive state. The third liquid crystal shutter can cause the diaphragm DP to comprise the function of narrowing the incident light and the shutter function.

The diaphragm and the shutter speed need to be adjusted to obtain a desired image and, thus, the voltage applied to the first control liquid crystal layer LC1 may be lower than 13V during a period of holding the first incident light control area TA1 in the non-transmissive state.

When changing back the state of the second incident light control area TA2 and the third incident light control area TA3 from the transmissive state to the non-transmissive state as described above, the liquid crystal panel PNL simultaneously applies a voltage higher than or equal to 13V to the second control liquid crystal layer LC2 and the third control liquid crystal layer LC3 to simultaneously drive the second control liquid crystal layer LC2 and the third control liquid crystal layer LC3.

By causing the incident light control area PCA (diaphragm DP) of the liquid crystal panel PNL to function as the liquid crystal shutter, not only a subject in a stationary state, but a moving subject can be desirably captured. The liquid crystal panel PNL can cause the incident light control area PCA to function as the liquid crystal shutter while concentrically controlling the light transmissive area in the incident light control area PCA.

According to the electronic device 100 of the eighth embodiment configured as described above, the electronic device 100 capable of desirably imaging can be obtained.

The techniques described in the eighth embodiment can also be applied to the other embodiments. For example, the techniques described in the eighth embodiment can be applied to the first embodiment. In the first embodiment, the mode of the incident light control area PCA of the liquid crystal panel PNL is the normally-black mode. For this reason, when changing the non-transmissive state to the transmissive state, the liquid crystal panel PNL may apply the voltage higher than or equal to 13V to the first control liquid crystal layer LC1, the second control liquid crystal layer LC2, and the third control liquid crystal layer LC3.

Incidentally, as shown in FIG. 9, the linearly extending control electrode RL can be referred to as a linear electrode, and the power supply line CL having an annular shape can be referred to as an annular line.

The above-described insulating layer can be referred to as an insulating film.

The above-described incident light control area can be referred to as an incident light limitation area.

The above-described non-display area NDA can be referred to a peripheral area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. It is possible to combine two or more the embodiments with each other if needed.

What is claimed is:

1. An electronic device, comprising:
a liquid crystal panel; and
a camera,
the liquid crystal panel including a display area and an incident light control area,
the camera overlapping the incident light control area,
the incident light control area including an annular line and a control electrode connected to the annular line,
the annular line including a first annular line and a second annular line disposed to be in contact with an inside of the first annular line.

2. The electronic device of claim 1, wherein
the control electrode includes a first control electrode connected to the first annular line and a second control electrode connected to the second annular line, and
the first control electrode intersects the second annular line.

3. The electronic device of claim 2, wherein
the first control electrodes and the second control electrodes are arranged and alternately disposed.

4. The electronic device of claim 2, wherein
the first control electrode and the second control electrode are formed in a first conductive layer, and
the first annular line and the second annular line are formed in a second conductive layer.

5. The electronic device of claim 4, wherein
the display area includes a pixel electrode, and
the pixel electrode is formed in the first conductive layer.

6. The electronic device of claim 2, wherein
the annular line includes a third annular line having an inner diameter smaller than the first annular line and the second annular line, inside the first annular line and the second annular line.

7. An electronic device, comprising:
a liquid crystal panel including a first substrate, a second substrate, and a liquid crystal layer held between the first substrate and the second substrate; and
a camera,
the liquid crystal panel including a display area where an image is displayed and an incident light control area,
light from outside being passed through the incident light control area and being made incident on the camera,
the incident light control area including an annular line and a control electrode connected to the annular line,
the annular line including a first annular line and a second annular line disposed to be in contact with an inside of the first annular line,
the display area including a pixel electrode,
the control electrode being different in shape from the pixel electrode.

8. The electronic device of claim 7, wherein
the control electrode includes a first control electrode connected to the first annular line and a second control electrode connected to the second annular line, and
the first control electrode intersects the second annular line.

9. The electronic device of claim 8, wherein
the first control electrodes and the second control electrodes are arranged and alternately disposed.

10. The electronic device of claim 8, wherein
the first control electrode and the second control electrode are formed in a first conductive layer, and
the first annular line and the second annular line are formed in a second conductive layer.

11. The electronic device of claim 8, wherein
the annular line includes a third annular line having an inner diameter smaller than the first annular line and the second annular line, inside the first annular line and the second annular line.

12. An electronic device, comprising:
a liquid crystal display device comprising a liquid crystal panel and an illumination device; and
a camera disposed in an opening formed in the illumination device,
the liquid crystal panel including a display area where an image is displayed and an incident light control area,
light from outside being passed through the incident light control area and being made incident on the camera,
the incident light control area including an annular line and a control electrode connected to the annular line,
the control electrode being disposed inside the annular line,
the display area including a pixel electrode,
the control electrode being different in shape from the pixel electrode.

13. The electronic device of claim 12, wherein
the annular line includes a first annular line and a second annular line disposed to be in contact with an inside of the first annular line.

14. The electronic device of claim 13, wherein
the control electrode includes a first control electrode connected to the first annular line and a second control electrode connected to the second annular line, and
the first control electrodes and the second control electrodes are alternately disposed.

15. The electronic device of claim 14, wherein
the first control electrode and the second control electrode are formed in a first conductive layer, and
the first annular line and the second annular line are formed in a second conductive layer.

16. The electronic device of claim 15, wherein
the pixel electrode is formed in the first conductive layer.

17. The electronic device of claim 14, wherein
the annular line includes a third annular line having an inner diameter smaller than the first annular line and the second annular line, inside the first annular line and the second annular line.

* * * * *